(12) United States Patent
Elshafie et al.

(10) Patent No.: US 12,471,108 B2
(45) Date of Patent: Nov. 11, 2025

(54) DOWNLINK CONTROL INFORMATION PROCEDURES

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 18/086,559

(22) Filed: Dec. 21, 2022

(65) Prior Publication Data

US 2024/0215038 A1    Jun. 27, 2024

(51) Int. Cl.
*H04W 72/23* (2023.01)
*H04L 1/00* (2006.01)
*H04W 72/0446* (2023.01)
*H04W 72/0453* (2023.01)

(52) U.S. Cl.
CPC ........... *H04W 72/23* (2023.01); *H04L 1/0003* (2013.01); *H04W 72/0446* (2013.01); *H04W 72/0453* (2013.01)

(58) Field of Classification Search
CPC ............ H04W 72/23; H04W 72/0446; H04W 72/0453; H04L 1/0003; H04L 5/0091; H04L 27/0012
See application file for complete search history.

(56) References Cited

U.S. PATENT DOCUMENTS

| | | | |
|---|---|---|---|
| 9,699,624 B1 * | 7/2017 | Huang ................. | H04W 68/02 |
| 2021/0112600 A1 * | 4/2021 | Lei ........................ | H04L 5/0091 |
| 2021/0144743 A1 * | 5/2021 | Rastegardoost ...... | H04W 72/23 |
| 2021/0227570 A1 * | 7/2021 | Park ....................... | H04L 1/189 |
| 2022/0303957 A1 * | 9/2022 | Elshafie ................ | H04L 1/0025 |
| 2023/0156803 A1 * | 5/2023 | Zhang ...................... | H04L 1/08 370/329 |
| 2023/0422254 A1 * | 12/2023 | Khoshnevisan ...... | H04L 1/0041 |

FOREIGN PATENT DOCUMENTS

WO    WO-2020261174 A1 *  12/2020  ........... H04L 1/1607

\* cited by examiner

*Primary Examiner* — Charles C Jiang
*Assistant Examiner* — Rachel Elizabeth Marks
(74) *Attorney, Agent, or Firm* — Loza & Loza, LLP

(57) ABSTRACT

Aspects relate to a network entity sending downlink control information to a user equipment (UE) that the UE uses to receive a message from the network entity. The network entity may send to the UE a first DCI that includes a first transmission parameter or an indication thereof to be used for receiving a first message and a second DCI that includes a second transmission parameter to be used for receiving a second message.

27 Claims, 25 Drawing Sheets

| Index | {c-TDRA, p-TDRA} (An entry for a TDRA value for the common message, and an entry for a TDRA value for the private message) |
|---|---|
| 0 | {4,0} |
| 1 | {2,2} |
| 2 | {6,4} |
| 3 | {8,2} |

| Index | {p-MCS, c-MCS} |
|---|---|
| 0 | {4,0} |
| 1 | {4,2} |
| 2 | {8,5} |
| 3 | {16,2} |

FIG. 13

| Index | {p-MCS, p-TDRA}<br>(An entry for an MCS value, and an entry for a TDRA value) |
|---|---|
| 0 | {4,0} |
| 1 | {4,2} |
| 2 | {8,5} |
| 3 | {16,2} |

FIG. 14

DOWNLINK CONTROL INFORMATION PROCEDURES

The technology discussed below relates generally to wireless communication and, more particularly, to procedures associated with downlink control information.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell. To this end, a base station may send downlink control information to a UE to schedule a UE for communication on allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an apparatus for wireless communication may include a processing system. The processing system may be configured to obtain a first message comprising a first indication of a first transmission parameter associated with a second message. The processing system may also be configured to obtain a downlink control information (DCI) that specifies a second transmission parameter associated with a third message. The processing system may further be configured to obtain the second message via a first channel, the second message being obtained based, at least in part, on the first indication. The processing system may additionally be configured to obtain the third message via the first channel, the third message being obtained based on the second transmission parameter.

In some examples, a method for wireless communication at an apparatus is disclosed. The method may include obtaining a first message comprising a first indication of a first transmission parameter associated with a second message. The method may also include obtaining a downlink control information (DCI) that specifies a second transmission parameter associated with a third message. The method may further include obtaining the second message via a first channel, the second message being obtained based, at least in part, on the first indication. The method may additionally include obtaining the third message via the first channel, the third message being obtained based on the second transmission parameter.

In some examples, an apparatus for wireless communication may include means for obtaining a first message comprising a first indication of a first transmission parameter associated with a second message. The apparatus may also include means for obtaining a downlink control information (DCI) that specifies a second transmission parameter associated with a third message. The apparatus may further include means for obtaining the second message via a first channel, the second message being obtained based, at least in part, on the first indication. The apparatus may additionally include means for obtaining the third message via the first channel, the third message being obtained based on the second transmission parameter.

In some examples, a non-transitory computer-readable medium has stored therein instructions executable by a processing system of an apparatus to obtain a first message comprising a first indication of a first transmission parameter associated with a second message. The computer-readable medium may also have stored therein instructions executable by the processing system of the apparatus to obtain a downlink control information (DCI) that specifies a second transmission parameter associated with a third message. The computer-readable medium may further have stored therein instructions executable by one or more processors of the apparatus to obtain the second message via a first channel, the second message being obtained based, at least in part, on the first indication. The computer-readable medium may additionally have stored therein instructions executable by one or more processors of the apparatus to obtain the third message via the first channel, the third message being obtained based on the second transmission parameter.

In some examples, a user equipment may include a transceiver, and a processing system. The transceiver may be configured to receive a first message comprising a first indication of a first transmission parameter associated with a second message. The transceiver may also be configured to receive a downlink control information (DCI) that specifies a second transmission parameter associated with a third message. The processing system may be configured to obtain the second message via a first channel, the second message being obtained based, at least in part, on the first indication. The processing system may also be configured to obtain the third message via the first channel, the third message being obtained based on the second transmission parameter.

In some examples, an apparatus for wireless communication may include a processing system. The processing system may be configured to obtain a first downlink control information (DCI) that specifies a first transmission parameter associated with a first message. The processing system may also be configured to obtain a second DCI that specifies a second transmission parameter associated with a second message. The processing system may further be configured to obtain the first message via a first channel, the first message being obtained based on the first transmission parameter. The processing system may additionally be configured to obtain the second message via the first channel, the second message being obtained based on the second transmission parameter.

In some examples, a method for wireless communication at an apparatus is disclosed. The method may include obtaining a first downlink control information (DCI) that specifies a first transmission parameter associated with a first message. The method may also include obtaining a second DCI that specifies a second transmission parameter associated with a second message. The method may further include obtaining the first message via a first channel, the first message being obtained based on the first transmission parameter. The method may additionally include obtaining the second message via the first channel, the second message being obtained based on the second transmission parameter.

In some examples, an apparatus for wireless communication may include means for obtaining a first downlink control information (DCI) that specifies a first transmission parameter associated with a first message. The apparatus may also include means for obtaining a second DCI that specifies a second transmission parameter associated with a second message. The apparatus may further include means for obtaining the first message via a first channel, the first message being obtained based on the first transmission parameter. The apparatus may additionally include means for obtaining the second message via the first channel, the second message being obtained based on the second transmission parameter.

In some examples, a non-transitory computer-readable medium has stored therein instructions executable by a processing system of an apparatus to obtain a first downlink control information (DCI) that specifies a first transmission parameter associated with a first message. The computer-readable medium may also have stored therein instructions executable by the processing system of the apparatus to obtain a second DCI that specifies a second transmission parameter associated with a second message. The computer-readable medium may further have stored therein instructions executable by one or more processors of the apparatus to obtain the first message via a first channel, the first message being obtained based on the first transmission parameter. The computer-readable medium may additionally have stored therein instructions executable by one or more processors of the apparatus to obtain the second message via the first channel, the second message being obtained based on the second transmission parameter.

In some examples, a user equipment may include a transceiver, and a processing system. The transceiver may be configured to obtain a first downlink control information (DCI) that specifies a first transmission parameter associated with a first message. The transceiver may also be configured to obtain a second DCI that specifies a second transmission parameter associated with a second message. The processing system may be configured to obtain the first message via a first channel, the first message being obtained based on the first transmission parameter. The processing system may also be configured to obtain the second message via the first channel, the second message being obtained based on the second transmission parameter.

In some examples, an apparatus for wireless communication may include a processing system. The processing system may be configured to obtain a downlink control information (DCI) that comprises a first transmission parameter. The processing system may also be configured to obtain a first message via a first channel, the first message being obtained based on the first transmission parameter. The processing system may further be configured to obtain a second message via the first channel, the second message being obtained based on the first transmission parameter according to a first indication that the first transmission parameter is to be used to obtain the first message and the second message.

In some examples, a method for wireless communication at an apparatus is disclosed. The method may include obtaining a downlink control information (DCI) that comprises a first transmission parameter. The method may also include obtaining a first message via a first channel, the first message being obtained based on the first transmission parameter. The method may further include obtaining a second message via the first channel, the second message being obtained based on the first transmission parameter according to a first indication that the first transmission parameter is to be used to obtain the first message and the second message.

In some examples, an apparatus for wireless communication may include means for obtaining a downlink control information (DCI) that comprises a first transmission parameter. The apparatus may also include means for obtaining a first message via a first channel, the first message being obtained based on the first transmission parameter. The apparatus may further include means for obtaining a second message via the first channel, the second message being obtained based on the first transmission parameter according to a first indication that the first transmission parameter is to be used to obtain the first message and the second message.

In some examples, a non-transitory computer-readable medium has stored therein instructions executable by a processing system of an apparatus to obtain a downlink control information (DCI) that comprises a first transmission parameter. The computer-readable medium may also have stored therein instructions executable by the processing system of the apparatus to obtain a first message via a first channel, the first message being obtained based on the first transmission parameter. The computer-readable medium may further have stored therein instructions executable by one or more processors of the apparatus to obtain a second message via the first channel, the second message being obtained based on the first transmission parameter according to a first indication that the first transmission parameter is to be used to obtain the first message and the second message.

In some examples, a user equipment may include a transceiver, and a processing system. The transceiver may be configured to obtain a downlink control information (DCI) that comprises a first transmission parameter. The processing system may be configured to obtain a first message via a first channel, the first message being obtained based on the first transmission parameter. The processing system may also be configured to obtain a second message via the first channel, the second message being obtained based on the first transmission parameter according to a first indication that the first transmission parameter is to be used to obtain the first message and the second message.

In some examples, an apparatus for wireless communication may include a processing system. The processing system may be configured to obtain a first message comprising a plurality of sets of transmission parameters. The processing system may also be configured to obtain a downlink control information (DCI) comprising an index that identifies a particular set of transmission parameters of the plurality of sets of transmission parameters. The processing system may further be configured to obtain at least one of a second message or a third message based on the particular set of transmission parameters.

In some examples, a method for wireless communication at an apparatus is disclosed. The method may include obtaining a first message comprising a plurality of sets of transmission parameters. The method may also include obtaining a downlink control information (DCI) comprising an index that identifies a particular set of transmission parameters of the plurality of sets of transmission parameters. The method may further include obtaining at least one of a second message or a third message based on the particular set of transmission parameters.

In some examples, an apparatus for wireless communication may include means for obtaining a first message comprising a plurality of sets of transmission parameters. The apparatus may also include means for obtaining a downlink control information (DCI) comprising an index that identifies a particular set of transmission parameters of the plurality of sets of transmission parameters. The apparatus may further include means for obtaining at least one of a second message or a third message based on the particular set of transmission parameters.

In some examples, a non-transitory computer-readable medium has stored therein instructions executable by a processing system of an apparatus to obtain a first message comprising a plurality of sets of transmission parameters. The computer-readable medium may also have stored therein instructions executable by the processing system of the apparatus to obtain a downlink control information (DCI) comprising an index that identifies a particular set of transmission parameters of the plurality of sets of transmission parameters. The computer-readable medium may further have stored therein instructions executable by one or more processors of the apparatus to obtain at least one of a second message or a third message based on the particular set of transmission parameters.

In some examples, a user equipment may include a transceiver, and a processing system. The transceiver may be configured to obtain a first message comprising a plurality of sets of transmission parameters. The transceiver may also be configured to obtain a downlink control information (DCI) comprising an index that identifies a particular set of transmission parameters of the plurality of sets of transmission parameters. The processing system may be configured to obtain at least one of a second message or a third message based on the particular set of transmission parameters.

In some examples, an apparatus for wireless communication may include a processing system. The processing system may be configured to output a first message for transmission, the first message including a first indication of a first transmission parameter associated with a second message. The processing system may also be configured to output a downlink control information (DCI) for transmission, the DCI specifying a second transmission parameter associated with a third message. The processing system may further be configured to output the second message for transmission via a first channel, the second message being output based, at least in part, on the first indication. The processing system may additionally be configured to output the third message for transmission via the first channel, the third message being output based on the second transmission parameter.

In some examples, a method for wireless communication at an apparatus is disclosed. The method may include outputting a first message for transmission, the first message including a first indication of a first transmission parameter associated with a second message. The method may also include outputting a downlink control information (DCI) for transmission, the DCI specifying a second transmission parameter associated with a third message. The method may further include outputting the second message for transmission via a first channel, the second message being output based, at least in part, on the first indication. The method may additionally include outputting the third message for transmission via the first channel, the third message being output based on the second transmission parameter.

In some examples, an apparatus for wireless communication may include means for outputting a first message for transmission, the first message including a first indication of a first transmission parameter associated with a second message. The apparatus may also include means for outputting a downlink control information (DCI) for transmission, the DCI specifying a second transmission parameter associated with a third message. The apparatus may further include means for outputting the second message for transmission via a first channel, the second message being output based, at least in part, on the first indication. The apparatus may additionally include means for outputting the third message for transmission via the first channel, the third message being output based on the second transmission parameter.

In some examples, a non-transitory computer-readable medium has stored therein instructions executable by a processing system of an apparatus to output a first message for transmission, the first message including a first indication of a first transmission parameter associated with a second message. The computer-readable medium may also have stored therein instructions executable by the processing system of the apparatus to output a downlink control information (DCI) for transmission, the DCI specifying a second transmission parameter associated with a third message. The computer-readable medium may further have stored therein instructions executable by one or more processors of the apparatus to output the second message for transmission via a first channel, the second message being output based, at least in part, on the first indication. The computer-readable medium may additionally have stored therein instructions executable by one or more processors of the apparatus to output the third message for transmission via the first channel, the third message being output based on the second transmission parameter.

In some examples, a network entity may include a transceiver, and a processing system. The transceiver may be configured to output a first message for transmission, the first message including a first indication of a first transmission parameter associated with a second message. The transceiver may also be configured to output a downlink control information (DCI) for transmission, the DCI specifying a second transmission parameter associated with a third message. The processing system may be configured to output the second message for transmission via a first channel, the second message being output based, at least in part, on the first indication. The processing system may also be configured to output the third message for transmission via the first channel, the third message being output based on the second transmission parameter.

In some examples, an apparatus for wireless communication may include a processing system. The processing system may be configured to output a first downlink control information (DCI) for transmission, the first DCI specifying a first transmission parameter associated with a first message. The processing system may also be configured to output a second DCI for transmission, the second DCI specifying a second transmission parameter associated with a second message. The processing system may further be configured to output the first message for transmission via a first channel, the first message being output based on the first transmission parameter. The processing system may additionally be configured to output the second message for transmission via the first channel, the second message being output based on the second transmission parameter.

In some examples, a method for wireless communication at an apparatus is disclosed. The method may include outputting a first downlink control information (DCI) for transmission, the first DCI specifying a first transmission parameter associated with a first message. The method may also include outputting a second DCI for transmission, the second DCI specifying a second transmission parameter associated with a second message. The method may further include outputting the first message for transmission via a first channel, the first message being output based on the first transmission parameter. The method may additionally include outputting the second message for transmission via the first channel, the second message being output based on the second transmission parameter.

In some examples, an apparatus for wireless communication may include means for outputting a first downlink control information (DCI) for transmission, the first DCI specifying a first transmission parameter associated with a first message. The apparatus may also include means for outputting a second DCI for transmission, the second DCI specifying a second transmission parameter associated with a second message. The apparatus may further include means for outputting the first message for transmission via a first channel, the first message being output based on the first transmission parameter. The apparatus may additionally include means for outputting the second message for transmission via the first channel, the second message being output based on the second transmission parameter.

In some examples, a non-transitory computer-readable medium has stored therein instructions executable by a processing system of an apparatus to output a first downlink control information (DCI) for transmission, the first DCI specifying a first transmission parameter associated with a first message. The computer-readable medium may also have stored therein instructions executable by the processing system of the apparatus to output a second DCI for transmission, the second DCI specifying a second transmission parameter associated with a second message. The computer-readable medium may further have stored therein instructions executable by one or more processors of the apparatus to output the first message for transmission via a first channel, the first message being output based on the first transmission parameter. The computer-readable medium may additionally have stored therein instructions executable by one or more processors of the apparatus to output the second message for transmission via the first channel, the second message being output based on the second transmission parameter.

In some examples, a network entity may include a transceiver, and a processing system. The transceiver may be configured to output a first downlink control information (DCI) for transmission, the first DCI specifying a first transmission parameter associated with a first message. The transceiver may also be configured to output a second DCI for transmission, the second DCI specifying a second transmission parameter associated with a second message. The processing system may be configured to output the first message for transmission via a first channel, the first message being output based on the first transmission parameter. The processing system may also be configured to output the second message for transmission via the first channel, the second message being output based on the second transmission parameter.

In some examples, an apparatus for wireless communication may include a processing system. The processing system may be configured to output a downlink control information (DCI) for transmission, the DCI including a first transmission parameter. The processing system may also be configured to output a first message for transmission via a first channel, the first message being output based on the first transmission parameter. The processing system may further be configured to output a second message for transmission via the first channel, the second message being output based on the first transmission parameter according to a first indication that the first transmission parameter is to be used to output the first message and the second message.

In some examples, a method for wireless communication at an apparatus is disclosed. The method may include outputting a downlink control information (DCI) for transmission, the DCI including a first transmission parameter. The method may also include outputting a first message for transmission via a first channel, the first message being output based on the first transmission parameter. The method may further include outputting a second message for transmission via the first channel, the second message being output based on the first transmission parameter according to a first indication that the first transmission parameter is to be used to output the first message and the second message.

In some examples, an apparatus for wireless communication may include means for outputting a downlink control information (DCI) for transmission, the DCI including a first transmission parameter. The apparatus may also include means for outputting a first message for transmission via a first channel, the first message being output based on the first transmission parameter. The apparatus may further include means for outputting a second message for transmission via the first channel, the second message being output based on the first transmission parameter according to a first indication that the first transmission parameter is to be used to output the first message and the second message.

In some examples, a non-transitory computer-readable medium has stored therein instructions executable by a processing system of an apparatus to output a downlink control information (DCI) for transmission, the DCI including a first transmission parameter. The computer-readable medium may also have stored therein instructions executable by the processing system of the apparatus to output a first message for transmission via a first channel, the first message being output based on the first transmission parameter. The computer-readable medium may further have stored therein instructions executable by one or more processors of the apparatus to output a second message for transmission via the first channel, the second message being obtained based on the first transmission parameter according to a first indication that the first transmission parameter is to be used to output the first message and the second message.

In some examples, a network entity may include a transceiver, and a processing system. The transceiver may be configured to output a downlink control information (DCI) for transmission, the DCI including a first transmission parameter. The processing system may be configured to output a first message for transmission via a first channel, the first message being output based on the first transmission parameter. The processing system may also be configured to output a second message for transmission via the first channel, the second message being obtained based on the first transmission parameter according to a first indication that the first transmission parameter is to be used to output the first message and the second message.

In some examples, an apparatus for wireless communication may include a processing system. The processing system may be configured to output a first message for transmission, the first message including a plurality of sets of transmission parameters. The processing system may also be configured to output a downlink control information (DCI) for transmission, the DCI including an index that identifies a particular set of transmission parameters of the plurality of sets of transmission parameters. The processing system may further be configured to output at least one of a second message or a third message for transmission based on the particular set of transmission parameters.

In some examples, a method for wireless communication at an apparatus is disclosed. The method may include outputting a first message for transmission, the first message including a plurality of sets of transmission parameters. The method may also include outputting a downlink control information (DCI) for transmission, the DCI including an index that identifies a particular set of transmission parameters of the plurality of sets of transmission parameters. The method may further include outputting at least one of a second message or a third message for transmission based on the particular set of transmission parameters.

In some examples, an apparatus for wireless communication may include means for outputting a first message for transmission, the first message including a plurality of sets of transmission parameters. The apparatus may also include means for outputting a downlink control information (DCI) for transmission, the DCI including an index that identifies a particular set of transmission parameters of the plurality of sets of transmission parameters. The apparatus may further include means for outputting at least one of a second message or a third message for transmission based on the particular set of transmission parameters.

In some examples, a non-transitory computer-readable medium has stored therein instructions executable by a processing system of an apparatus to output a first message for transmission, the first message including a plurality of sets of transmission parameters. The computer-readable medium may also have stored therein instructions executable by the processing system of the apparatus to output a downlink control information (DCI) for transmission, the DCI including an index that identifies a particular set of transmission parameters of the plurality of sets of transmission parameters. The computer-readable medium may further have stored therein instructions executable by one or more processors of the apparatus to output at least one of a second message or a third message for transmission based on the particular set of transmission parameters.

In some examples, a network entity may include a transceiver, and a processing system. The transceiver may be configured to output a first message for transmission, the first message including a plurality of sets of transmission parameters. The transceiver may also be configured to output a downlink control information (DCI) for transmission, the DCI including an index that identifies a particular set of transmission parameters of the plurality of sets of transmission parameters. The processing system may be configured to output at least one of a second message or a third message for transmission based on the particular set of transmission parameters.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 12 is a diagram illustrating an example of configuration indices and associated parameter sets according to some aspects.

FIG. 13 is a diagram illustrating an example of configuration indices and associated parameter sets according to some aspects.

FIG. 14 is a diagram illustrating an example of configuration indices and associated parameter sets according to some aspects.

DETAILED DESCRIPTION

Figure 1:
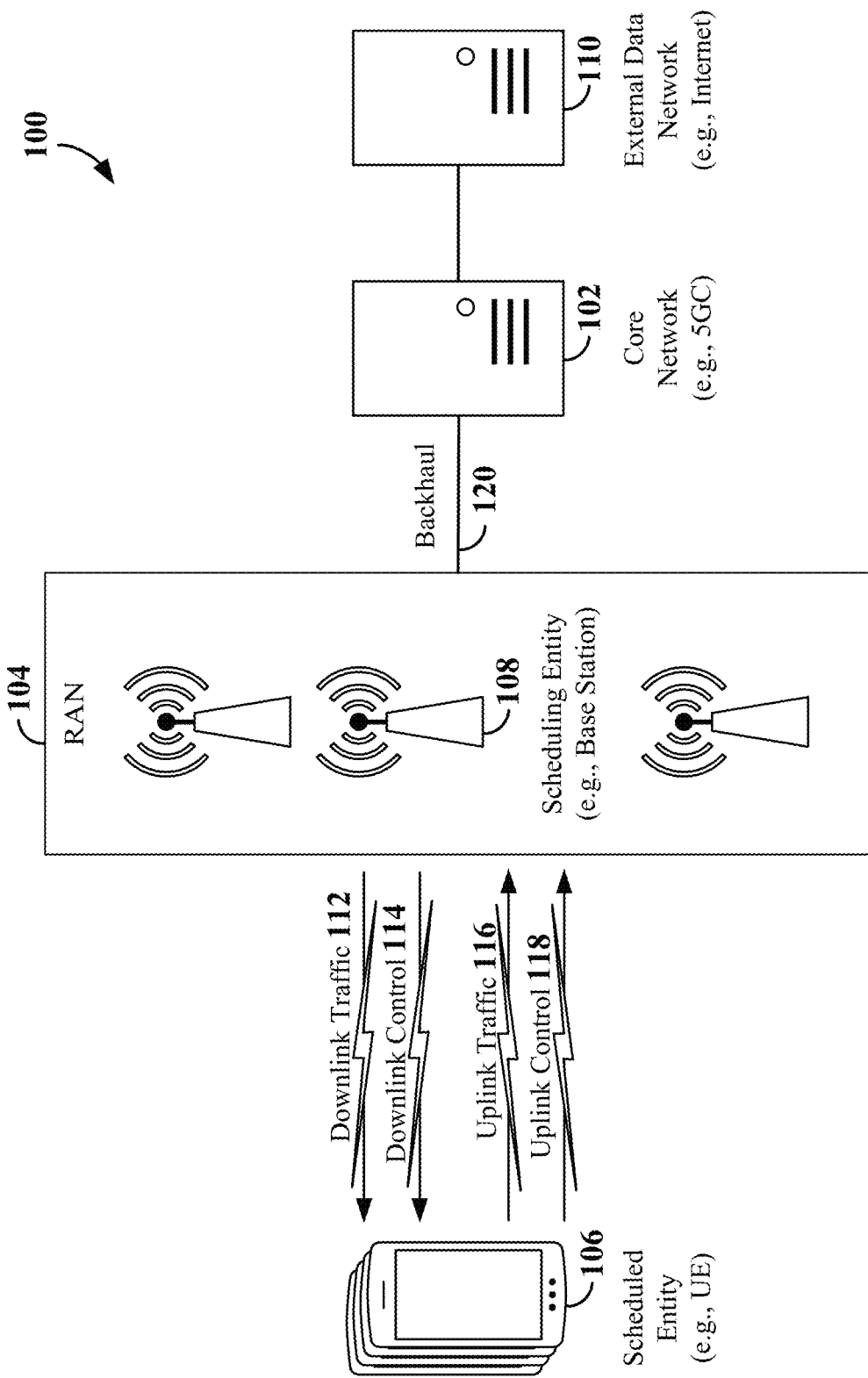
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to downlink control information (DCI). In some aspects, the disclosure relates to reducing the amount of information carried by DCI.

In a rate-splitting scenario involving a common message and a private message, a network entity (e.g., a base station such as a gNB) may send to a user equipment (UE) a first DCI that includes a delta value for a first transmission parameter and a second DCI that includes a second transmission parameter. Upon receiving the first DCI and the second DCI, the UE may determine the first transmission parameter based on the delta and the second transmission parameter. The UE may then use the first transmission parameter to receive one of the messages and use the second transmission parameter to receive the other message.

In a rate-splitting scenario involving a common message and a private message, a network entity may send to a user equipment (UE) a first DCI that includes a first transmission parameter and a second DCI that includes a second transmission parameter. Upon receiving the first DCI and the second DCI, the UE may use the first transmission parameter to receive one of the messages and use the second transmission parameter to receive the other message.

In a rate-splitting scenario for a single transport block or in a two transport block scenario, a network entity may send to a UE an indication that a two-stage DCI will be used. In a rate-splitting scenario where the transmission parameters are similar for a common message and a private message, a network entity may send to a UE an indication that the UE may use the transmission parameters sent in a single DCI for both the common message and the private message. A network entity may also use an configuration index to signal multiple transmission parameters to a UE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IOT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
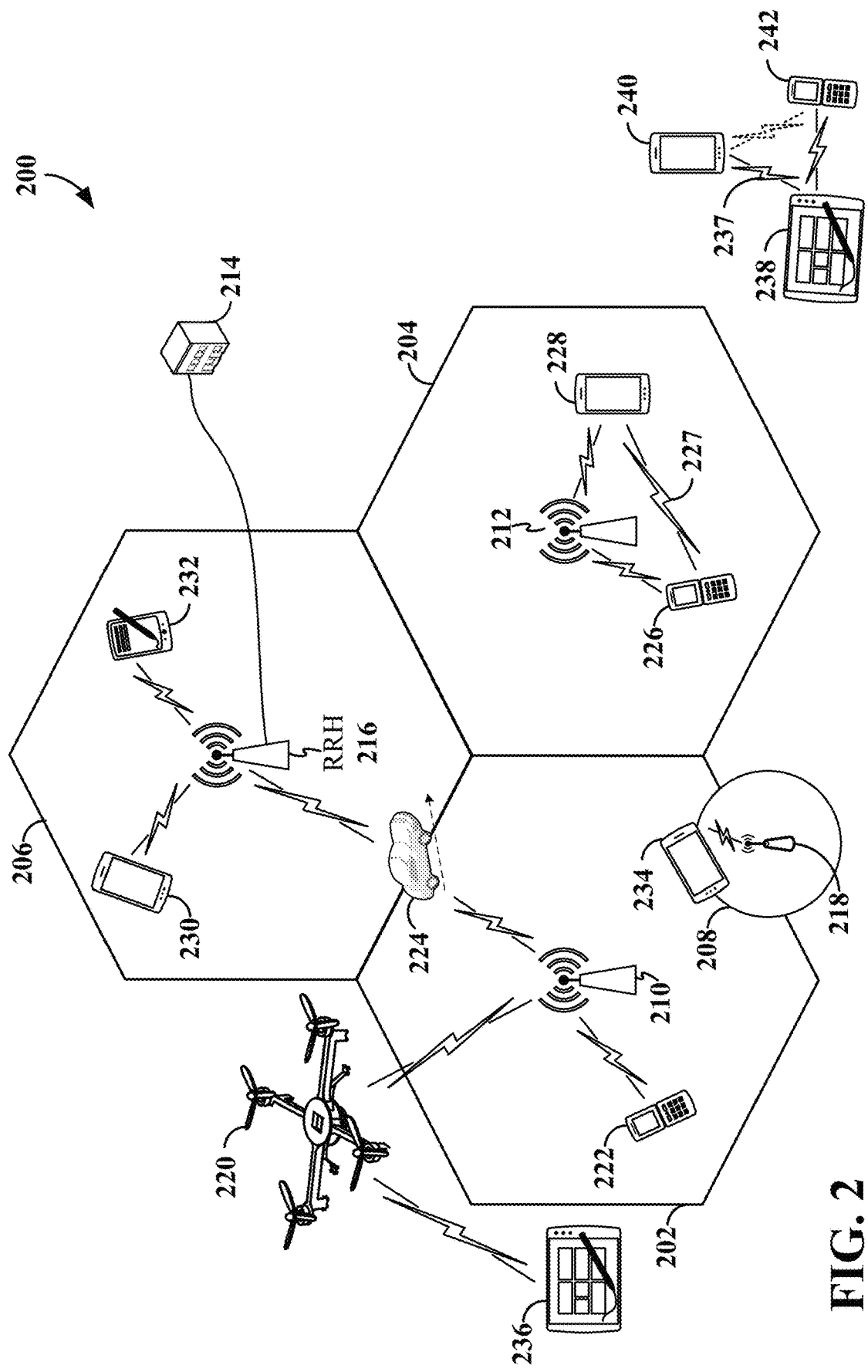
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUS, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
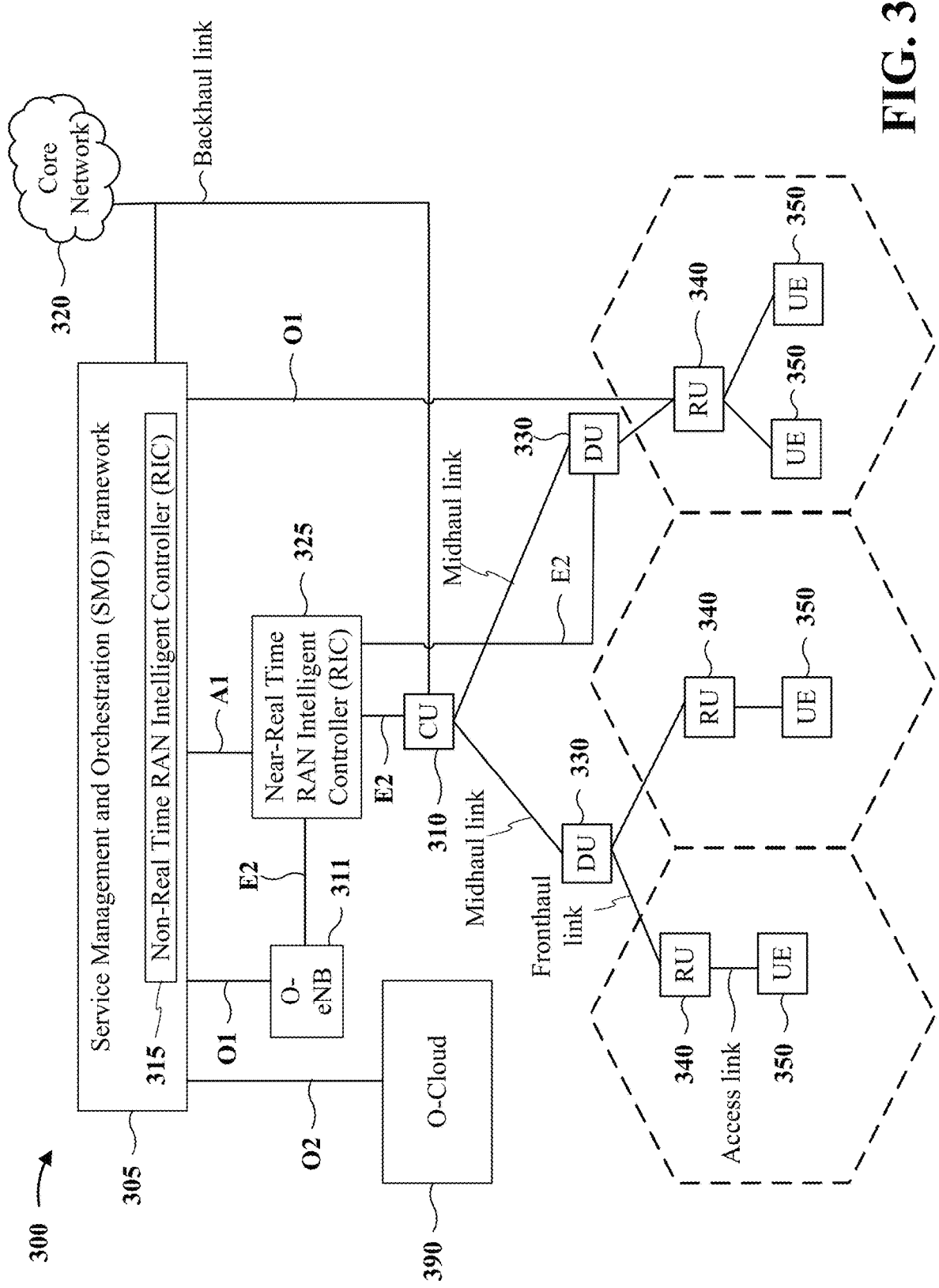
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
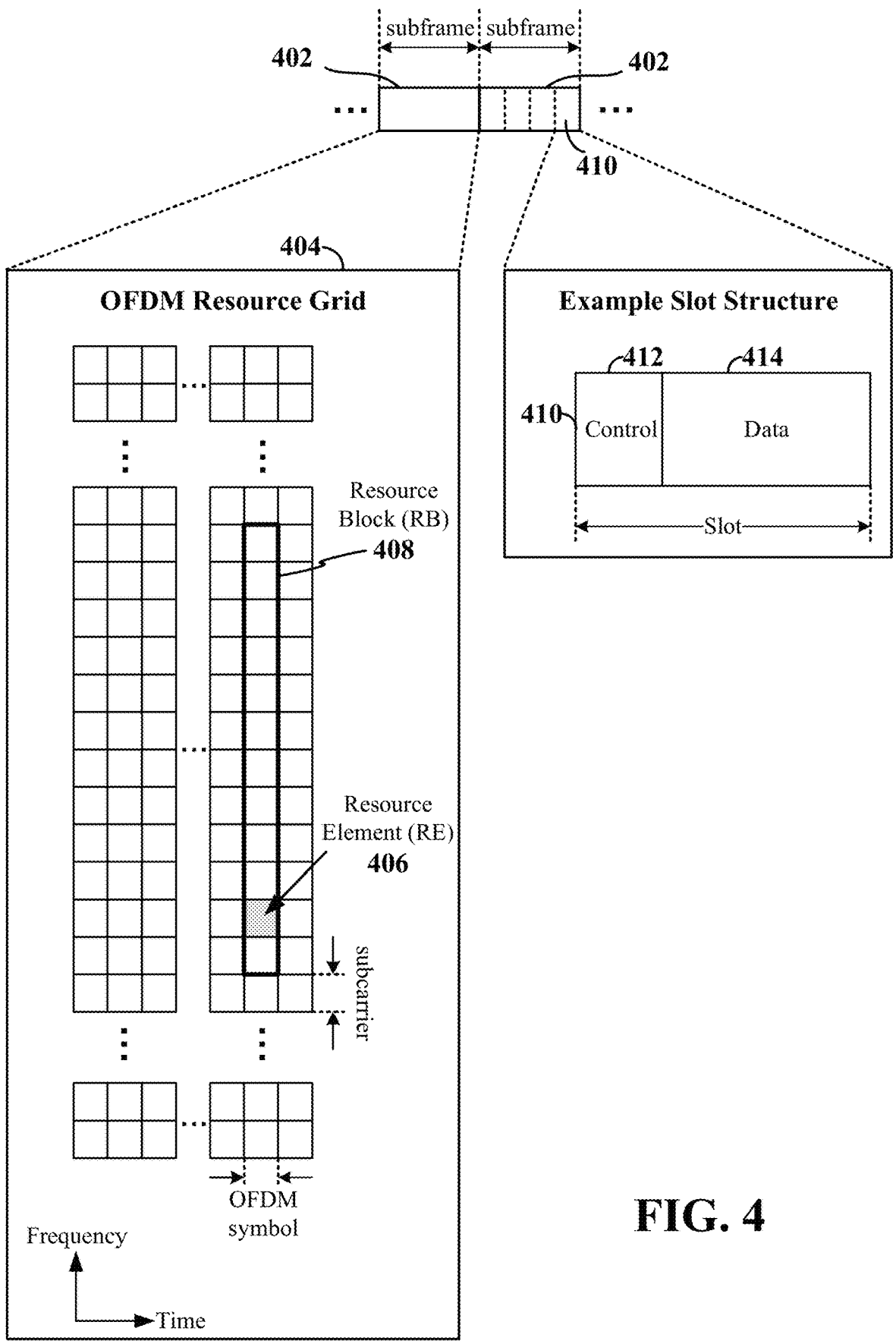
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
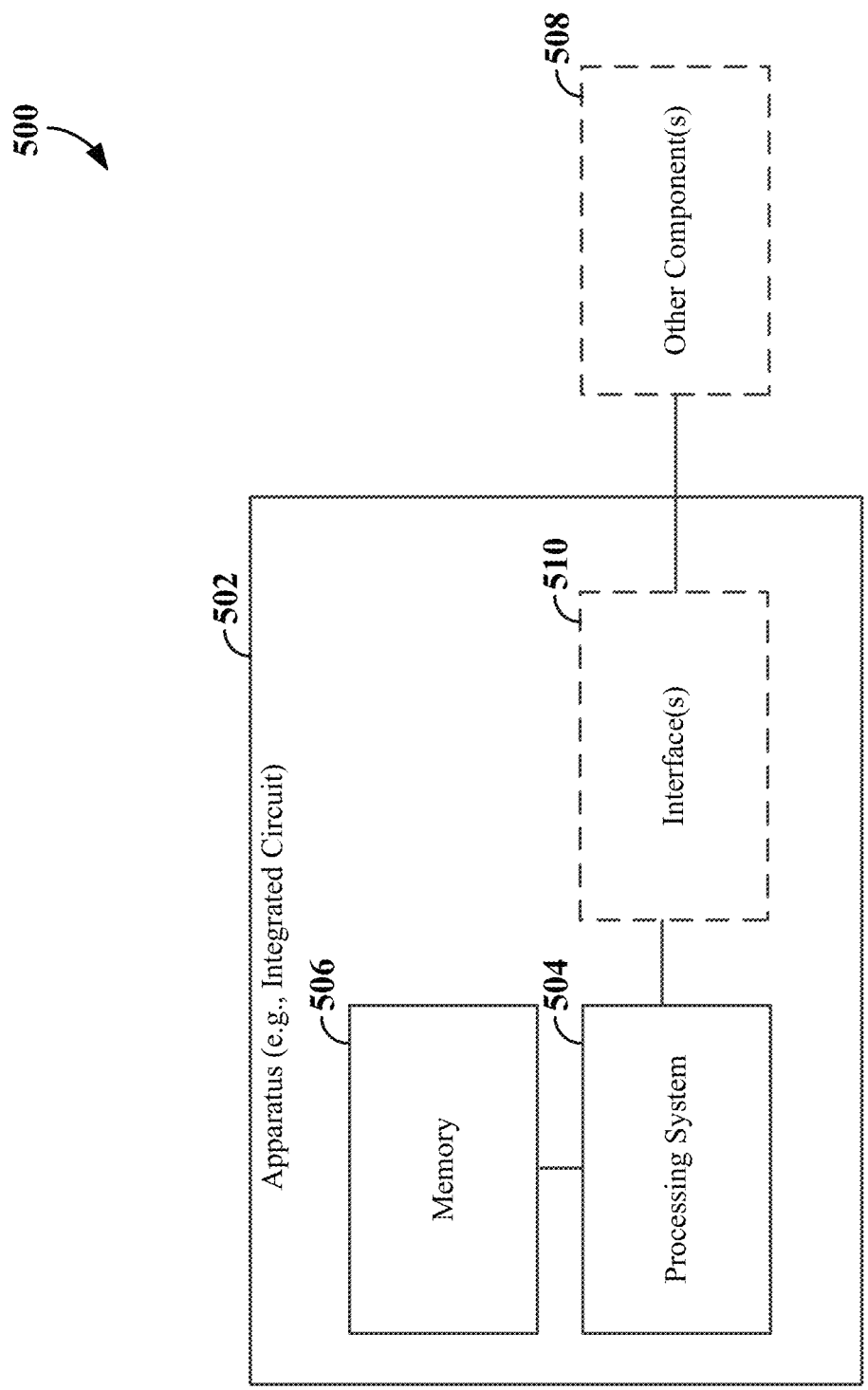
FIG. 5 is a schematic illustration of an example of an apparatus for communication according to some aspects.

FIG. 5 illustrates an example apparatus 500 according to certain aspects of the disclosure. In some examples, the apparatus 500 may be a network entity, a UE, or some other type of wireless node (e.g., a node that utilizes wireless spectrum (e.g., the RF spectrum) to communicate with another node or entity). In some examples, the apparatus 500 may correspond to any of the apparatuses, UEs, scheduled entities, network entities, base stations (e.g., gNBs), scheduling entities, distributed units, control units, RAN nodes, or CN entities shown in any of FIGS. 1-25.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1814 of FIG. 18. In some examples, the processing system 504 of FIG. 5 may correspond to the processing system 2014 of FIG. 20.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or an RF receiver).

The apparatus 502 may communicate with other apparatuses in various ways. In cases where the apparatus 502 includes an RF transceiver (not specifically depicted in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Figure 6:
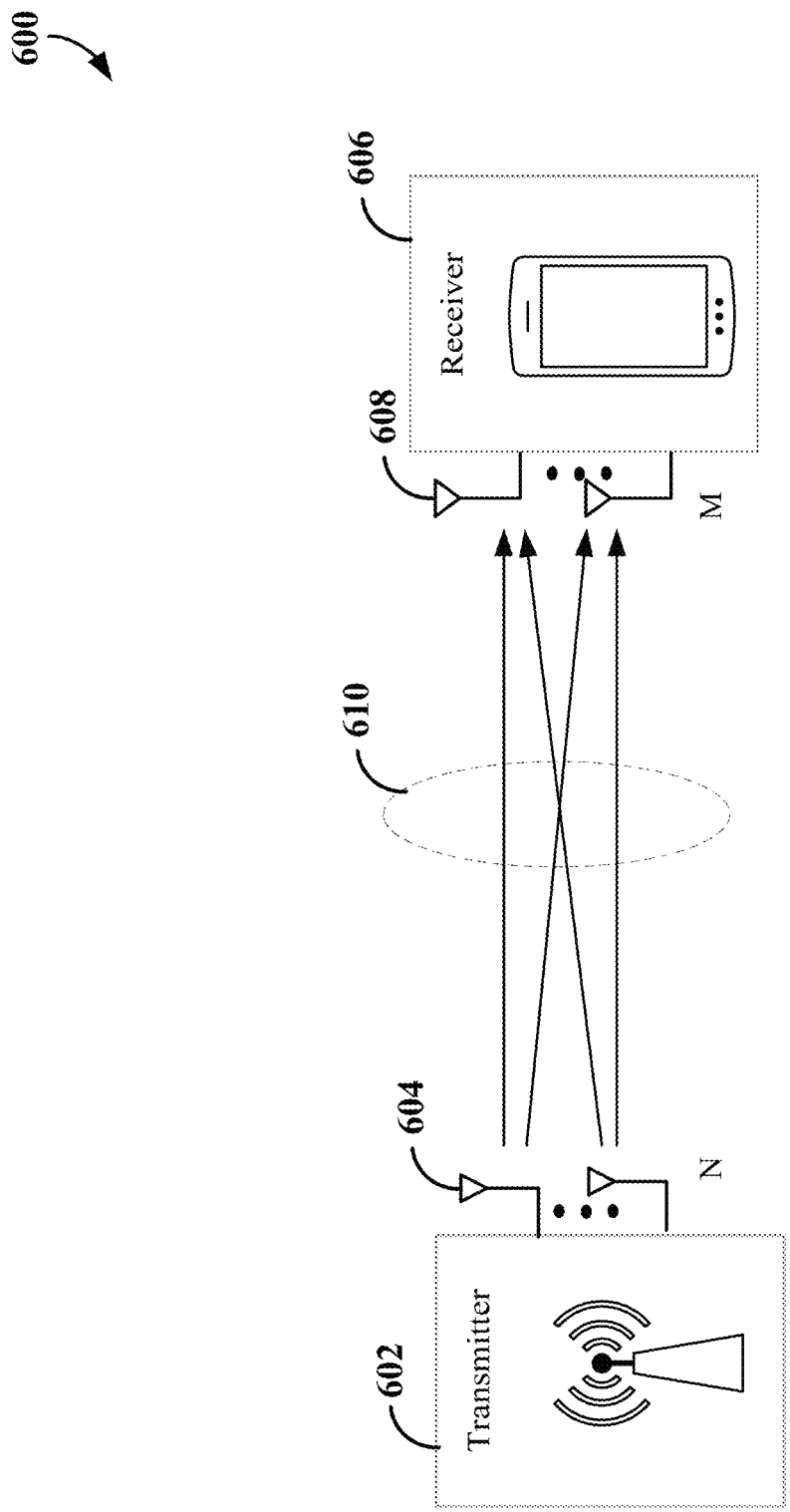
FIG. 6 is a block diagram illustrating an example of a wireless communication system supporting beamforming communication according to some aspects.

A scheduling entity (e.g., a network entity) and/or scheduled entity (e.g., a UE) may be configured for beamforming and/or multiple-input multiple-output (MIMO) technology. FIG. 6 illustrates an example of a wireless communication system 600 supporting beamforming and/or MIMO. In the wireless communication system 600, a transmitter 602 includes multiple transmit antennas 604 (e.g., N transmit antennas) and a receiver 606 includes multiple receive antennas 608 (e.g., M receive antennas). Thus, there are N×M signal paths 610 from the transmit antennas 604 to the receive antennas 608. Each of the transmitter 602 and the receiver 606 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the network entity to identify the source of each spatially precoded data stream.

The number of data streams or layers (e.g., MIMO layers) corresponds to the rank of the transmission. In general, the rank of the wireless communication system 600 (e.g., a MIMO system) is limited by the number of transmit antenna 604 or receive antennas 608, whichever is lower. In addition, the channel conditions at the UE, as well as other considerations, such as the available resources at the network entity, may also affect the transmission rank. For example, the rank (and therefore, the number of data streams) assigned to a particular UE on the downlink may be determined based on the rank indicator (RI) transmitted from the UE to the network entity. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The network entity may use the RI, along with resource information (e.g., the available resources and amount of data to be scheduled for the UE), to assign a transmission rank to the UE.

In one example (e.g., FIG. 6), a rank-2 spatial multiplexing transmission on a 2×2 MIMO antenna configuration will transmit one data stream from each transmit antenna 604. Each data stream reaches each receive antenna 608 along a different signal path 610. The receiver 606 may then reconstruct the data streams using the received signals from each receive antenna 608.

Beamforming is a signal processing technique that may be used at the transmitter 602 or the receiver 606 to shape or steer an antenna beam (e.g., a transmit beam or receive beam) along a spatial path between the transmitter 602 and the receiver 606. Beamforming may be achieved by combining the signals communicated via the transmit antennas 604 or the receive antennas 608 (e.g., antenna elements of an antenna array module) such that some of the signals experience constructive interference while others experience destructive interference. To create the desired constructive/destructive interference, the transmitter 602 or the receiver 606 may apply amplitude and/or phase offsets to signals transmitted from each of the transmit antennas 604 or received by each of the receive antenna 608.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A network entity (e.g., gNB) may generally be capable of communicating with UEs using beams (e.g., downlink transmit beams) of varying beam widths. For example, a network entity may be configured to utilize a wider beam when communicating with a UE that is in motion and a narrower beam when communicating with a UE that is stationary.

Figure 7:
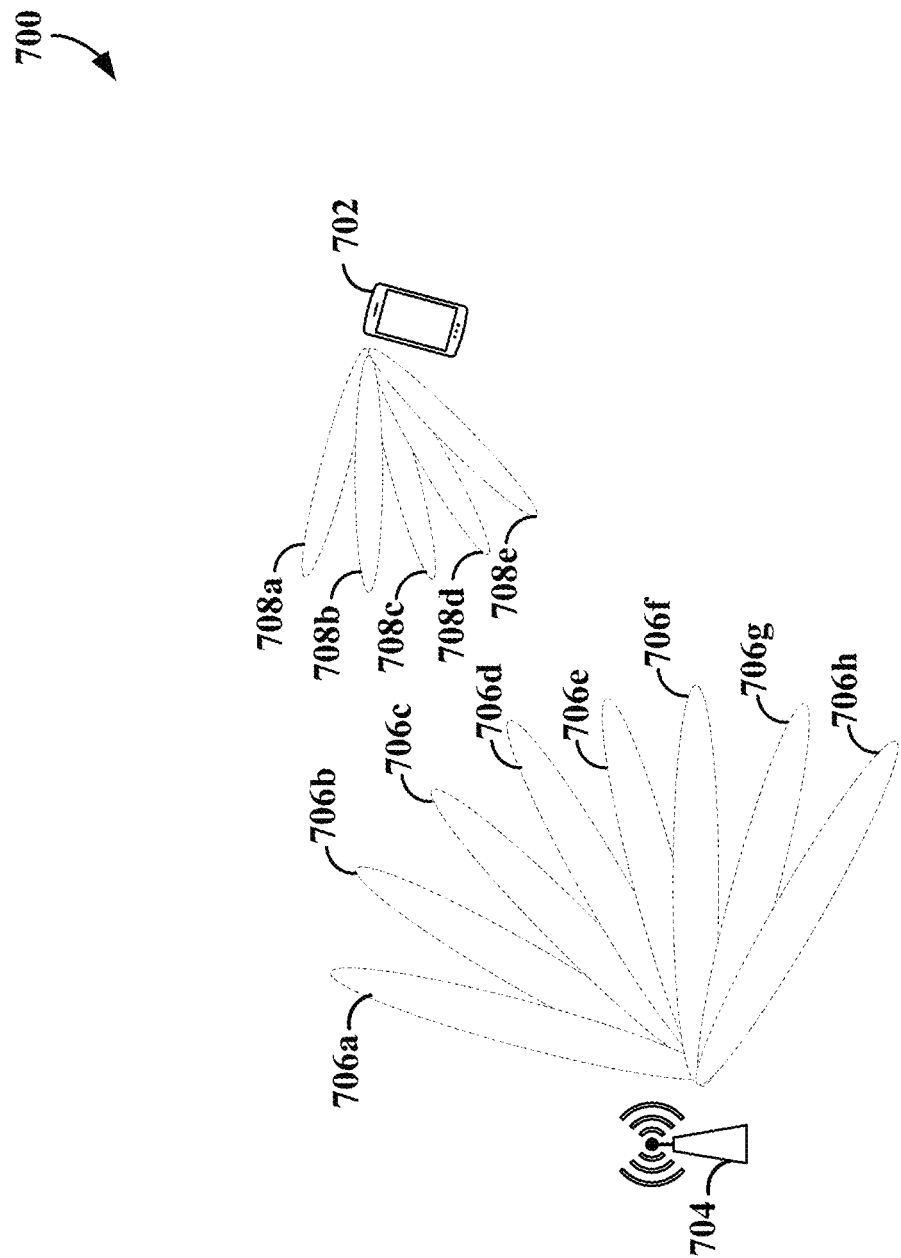
FIG. 7 is a diagram illustrating an example of communication between a radio access network (RAN) node and a wireless communication device using beamforming according to some aspects.

FIG. 7 is a diagram illustrating communication between a network entity 704 and a UE 702 using beamformed signals according to some aspects. The network entity 704 may be any of the network entities (e.g., gNBs), CUs, DUs, RUs, or scheduling entities illustrated in any of FIGS. 1-25. The UE 702 may be any of the UEs or scheduled entities illustrated in any of in any of FIGS. 1-25.

The network entity 704 may generally be capable of communicating with the UE 702 using one or more transmit beams, and the UE 702 may further be capable of communicating with the network entity 704 using one or more receive beams. As used herein, the term transmit beam refers to a beam on the network entity 704 that may be utilized for downlink or uplink communication with the UE 702. In addition, the term receive beam refers to a beam on the UE 702 that may be utilized for downlink or uplink communication with the network entity 704.

In the example shown in FIG. 7, the network entity 704 is configured to generate a plurality of transmit beams 706a-706h, each associated with a different spatial direction. In addition, the UE 702 is configured to generate a plurality of receive beams 708a-708e, each associated with a different spatial direction. It should be noted that while some beams are illustrated as adjacent to one another, such an arrangement may be different in different aspects. For example, transmit beams 706a-706h transmitted during the same symbol might not be adjacent to one another. In some examples, the network entity 704 and the UE 702 may each transmit more or fewer beams distributed in all directions (e.g., 360 degrees) and in three-dimensions. In addition, the transmit beams 706a-706h may include beams of varying beam width. For example, the network entity 704 may transmit certain signals (e.g., SSBs) on wider beams and other signals (e.g., CSI-RSs) on narrower beams.

The network entity 704 and the UE 702 may select one or more transmit beams 706a-706h on the network entity 704 and one or more receive beams 708a-708e on the UE 702 for communication of uplink and downlink signals therebetween using a beam management procedure. In one example, during initial cell acquisition, the UE 702 may perform a P1 beam management procedure to scan the plurality of transmit beams 706a-706h on the plurality of receive beams 708a-708e to select a beam pair link (e.g., one of the transmit beams 706a-706h and one of the receive beams 708a-708e) for a physical random access channel (PRACH) procedure for initial access to the cell. For example, periodic SSB beam sweeping may be implemented on the network entity 704 at certain intervals (e.g., based on the SSB periodicity). Thus, the network entity 704 may be configured to sweep or transmit an SSB on each of a plurality of wider transmit beams 706a-706h. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 704 and the UE 702 may perform a P2 beam management procedure for beam refinement. For example, the network entity 704 may be configured to sweep or transmit a CSI-RS on each of a plurality of narrower transmit beams 706a-706h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by a gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 702 is configured to scan the plurality of CSI-RS transmit beams 706a-706h on the plurality of receive beams 708a-708e. The UE 702 then performs beam measurements (e.g., RSRP, SINR, etc.) of the received CSI-RSs on each of the receive beams 708a-708e to determine the respective beam quality of each of the CSI-RS transmit beams 706a-706h as measured on each of the receive beams 708a-708e.

The UE 702 can then generate and transmit a Layer 1 (L1) measurement report, including the respective beam index (e.g., CSI-RS resource indicator (CRI)) and beam measurement (e.g., RSRP) of one or more of the CSI-RS transmit beams 706a-706h on one or more of the receive beams 708a-708e to the network entity 704. The network entity 704 may then select one or more CSI-RS transmit beams on which to transmit unicast downlink control information and/or user data traffic to the UE 702. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 702 may further select a corresponding receive beam on the UE 702 for each selected serving CSI-RS transmit beam to form a respective downlink beam pair link (BPL) for each selected serving CSI-RS transmit beam. For example, the UE 702 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the network entity 704 may configure the UE 702 to perform SSB beam measurements and provide an L1 measurement report containing beam measurements of SSB transmit beams 706a-706h. For example, the network entity 704 may configure the UE 702 to perform SSB beam measurements and/or CSI-RS beam measurements for beam failure detection (BRD), beam failure recovery (BFR), cell reselection, beam tracking (e.g., for a mobile UE 702 and/or network entity 704), or some other beam optimization purpose.

In addition, when the channel is reciprocal, the transmit and receive beams may be selected using an uplink beam management scheme. In an example, the UE 702 may be configured to sweep or transmit on each of a plurality of receive beams 708a-708e. For example, the UE 702 may transmit an SRS on each beam in the different beam directions. In addition, the network entity 704 may be configured to receive the uplink beam reference signals on a plurality of transmit beams 706a-706h. The network entity 704 then performs beam measurements (e.g., RSRP, SINR, etc.) of the beam reference signals on each of the transmit beams 706a-706h to determine the respective beam quality of each of the receive beams 708a-708e as measured on each of the transmit beams 706a-706h.

The network entity 704 may then select one or more transmit beams on which to transmit unicast downlink control information and/or user data traffic to the UE 702. In some examples, the selected transmit beam(s) has (have) the highest RSRP. The UE 702 may then select a corresponding receive beam for each selected serving transmit beam to form a respective beam pair link (BPL) for each selected serving transmit beam, using, for example, a P3 beam management procedure, as described above.

In one example, a single transmit beam (e.g., the transmit beam 706d) on the network entity 704 and a single receive beam (e.g., the receive beam 708c) on the UE 702 may form a single BPL used for communication between the network entity 704 and the UE 702. In another example, multiple transmit beams (e.g., transmit beams 706c, 706d, and 706e) on the network entity 704 and a single receive beam (e.g., receive beam 708c) on the UE 702 may form respective BPLs used for communication between the network entity 704 and the UE 702. In another example, multiple transmit beams (e.g., transmit beams 706c, 706d, and 706e) on the network entity 704 and multiple receive beams (e.g., receive beams 708c and 708d) on the UE 702 may form multiple BPLs used for communication between the network entity 704 and the UE 702. In this example, a first BPL may include the transmit beam 706c and the receive beam 708c, a second BPL may include the transmit beam 708d and the receive beam 708c, and a third BPL may include the transmit beam 708e and the receive beam 708d.

In some examples, to select one or more downlink transmit beams and one or more downlink receive beams for communication with a UE 702, the network entity 704 may transmit a reference signal, such as an SSB or CSI-RS, on each of a plurality of downlink transmit beams in a beam-sweeping manner. The UE 702 may measure the reference signal received power (RSRP) on each of the downlink transmit beams using one or more downlink receive beams on the UE 702 and transmit a beam measurement report to the network entity 704 indicating the RSRP of each of the measured downlink transmit beams. The network entity 704 may then select one or more serving downlink beams (e.g., downlink transmit beams and downlink receive beams) for communication with the UE 702 based on the beam measurement report. The resulting selected downlink transmit beam and downlink receive beam may form a downlink beam pair link. In other examples, when the channel is reciprocal, the network entity 704 may derive the particular downlink beam(s) to communicate with the UE 702 based on uplink measurements of one or more uplink reference signals, such as sounding reference signals (SRSs).

In some examples, uplink beams (e.g., uplink transmit beam(s) at the UE 702 and uplink receive beam(s) at the network entity 704) may be selected by measuring the RSRP of received uplink reference signals (e.g., SRSs) or downlink reference signals (e.g., SSBs or CSI-RSs) during an uplink or downlink beam sweep. For example, the network entity 704 may determine the uplink beams either by uplink beam management via an SRS beam sweep with measurement at the network entity 704 or by downlink beam management via an SSB/CSI-RS beam sweep with measurement at the UE 702. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 8:
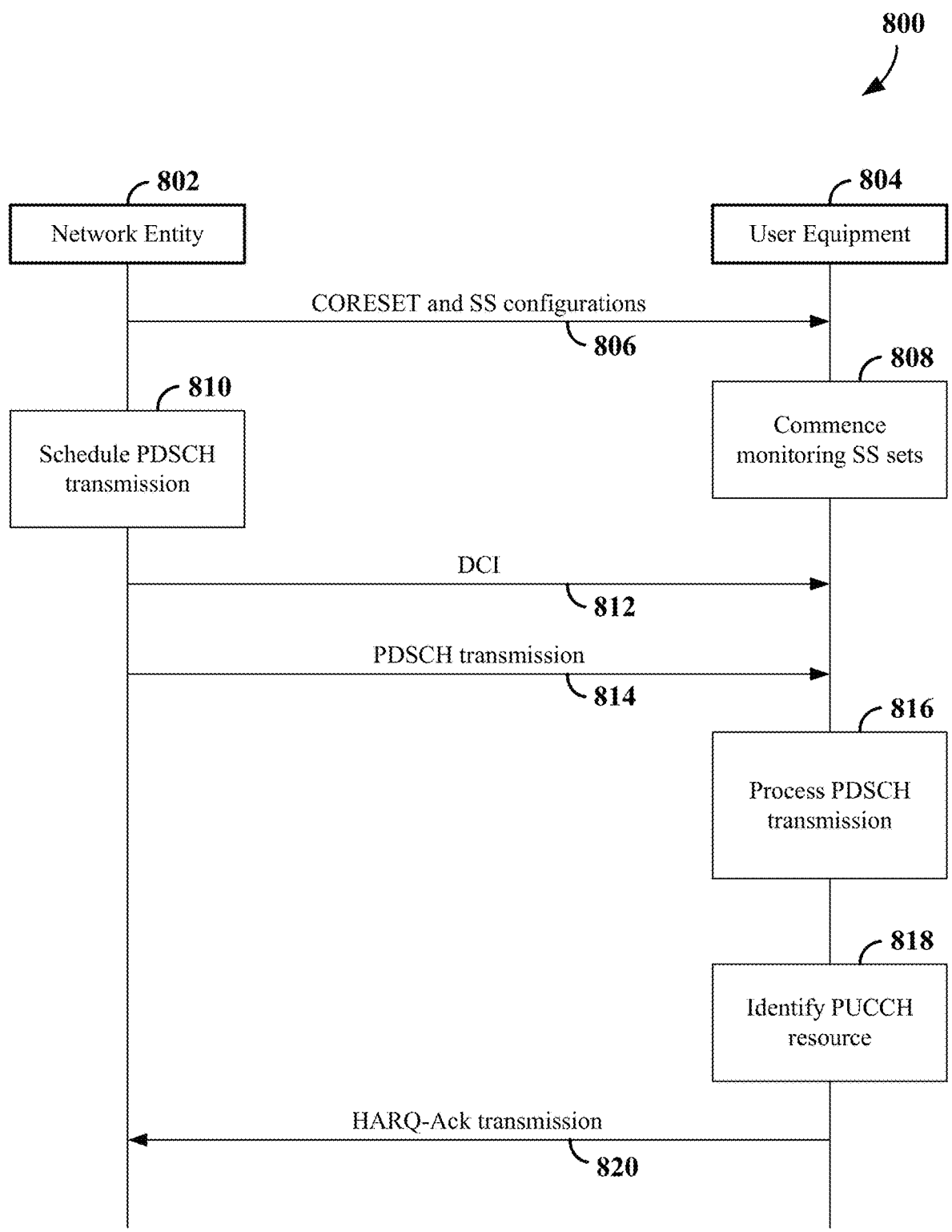
FIG. 8 is a signaling diagram illustrating an example of downlink control information-related signaling according to some aspects.

FIG. 8 is a signaling diagram 800 illustrating an example of PDSCH-related signaling in a wireless communication system including a network entity 802 and a user equipment (UE) 804. In some examples, the network entity 802 may correspond to any of the base stations, CUs, DUs, RUs, or scheduling entities shown in any of FIGS. 1-25. In some examples, the UE 804 may correspond to any of the UEs or scheduled entities shown in any of FIGS. 1-25.

At 806 of FIG. 8, the network entity 802 transmits (e.g., via RRC messaging) CORESET and search space (SS) configurations that the UE 804 is to use for receiving information from the network entity 802. For example, a CORESET configuration for the UE may specify the RBs and the number of symbols for each CORESET configured for the UE 804. In addition, an SS configuration may specify, for each configured SS set, the associated CORESET, PDCCH monitoring occasion (MO) information, PDCCH candidates, and so on.

At 808, the UE 804 repeatedly monitors the configured SS sets to determine whether the network entity 802 has transmitted any messages to the UE 804. In some aspects, this may involve blind decoding for PDCCH candidates in a search space configured for the UE 804.

At 810, at some point in time, the network entity 802 schedules a PDSCH transmission for the UE 804. In some examples, the network entity 802 may schedule a PDSCH transmission and an associated PUCCH transmission (e.g., for a HARQ-Ack). Accordingly, at 812, the network entity 802 transmits a DCI to the UE 804, where the DCI may indicate a PDSCH resource for the PDSCH transmission and a PUCCH resource for a HARQ-Ack. At 814, the network entity 802 transmits the PDSCH transmission to the UE 804.

At 816, the UE 804 attempts to decode the PDSCH transmission and generates a HARQ-Ack to be sent to the network entity 802 to indicate whether the UE 804 successfully received the PDSCH transmission. Thus, at 818, the UE 804 will identify the PUCCH resource for sending the HARQ-Ack to the network entity 802 (e.g., based on information in the DCI received at 812). At 820, the UE 804 transmits the HARQ-Ack transmission on the PUCCH resource identified at 818.

In 5G NR, when a network entity is transmitting more than four layers (e.g., MIMO layers) to a UE, two codewords (CWs) output by respective coding chains of a transmitter may be mapped to different layers of one PDSCH. For example, for five layers, the first codeword (CW) may be mapped to the first two layers and the second CW may be mapped to the remaining three layers (2+3). If a higher-layer parameter maxNrofCode WordsScheduledByDCI is set to a value of two (2), the DCI that schedules the PDSCH (e.g., DCI format 1_1) may include separate MCS, new data indicator (NDI), and redundancy vector (RV) fields for the two CWs and/or for two transport blocks (TBs) as shown in Table 1.

TABLE 1

For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits Other scheduling parameters may be the same for the two scheduled CWs. Examples of these other scheduling parameters may include a HARQ identifier (HARQ ID), a frequency domain resource allocation (FDRA), a time domain resource allocation (TDRA), a precoding resource block group (PRG) size, etc.

In some scenarios (e.g., for a broadcast channel), rate-splitting may be used to achieve a larger degree of freedom and/or capacity than may otherwise be achieved using non-rate-splitting techniques. Consequently, rate-splitting may be used in 5G, 5G-advanced, 6G, and/or other networks to improve communication performance. In rate-splitting, the messages of individual users (e.g., messages destined for different UEs) are split into common and private parts for transmission. Here, the common part may include common information that is being sent to all users (e.g., a broadcast message). Conversely, the private part may include information that is unique to the corresponding UE.

Figure 9:
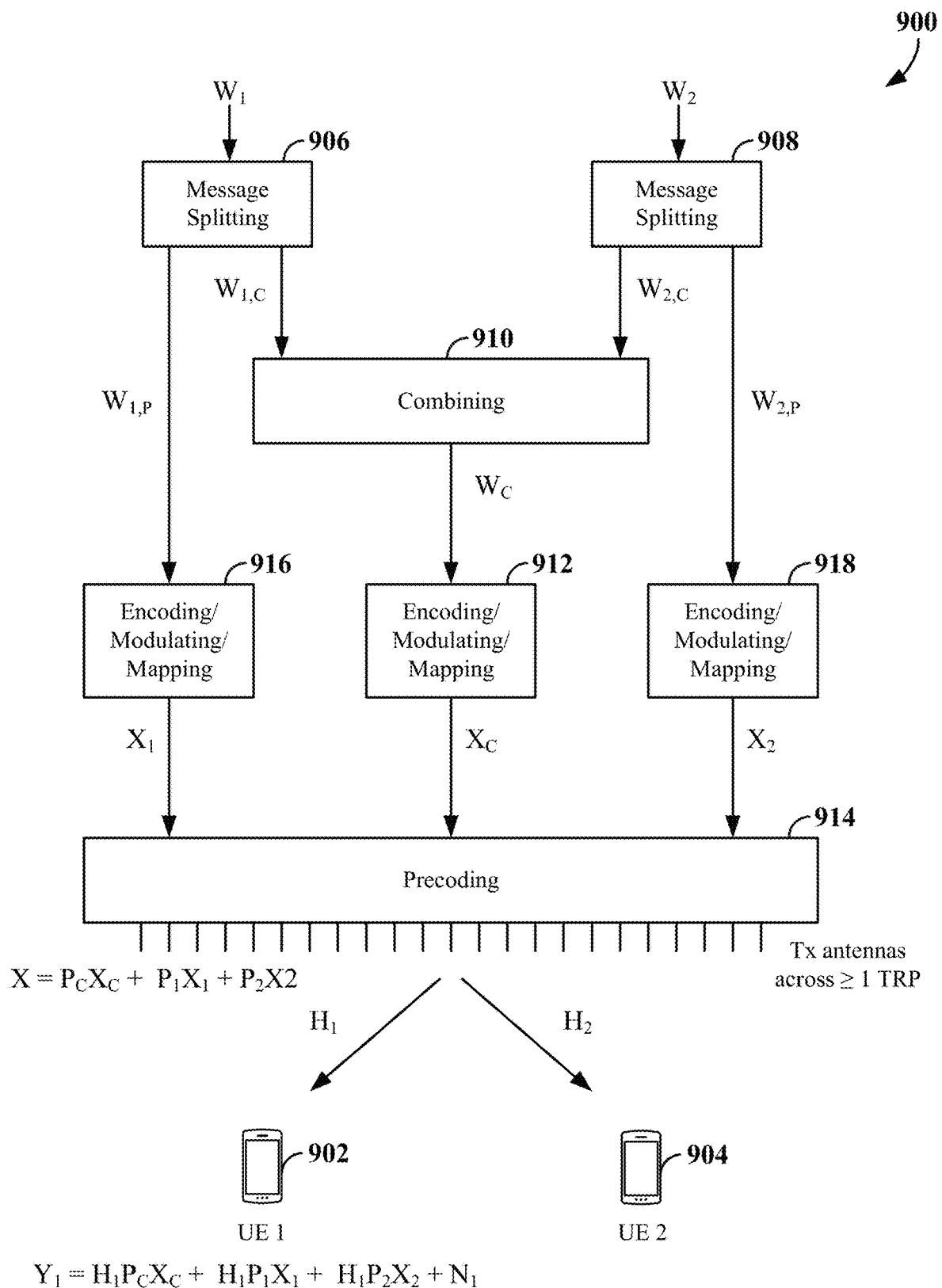
FIG. 9 is diagram illustrating an example of rate-splitting-related operations at a transmitter according to some aspects.

FIG. 9 illustrates an example of rate-splitting operations 900 that may be performed at a transmitter (e.g., of a network entity) that is sending a first message $W_1$ to a first UE 902 and a second message $W_2$ to a second UE 904. A message splitter 906 splits the first message $W_1$ into a common part $W_{1,C}$ and a private part $W_{1,P}$. Similarly, a message splitter 908 splits the second message $W_2$ into a common part $W_{2,C}$ and a private part $W_{2,P}$.

A combiner 910 combines the common parts of the individual messages into a common message $W_c$. An encoder/modulator/mapper 912 encodes, modulates, and maps (e.g., to one or more layers) the common message $W_c$ to $X_c$. $X_c$ may be referred to as a common stream, and can have one or more layers. A precoder 914 precodes the common stream $X_c$ by $P_c$, and the resulting signal is transmitted by transmit (Tx) antennas (e.g., from one TRP/gNB, or from multiple TRPs in a coordinated multi-point (CoMP) scenario).

The private part of individual messages are separately encoded and modulated to private streams for the corresponding UE. These private streams are then precoded and transmitted by the Tx antennas (e.g., from one TRP/gNB, or from multiple TRPs in a COMP scenario).

In the example of FIG. 9, an encoder/modulator/mapper 916 encodes, modulates, and maps (e.g., to one or more layers) the private part of the individual message $W_{1,P}$ to a private stream $X_1$. The precoder 914 precodes the private stream $X_1$ by $P_1$, and the resulting signal is transmitted by the Tx antennas.

Similarly, an encoder/modulator/mapper 918 encodes, modulates, and maps (e.g., to one or more layers) the private part of the individual message $W_{2,P}$ to a private stream $X_2$. The precoder 914 precodes the private stream $X_2$ by $P_2$, and the resulting signal is transmitted by the Tx antennas.

As indicated in FIG. 9, the signal transmitted by the Tx antennas may be represented as $X=P_C X_C+P_1 X_1+P_2 X_2$. This transmitted signal is subjected to a first channel $H_1$ associated with the path from the Tx antennas to the first UE 902 and a second channel $H_2$ associated with the path from the Tx antennas to the second UE 904. The signal received at the first UE 902 may be represented as $Y_1=H_1 P_C X_C+H_1 P_1 X_1+H_1 P_2 X_2+N_1$, where $N_1$ represents the noise associated with the first channel $H_1$. The signal received at the second UE 904 may be represented as $Y_2=H_2 P_C X_C+H_2 P_1 X_1+H_2 P_2 X_2+N_2$, where $N_2$ represents the noise associated with the second channel $H_2$.

At the receiver side, in some examples, each UE may decode the common message first. This approach may serve two purposes. First, some part of the individual message for each UE ($W_{1,C}$ and $W_{2,C}$, respectively) is embedded in the common message ($W_C$), which is the data intended for the corresponding UE. Thus, the decoding of the common message recovers this data. Second, the decoding of the common message may be used in conjunction with successive interference cancelation to decode the private message.

Figure 10:
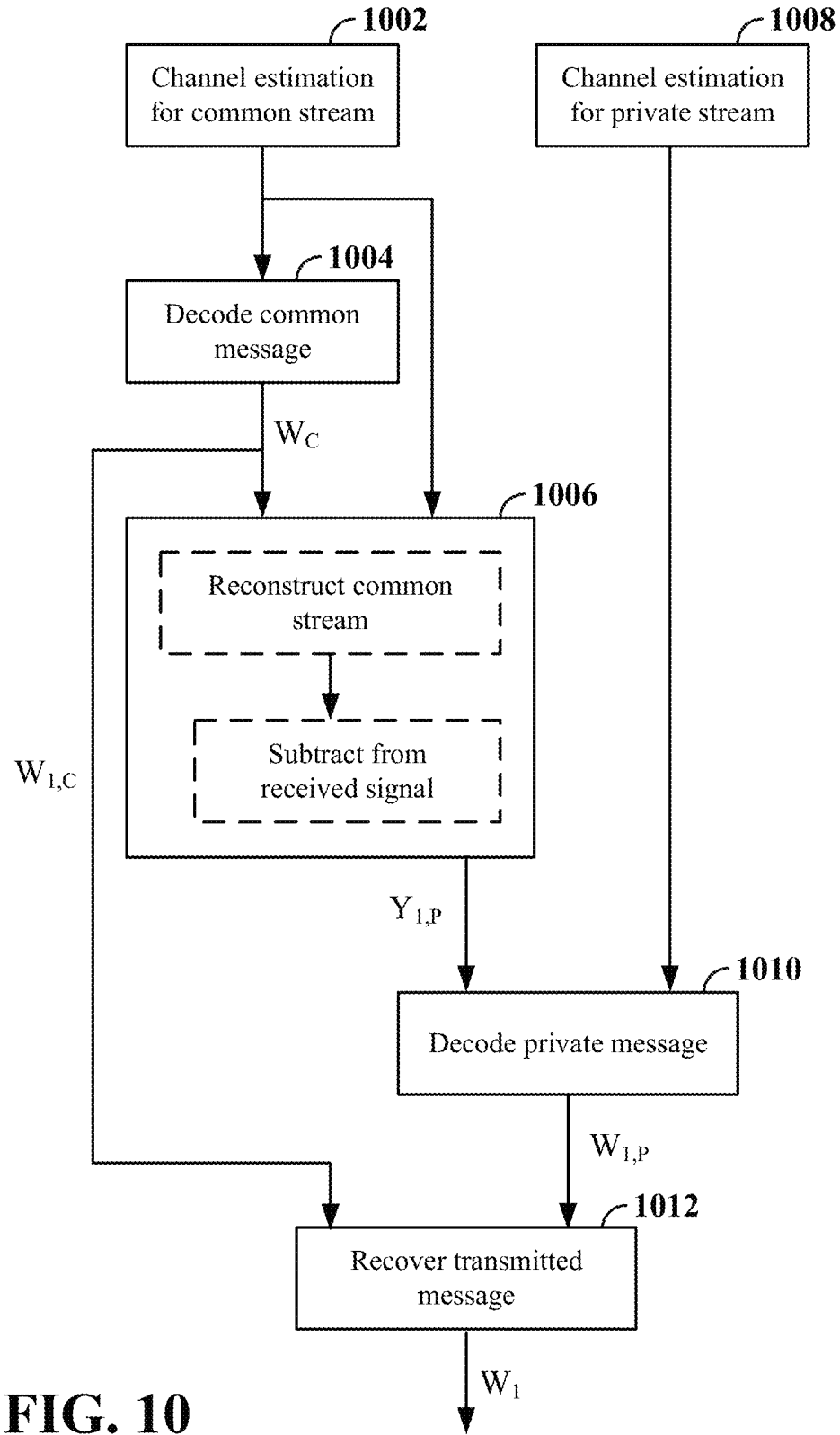
FIG. 10 is diagram illustrating an example of rate-splitting-related operations at a receiver according to some aspects.
Figure 11:
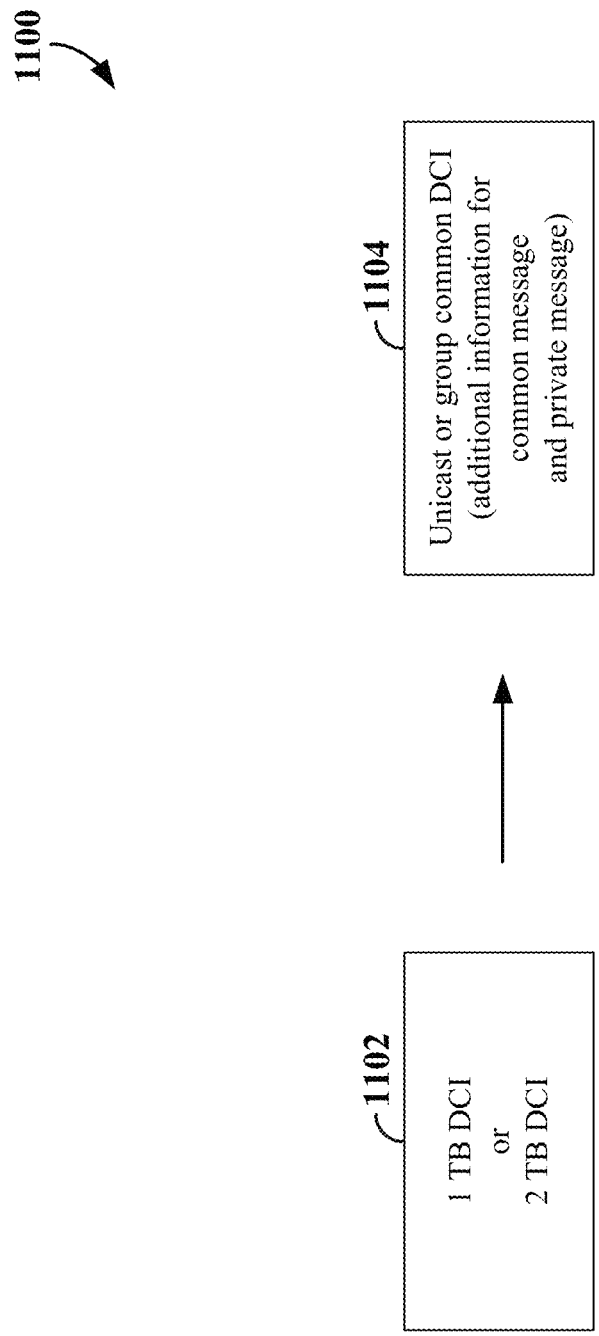
FIG. 11 is a conceptual illustration of an example of a two-stage downlink control information (DCI) according to some aspects.

FIG. 10 illustrates an example of operations 1000 that may be performed at a receiver (e.g., of the first UE 902) that receives the signal $Y_1$. A first channel estimator 1002 estimates the effective channel corresponding to the common stream $H_1 P_C$. A decoder 1004 decodes the common message $W_C$ from the received signal $Y_1$ based on this channel estimation. An encoder 1006 re-encodes the common message $W_c$ to the common stream $X_c$, multiplies the result by the estimated effective channel, and subtracts this result from received signal $Y_1$. Assuming ideal channel estimation and successful decoding, $Y_{1,p} = Y_1 - H_1 P_C X_C = H_1 P_1 X_1 + H_1 P_2 X_2 + N_1$.

A second channel estimator 1008 estimates the effective channel corresponding to the private stream $H_1 P_1$. A decoder 1010 decodes the private message using this channel estimation and $Y_{1,p}$. The first UE 902 may thereby recover the original signal $W_1$ based on the common part $W_{1,C}$ and the private part $W_{1,P}$ as represented by block 1012. It may thus be observed that having an accurate channel estimation of the common stream $H_1 P_c$ is important in a rate-splitting scheme. An accurate channel estimation not only helps to increase the chance of decoding the common message successfully, but also assists in reconstructing the private message via successive interference cancelation.

In a rate-splitting scheme as discussed above, it may be seen that a single TB may be split into two streams: a common stream and a private stream. In some aspects, these streams may be treated as two TBs, which could result in separate DCIs, with associated overhead, being used to schedule the transmission of the streams. For example, a network entity may transmit a first DCI that includes the transmission parameters that the UE is to use to decode a common message sent by the network entity. In addition, the network entity may transmit a second DCI that includes the transmission parameters that the UE is to use to decode a private message sent by the network entity.

The disclosure relates in some aspects to techniques for reducing DCI overhead associated with a rate-split transmission and/or the transmission of multiple TBs. In some examples, these techniques may be employed when the total number of layers is less than five. In some examples, these techniques may be employed for 5G, 5G-advance, 6G, and/or other communication technologies. In some examples, these techniques may be employed for RSMA, TDMA, FDMA, CDMA, SCMA, and/or other access technologies.

The disclosure relates in some aspects to using protocol layer 2 (L2) and/or protocol layer 3 (L3) configurations to indicate common message parameters. For example, an L2 and/or L3 (L2/L3) configuration may be employed in scenarios where the MCS and the precoder/beam for the common message may change relatively slowly. In this case, the common message parameters (e.g., MCI) may be less dynamic since they may be common across multiple UEs and the associated beam is a wide angle beam. Hence, common message parameters may be less dynamically configured (e.g., configured less frequently than the parameters for the private message).

The disclosure relates in some aspects to using a two-stage DCI, where the first stage (first DCI) is used for the private message and the second stage (second DCI) is used for common message, or vice versa.

The disclosure relates in some aspects to flexible configurations of TDRA, FDRA, PRG size, other parameters, or a combination of such parameters. For example, different TDRAs, FDRAs, PRG sizes, etc., may be used for a private message and a common message.

The above techniques may be employed for a two-TB DCI or when rate-splitting is done on a single TB, but where each stream may have different parameters (e.g., in one or more of transmission time, frequency, RV index, MCS, the number layers, etc. In such cases, reducing the size of the DCI or the number of DCIs sent may reduce overhead and/or improve communication performance.

In some examples, a network entity (e.g., a gNB) may use an L2/L3 configuration (e.g., MAC-CE or RRC signaling) to indicate an MCS delta between a private message and a common message. In some aspects this may enable the network entity to avoid the use of a two-TB DCI when rate-splitting is performed on a single TB (e.g., with less than four total layers). For example, this technique may be used when the transmission parameters (except the delta MCS) are common between the private message and the common message. In some examples, the delta MCS may be defined apriori (e.g., prior to sending the DCIs).

In some examples, a network entity may use an L2/L3 configuration (e.g., MAC-CE or RRC signaling) to indicate a particular RV index to be used for a common message. For example, a network entity may indicate an absolute RV index in conjunction with a delta MCS or some other parameter.

In some examples, a network entity may use an L2/L3 configuration (e.g., MAC-CE or RRC signaling) to indicate the absolute MCS and RV index for a first message (e.g., a common message). This technique may be used, for example, when the MCS and/or RV index is common across multiple UEs. Thus, in this case, the network entity may send a single DCI with an MCS and/or RV index value. In some examples, for the two TB scenario, the same HARQ ID, FDRA, TDRA, PRG size, etc., may be specified for both TBs.

In some examples, a network entity may use an L2/L3 configuration (e.g., MAC-CE or RRC signaling) to indicate one or more of a TDRA, an FDRA, a DMRS configuration, or a number of streams for a first message (e.g., either a common message or a private message). In this case, the network entity may then indicate in a DCI the parameter values for the other message (e.g., the private message or the common message) in a similar manner as is conventionally done for a single TB. If one or more delta parameters were provided via an L2/L3 configuration, the UE can use the delta values to determine the common message parameters. If the absolute values of the common message TDRA, FDRA, DMRS configuration, number of streams, etc., are L2/L3 configured, the UE may use those values directly.

Rate-splitting may be used in a single TB scenario or a two TB scenario. Conventionally, the same FDRA, TDRA, PRG size parameters are used for the different messages or TBs. In some cases, the use of the same parameters may be an undesirable restriction (e.g., in a rate-splitting scenario).

The disclosure relates in some aspects to providing for a more flexible configuration of parameters. For example, a two stage DCI may be used as shown in the diagram 1100 of FIG. 11. Here, a network entity may transmit a first DCI 1102 (e.g., as in a conventional one TB rate-splitting scenario or a two TB scenario). In addition, the network entity may transmit a second DCI 1104 (e.g., a unicast DCI or a group common DCI) that provides additional information for a common message and/or a private message.

In some examples, for the case of rate-splitting under one TB or for the case of two TBs where different TDRAs, FDRAs, or other parameters are defined for different messages, a network entity may use a two-stage DCI. In some aspects, each stage may be defined with a reasonable size and for reliability.

The first stage DCI (for one TB DCI or two TB DCI) can be similar to a conventional DCI, and also indicate whether the DCI is associated with a rate-split (e.g., indicated using a particular radio network temporary identifier (RNTI) or a particular search space) or whether there is a second stage (these indications can be L2/L3 configured as well). In some examples, the network entity may send the DCI using a particular RNTI to indicate whether the DCI is associated with a rate-split or whether there is a second stage. In some examples, the network entity may send the DCI using a particular search space to indicate whether the DCI is associated with a rate-split or whether there is a second stage. In some examples, a network entity may use an L2/L3 configuration (e.g., MAC-CE or RRC signaling) to indicate whether the DCI is associated with a rate-split or whether there is a second stage.

In the second stage DCI, the network entity may indicate the TDRA, FDRA PRG size, or other parameters for the second message. For example, in some cases, the network entity may indicate the private message parameters in the first stage DCI and indicate the common message parameters in the second stage DCI (e.g., a group common DCI, common to both UEs). In some cases, the network entity may indicate the common message parameters in the first stage DCI and indicate the private message parameters in the second stage DCI.

In some scenarios, the private message MCS may be close or equal to the common message MCS. For example, the MCSs for private and common messages may be similar or equal in high reliability communication applications (e.g., cross reality (XR) or ultra-reliable low-latency communication (URLLC)) where low MCS values are used. As another example, the MCSs for private and common messages may be similar or equal in scenarios whether the channel is poor at individual UEs.

The disclosure relates in some aspects to a network entity indicating to a UE that the UE can use the parameters specified by a single DCI for both a private message and a common message. For example, in a first transmission, when the MCS and RV index of the two messages is the same (e.g., due to a low signal-to-noise ratio (SNR) at the UEs, for far cell cases, or for increased reliability communications), a network entity can use a higher-layer parameter maxNrofCodeWordsScheduledByDCI set to a value of one (1) to reduce the DCI size (e.g., a DCI includes parameters for only one message), and use a particular RNTI for scheduling_2 TBs_rate_split (or any similar meaning) to indicate to the UE that there are two messages but that the UE is to use a single set of message parameters for the two messages. As another example, in a first transmission, if a network entity used an L2/L3 configuration (e.g., MAC-CE or RRC signaling) to configure the above common message MCS and RV index, the network entity can use a higher-layer parameter maxNrofCode WordsScheduledByDCI set to a value of one (1) to reduce the DCI size, and use a particular RNTI for scheduling_2 TBs_rate_split (or any similar meaning) to indicate to the UE that there are two messages but that the UE is to use a single set of message parameters for the two messages. Of note, in the above examples, a second DCI would not need to carry MCS and RV index parameters.

In the event the network entity retransmits both TBs (e.g., upon receiving corresponding NACKs from at least one UE), the network entity may use the technique described above, set the corresponding NDI equal to one (1), and use the HARQ-ID to indicate whether this is the same rate-split message or a new rate-split message.

The disclosure relates in some aspects to defining joint parameters for one or more of the TDRA, FDRA, MCS, RV, number of layers, etc., parameters of the common message and the private message and using an index to indicate which parameter or parameters are to be used to receive one or more of the messages. In this way, the signaling used for indicating such parameters may be reduced as compared to, for example, a scenario where the network entity sends the absolute parameter values to the UE. Here, different sets of parameters may be indicated by an L2/L3 configuration (e.g., MAC-CE or RRC signaling), indicated by pre-configuration (e.g., defined by a wireless communication standard), or indicated in some other manner.

In some examples, a network entity may use an L2/L3 configuration (e.g., MAC-CE or RRC signaling) to send to a UE an indication of different sets of parameters for two messages (e.g., a common message and a private message), along with corresponding index values for each set of parameters. For example, the network entity may send the information represented by the table 1200 of FIG. 12 to a UE via an L2/L3 configuration. As another example, the information represented by the table 1200 of FIG. 12 may be preconfigured in the UE. The network entity may then set a configuration index sent in a DCI to indicate to the UE which set of parameters is to be used for receiving the messages. For example, if the network entity sends a DCI including an index value of two (2) to the UE, the UE may use a TDRA index value of six (6) for receiving the common message and use a TDRA index value of four (4) for receiving the private message.

Figure 13:
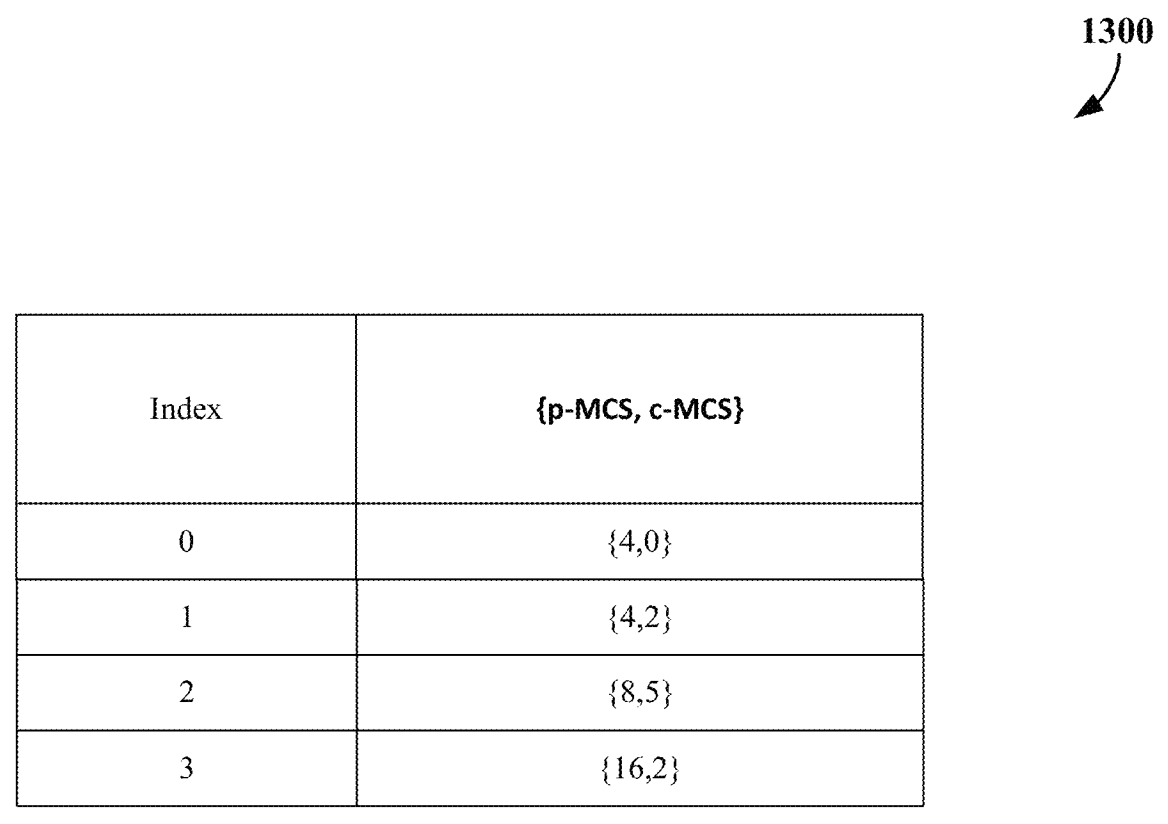

In some examples, the network entity may send the information represented by the table 1300 of FIG. 13 to a UE via an L2/L3 configuration to define a joint MCS state for two messages. As another example, the information represented by the table 1300 of FIG. 13 may be preconfigured in the UE. The network entity may then set a configuration index sent in a DCI to indicate to the UE which set of parameters is to be used for receiving the messages. For example, if the network entity sends a DCI including an index value of one (1) to the UE, the UE may use an MCS index value of four (4) for receiving the private message and use an MCS index value of two (2) for receiving the common message.

In some examples, a network entity may use an L2/L3 configuration (e.g., MAC-CE or RRC signaling) to send to a UE an indication of different sets of parameters for a single message (e.g., a common message or a private message), along with corresponding index values for each set of parameters. For example, the network entity may send the information represented by the table 1400 of FIG. 14 to a UE via an L2/L3 configuration. As another example, the information represented by the table 1400 of FIG. 14 may be preconfigured in the UE. The network entity may then set a configuration index sent in a DCI to indicate to the UE which set of parameters is to be used for receiving a message. For example, if the network entity sends a DCI including an index value of two (2) to the UE, the UE may use an MCS index value of eight (8) for receiving a private message and use a TDRA index value of five (5) for receiving the private message.

In some examples, a network entity may use an L2/L3 configuration (e.g., MAC-CE or RRC signaling) to send to a UE an indication of different sets of deltas (e.g., delta thresholds) for two messages (e.g., a common message and a private message), along with corresponding index values for each set of deltas. The network entity may then set a configuration index sent in a DCI to indicate to the UE which set of deltas is to be used for receiving a message. For example, if the network entity sends to a UE a first DCI including a particular index value and a second DCI indicating a particular MCS value, the UE may use an MCS delta index value of two (2) and the particular MCS value for receiving a private message and use an MCS delta value of one (1) and the particular MCS value for receiving the private message.

The disclosure relates in some aspects to indicating whether a retransmission is for a common stream or a private stream. For example, if a network entity retransmits both TBs after a same MCS/RV index DCI scenario (e.g., in the first stage DCI there is only one set of parameters indicated for the common part), then the network entity may use a higher-layer parameter maxNrofCodeWordsScheduledByDCI set to a value of two (2) (so that the common DCI contains two sets of parameters), and exploit the fields of the second TB with replaced parameters to indicate whether the retransmission is for the common stream or the private stream. For example, the network entity may use one NDI to indicate whether there is a retransmission (NDI=0) or a new transmission (NDI=1) for the common stream and use another NDI to indicate whether there is a retransmission (NDI=0) or a new transmission (NDI=1) for the private stream.

In some examples, a network entity may use a cyclic redundancy check (CRC) of the common message to select or scramble a DMRS configuration pattern or ID for a TB. For example, the network entity may scramble the common message using a CRC based on a particular CRC index to indicate the DMRS configuration pattern or ID for the private message, or vice versa. In this way, the configuration overhead for the second TB may be further reduced.

Figure 15:
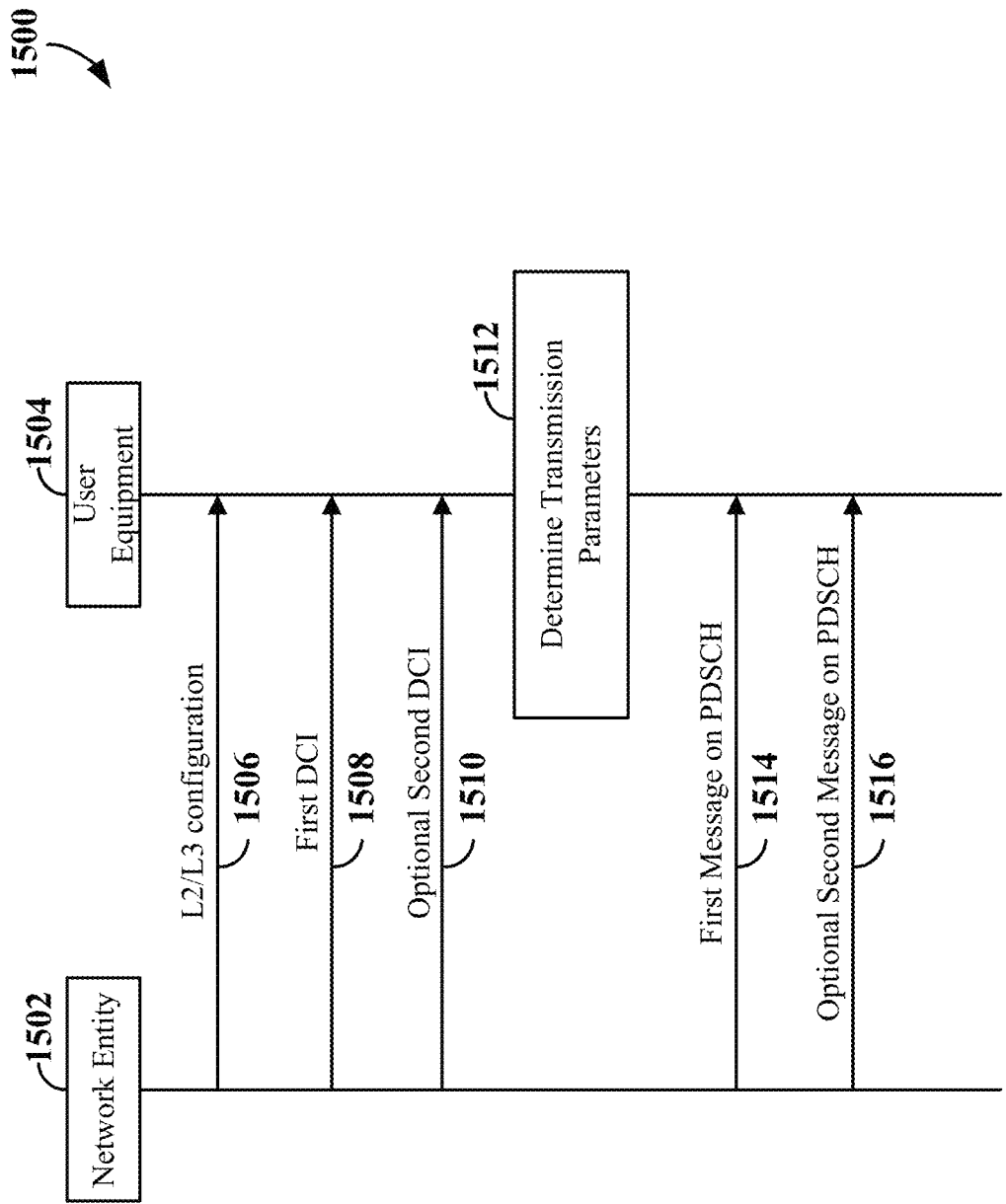
FIG. 15 is a signaling diagram illustrating an example of DCI-related signaling according to some aspects.

FIG. 15 is a signaling diagram 1500 illustrating an example of DCI-related signaling in a wireless communication system including a network entity 1502 and a user equipment 1504. In some examples, the network entity 1502 may correspond to any of the base stations, CUs, DUs, RUs, or scheduling entities shown in any of FIGS. 1-25. In some examples, the user equipment 1504 may correspond to any of the UEs, or scheduled entities shown in any of FIGS. 1-25.

At #1506 of FIG. 15, the network entity 1502 sends an L2 message and/or a L3 message to the user equipment 1504 (e.g., via RRC signaling or some other type of signaling). In some examples, the L2 message and/or the L3 message may configure the manner in which message parameters (e.g., transmission parameters) will be sent to the user equipment 1504. As discussed herein, an MCS delta, an RV index, or other parameters may be sent at #1506. In some examples, an indication of whether a two-stage DCI is being used may be sent at #1506.

At #1508, the network entity 1502 sends a first DCI to the user equipment 1504. In some examples, the first DCI may include at least one transmission parameter as discussed herein. In some examples, the first DCI indicate whether a two-stage DCI is being used. In some examples, the first DCI may indicate that the same transmission parameters may be used to receive a common message and a private message. In some examples, the first DCI may include an index value. In some examples, the first DCI may indicate whether a retransmission is for a common message or a private message.

At optional #1510, the user equipment 1504 may send a second DCI to the user equipment 1504. In some examples, the second DCI may include at least one transmission parameter as discussed herein. The second DCI may be omitted, for example, in scenarios where the network entity 1502 used the same transmission parameters (e.g., MCI, etc.) to send a common message and a private message to the user equipment 1504. The second DCI may be omitted, for example, in scenarios where the network entity 1502 used an index to indicate transmission parameters (e.g., MCI, etc.).

At #1512, the user equipment 1504 determines one or more transmission parameters that the network entity 1502 will use to send messages to the user equipment 1504 via a PDSCH. For example, in a scenario where the first DCI included a delta value associated with a first transmission parameter, the user equipment 1504 may use the delta value and a second transmission parameter received via the first or second DCI to determine the first transmission parameter.

At #1514, the user equipment 1504 receives a first message from the network entity 1502 via a PDSCH based, at least in part, on one or more transmission parameters determined at #1512. For example, the user equipment 1504 may receive a common message or a message associated with a first TB.

At optional #1516, the user equipment 1504 may receive a second message from the network entity 1502 via the PDSCH based, at least in part, on one or more transmission parameters determined at #1512. For example, the user equipment 1504 may receive a private message or a message associated with a second TB.

In some implementations, the teachings herein may be implemented in a peer-to-peer network. In this case, the functionality of the network entities discussed herein may be implemented by one of the peer-to-peer devices (e.g., sidelink devices such as UEs). In addition, the DCI functionality discussed herein may be implemented using peer-to-peer control information (e.g., in this case, downlink refers to a link from a first UE to a second UE, and uplink refers to a link from the second UE to the first UE). Furthermore, the channels referred to herein may be peer-to-peer (e.g., sidelink) channels.

Figure 16:
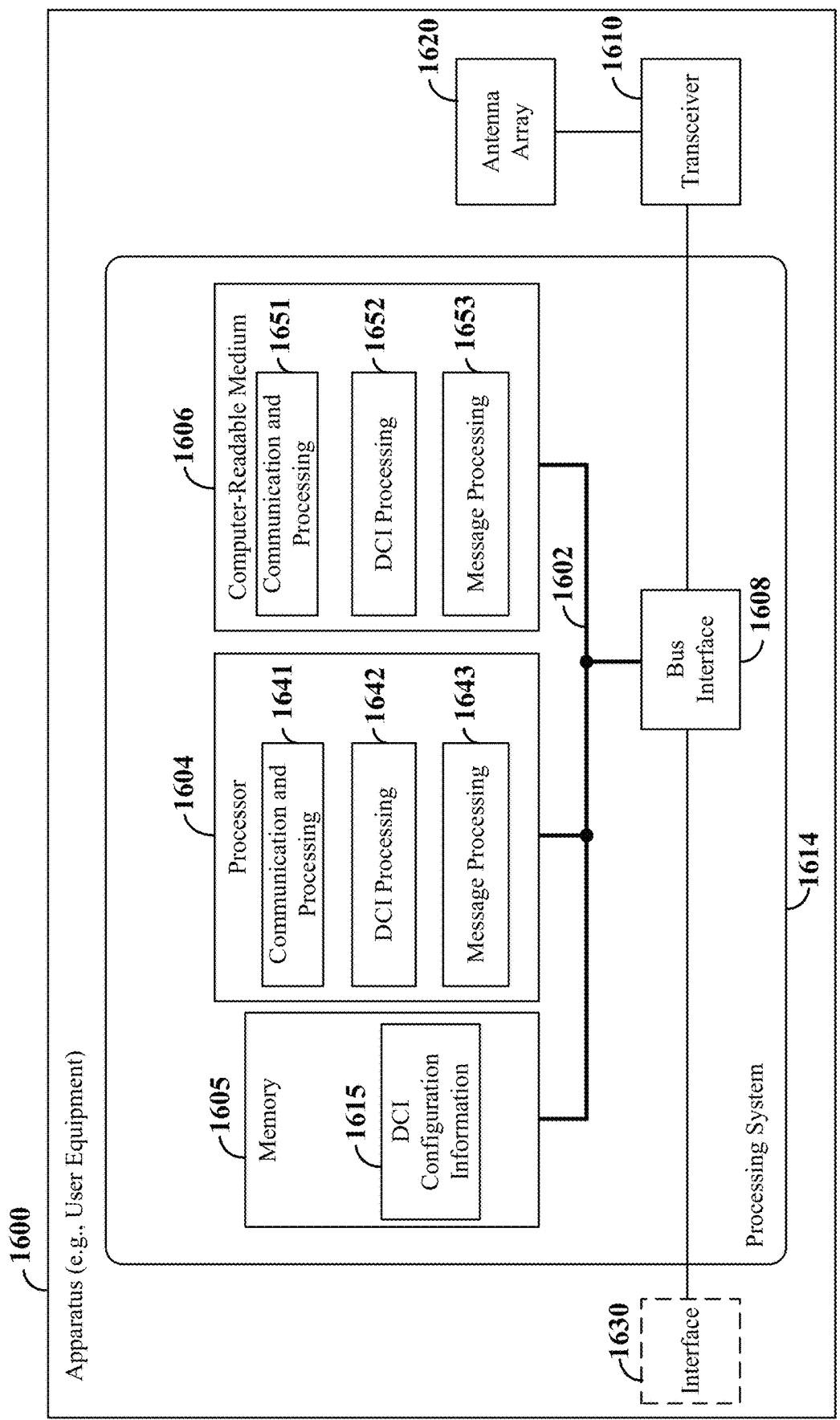
FIG. 16 is a block diagram conceptually illustrating an example of a hardware implementation for an apparatus (e.g., a user equipment) employing a processing system according to some aspects.

FIG. 16 is a block diagram illustrating an example of a hardware implementation for an apparatus 1600 employing a processing system 1614. For example, the apparatus 1600 may be a device configured to wirelessly communicate in a network as discussed in any of FIGS. 1-25. In some implementations, the apparatus 1600 may correspond to any of the UEs, sidelink devices, D2D devices, or scheduled entities shown in any of FIGS. 1-25.

In accordance with various aspects of the disclosure, an element, or any portion of an element, or any combination of elements may be implemented with the processing system 1614. The processing system 1614 may include one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1600 may be configured to perform any one or more of the functions described herein. That is, the processor 1604, as utilized in an apparatus 1600, may be used to implement any one or more of the processes and procedures described herein.

The processor 1604 may in some instances be implemented via a baseband or modem chip and in other implementations, the processor 1604 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602, a transceiver 1610 and an antenna array 1620 and between the bus 1602 and an interface 1630. The transceiver 1610 provides a communication interface or means for communicating with various other apparatus over a wireless transmission medium. The interface 1630 provides a communication interface or means of communicating with various other apparatuses and devices (e.g., other devices housed within the same apparatus as the apparatus 1600 or other external apparatuses) over an internal bus or external transmission medium, such as an Ethernet cable. Depending upon the nature of the apparatus, the interface 1630 may include a user interface (e.g., keypad, display, speaker, microphone, joystick). Of course, such a user interface is optional, and may be omitted in some examples, such as an IoT device.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software. For example, the memory 1605 may store DCI configuration information 1615 (e.g., indicative of information carried by DCI) used by the processor 1604 for the communication operations described herein.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1600 may be configured to perform any one or more of the operations described herein (e.g., as described above in conjunction with FIGS. 1-15 and as described below in conjunction with FIGS. 17-20). In some aspects of the disclosure, the processor 1604, as utilized in the apparatus 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple scheduled entities. The processor 1604 may be configured to schedule resources for the transmission of downlink signals. The processor 1604 may further be configured to schedule resources for the transmission of uplink signals.

In some aspects of the disclosure, the processor 1604 may include communication and processing circuitry 1641. The communication and processing circuitry 1641 may be configured to communicate with a user equipment. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

The communication and processing circuitry 1641 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1641 may further be configured to receive a scheduling request from a UE for an uplink grant or a sidelink grant.

In some implementations where the communication involves receiving information, the communication and processing circuitry 1641 may obtain information from a component of the apparatus 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may receive one or more of signals, messages, SCIs, feedback, other information, or any combination thereof. In some examples, the communication and processing circuitry 1641 may receive information via one or more of a PSCCH, a PSSCH, a PSFCH, some other type of channel, or any combination thereof. In some examples, the communication and processing circuitry 1641 and/or the transceiver 1610 may include functionality for a means for receiving. In some examples, the communication and processing circuitry 1641 may include functionality for a means for decoding. In some examples, the communication and processing circuitry 1641 may include functionality for a means for receiving information from a network entity.

In some implementations where the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may send one or more of signals, messages, SCIs, feedback, other information, or any combination thereof. In some examples, the communication and processing circuitry 1641 may send information via one or more of a PSCCH, a PSSCH, a PSFCH, some other type of channel, or any combination thereof. In some examples, the communication and processing circuitry 1641 and/or the transceiver 1610 may include functionality for a means for transmitting. In some examples, the communication and processing circuitry 1641 may include functionality for a means for encoding. In some examples, the communication and processing circuitry 1641 may include functionality for a means for transmitting information to a network entity.

The processor 1604 may include DCI processing circuitry 1642 configured to perform DCI processing-related operations as discussed herein (e.g., one or more of the operations described above in conjunction with FIGS. 8-15). The DCI processing circuitry 1642 may be configured to execute DCI processing software 1652 included on the computer-readable medium 1606 to implement one or more functions described herein.

The DCI processing circuitry 1642 may include functionality for a means for obtaining a DCI (e.g., as described above in conjunction with FIGS. 8-15). For example, the DCI processing circuitry 1642 may receive a DCI from a network entity (e.g., via a PDCCH).

The DCI processing circuitry 1642 may include functionality for a means for processing a DCI (e.g., as described above in conjunction with FIGS. 8-15). For example, the DCI processing circuitry 1642 may decode a DCI based on an RNTI, a search space, and/or other information.

The processor 1604 may include message processing circuitry 1643 configured to perform message processing-related operations as discussed herein (e.g., one or more of the operations described above in conjunction with FIGS. 8-15). The message processing circuitry 1643 may be configured to execute message processing software 1653 included on the computer-readable medium 1606 to implement one or more functions described herein.

The message processing circuitry 1643 may include functionality for a means for performing a message processing operation (e.g., as described above in conjunction with FIGS. 8-15). For example, the message processing circuitry 1643 may perform PDCCH BLER operations to determine whether a message processing instance has occurred. As another example, the message processing circuitry 1643 may determine whether a threshold number of message processing instances have occurred during a defined period of time.

The message processing circuitry 1643 may include functionality for a means for obtaining a message (e.g., as described above in conjunction with FIGS. 8-15). For example, the message processing circuitry 1643 may receive a message from a network entity (e.g., via a PDSCH).

The message processing circuitry 1643 may include functionality for a means for obtaining a retransmission (e.g., as described above in conjunction with FIGS. 8-15). For example, the message processing circuitry 1643 may receive a retransmission of message sent by a network entity (e.g., via a PDSCH).

The message processing circuitry 1643 may include functionality for a means for outputting a message (e.g., as described above in conjunction with FIGS. 8-15). For example, the message processing circuitry 1643 may send a message to a network entity (e.g., via a PUSCH).

The message processing circuitry 1643 may include functionality for a means for decoding (e.g., as described above in conjunction with FIGS. 8-15). For example, the message processing circuitry 1643 may decode a message received from a network entity.

Figure 17:
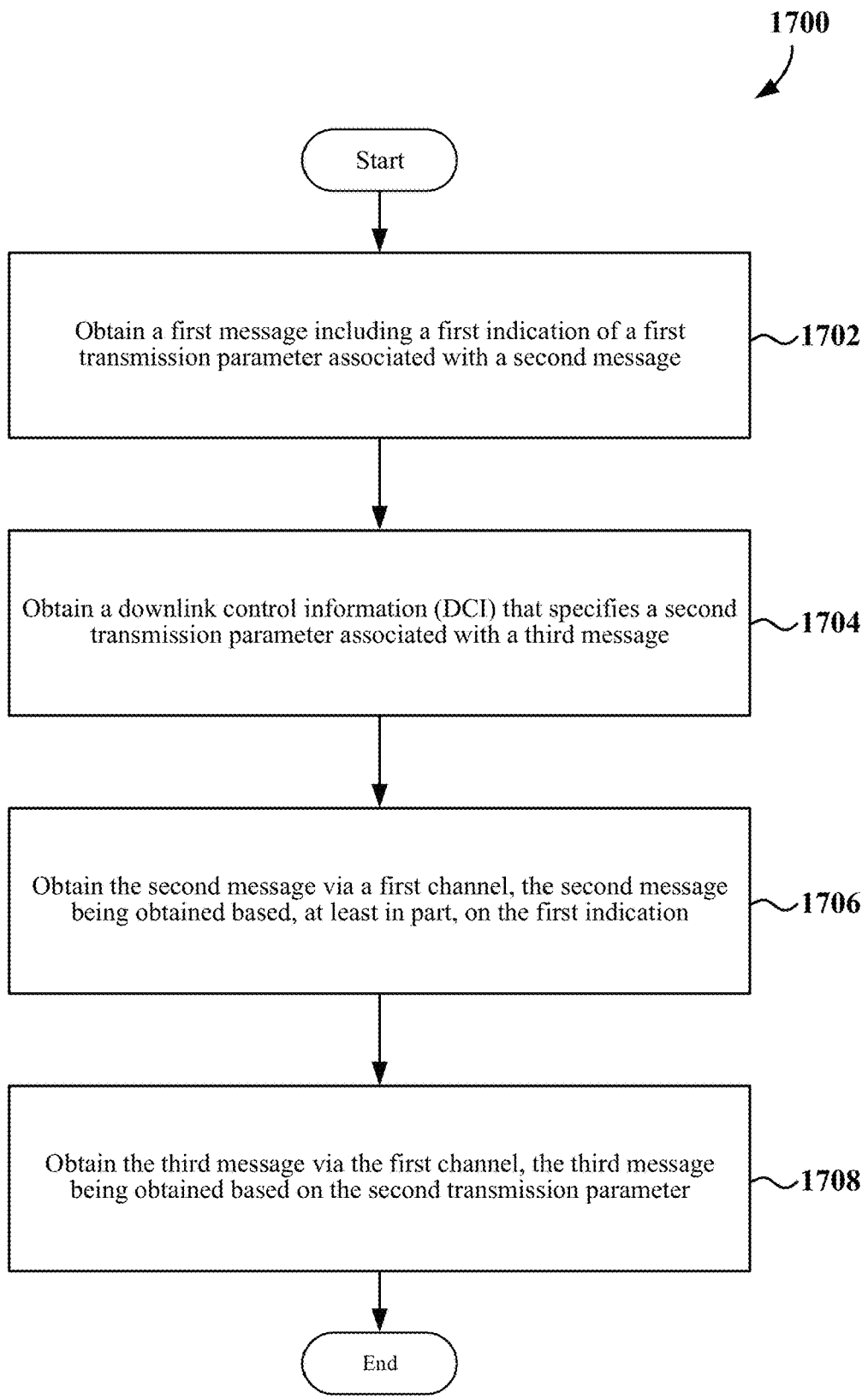
FIG. 17 is a flow chart illustrating an example communication method involving obtaining transmission parameters via DCI according to some aspects.

FIG. 17 is a flow chart illustrating an example method 1700 for communication in accordance with some aspects of the present disclosure. As described below, some or all illustrated features may be omitted in a particular implementation within the scope of the present disclosure, and some illustrated features may not be required for implementation of all examples. In some examples, the method 1700 (e.g., a method for wireless communication) may be carried out by the apparatus 1600 illustrated in FIG. 16. In some examples, the method 1700 may be carried out by any suitable apparatus or means for carrying out the functions or algorithm described below.

At block 1702, an apparatus may obtain a first message comprising a first indication of a first transmission parameter associated with a second message. In some examples, the message processing circuitry 1643, shown and described in FIG. 16, may provide a means to obtain a first message comprising a first indication of a first transmission parameter associated with a second message. In some examples, the message processing circuitry 1643 together with the communication and processing circuitry 1641 and the transceiver 1610, shown and described in FIG. 16, may provide a means to obtain a first message comprising a first indication of a first transmission parameter associated with a second message. In some examples, the communication and processing circuitry 1641 and/or the transceiver 1610, shown and described in FIG. 16, may provide a means to obtain a first message comprising a first indication of a first transmission parameter associated with a second message.

At block 1704, an apparatus may obtain a downlink control information (DCI) that specifies a second transmission parameter associated with a third message. In some examples, the DCI processing circuitry 1642, shown and described in FIG. 16, may provide a means to obtain a downlink control information (DCI) that specifies a second transmission parameter associated with a third message. In some examples, the DCI processing circuitry 1642 together with the communication and processing circuitry 1641 and the transceiver 1610, shown and described in FIG. 16, may provide a means to obtain a downlink control information (DCI) that specifies a second transmission parameter associated with a third message. In some examples, the communication and processing circuitry 1641 and/or the transceiver 1610, shown and described in FIG. 16, may provide a means to obtain a downlink control information (DCI) that specifies a second transmission parameter associated with a third message.

At block 1706, an apparatus may obtain the second message via a first channel, the second message being obtained based, at least in part, on the first indication. In some examples, the message processing circuitry 1643, shown and described in FIG. 16, may provide a means to obtain the second message via a first channel, the second message being obtained based, at least in part, on the first indication. In some examples, the message processing circuitry 1643 together with the communication and processing circuitry 1641 and the transceiver 1610, shown and described in FIG. 16, may provide a means to obtain the second message via a first channel, the second message being obtained based, at least in part, on the first indication. In some examples, the communication and processing circuitry 1641 and/or the transceiver 1610, shown and described in FIG. 16, may provide a means to obtain the second message via a first channel, the second message being obtained based, at least in part, on the first indication.

At block 1708, an apparatus may obtain the third message via the first channel, the third message being obtained based on the second transmission parameter. In some examples, the message processing circuitry 1643, shown and described in FIG. 16, may provide a means to obtain the third message via the first channel, the third message being obtained based on the second transmission parameter. In some examples, the message processing circuitry 1643 together with the communication and processing circuitry 1641 and the transceiver 1610, shown and described in FIG. 16, may provide a means to obtain the third message via the first channel, the third message being obtained based on the second transmission parameter. In some examples, the communication and processing circuitry 1641 and/or the transceiver 1610, shown and described in FIG. 16, may provide a means to obtain the third message via the first channel, the third message being obtained based on the second transmission parameter.

In some examples, the first channel is a PDSCH. In some examples, the first message may include a layer 2 message, a layer 3 message, a medium-access control-control element (MAC-CE), or a radio resource control (RRC) message.

In some examples, the second message may include a common message associated with a broadcast to a plurality of apparatuses, including the apparatus, and the third message may include a private message associated with a transmission to the apparatus, or the second message may include the private message and the third message may include the common message.

In some examples, the second message may include a common message associated with a broadcast to a plurality of apparatuses, including the apparatus, the third message may include a private message associated with a transmission to the apparatus, the first transmission parameter may include a first modulation and coding scheme (MCS) associated with the broadcast of the common message, and the second transmission parameter may include a second MCS associated with the transmission of the private message.

In some examples, the apparatus may obtain a fourth message specifying a third transmission parameter associated with transmission of the second message, and the second message is obtained further based on the third transmission parameter.

In some examples, the third transmission parameter may include a redundancy version (RV) index, and the fourth message may include a layer 2 message, a layer 3 message, a medium-access control-control element (MAC-CE), or a radio resource control (RRC) message.

In some examples, the first indication indicates at least one delta between the first transmission parameter and the second transmission parameter, and the second message is obtained further based on the second transmission parameter and the at least one delta.

In some examples, the at least one delta may include at least one of a first difference between a first modulation and coding scheme (MCS) associated with the second message and a second MCS associated with the third message, a second difference between a first redundancy version (RV) index associated with the second message and a second RV index associated with the third message, a third difference between a first time domain resource allocation (TDRA) associated with the second message and a second TDRA associated with the third message, a fourth difference between a first frequency domain resource allocation (FDRA) associated with the second message and a second FDRA associated with the third message, a fifth difference between a first demodulation reference signal (DMRS) configuration associated with the second message and a second DMRS configuration associated with the third message, or a sixth difference between a first quantity of streams associated with the second message and a second quantity of streams associated with the third message.

In some examples, the first indication specifies the first transmission parameter, and the second message is obtained further based on the first transmission parameter.

In some examples, the first transmission parameter may include a modulation and coding scheme (MCS), a redundancy version (RV) index, a time domain resource allocation (TDRA), a frequency domain resource allocation (FDRA), a demodulation reference signal (DMRS) configuration, or a quantity of streams.

In some examples, a cyclic redundancy check (CRS) index associated with the second message indicates a demodulation reference signal (DMRS) configuration pattern or identifier associated with the third message, and the apparatus may decode the third message based on the DMRS configuration pattern or identifier.

In some examples, the apparatus may include a transceiver configured to receive the first message, the DCI, the second message, and the third message, wherein the apparatus is configured as a user equipment.

Figure 18:
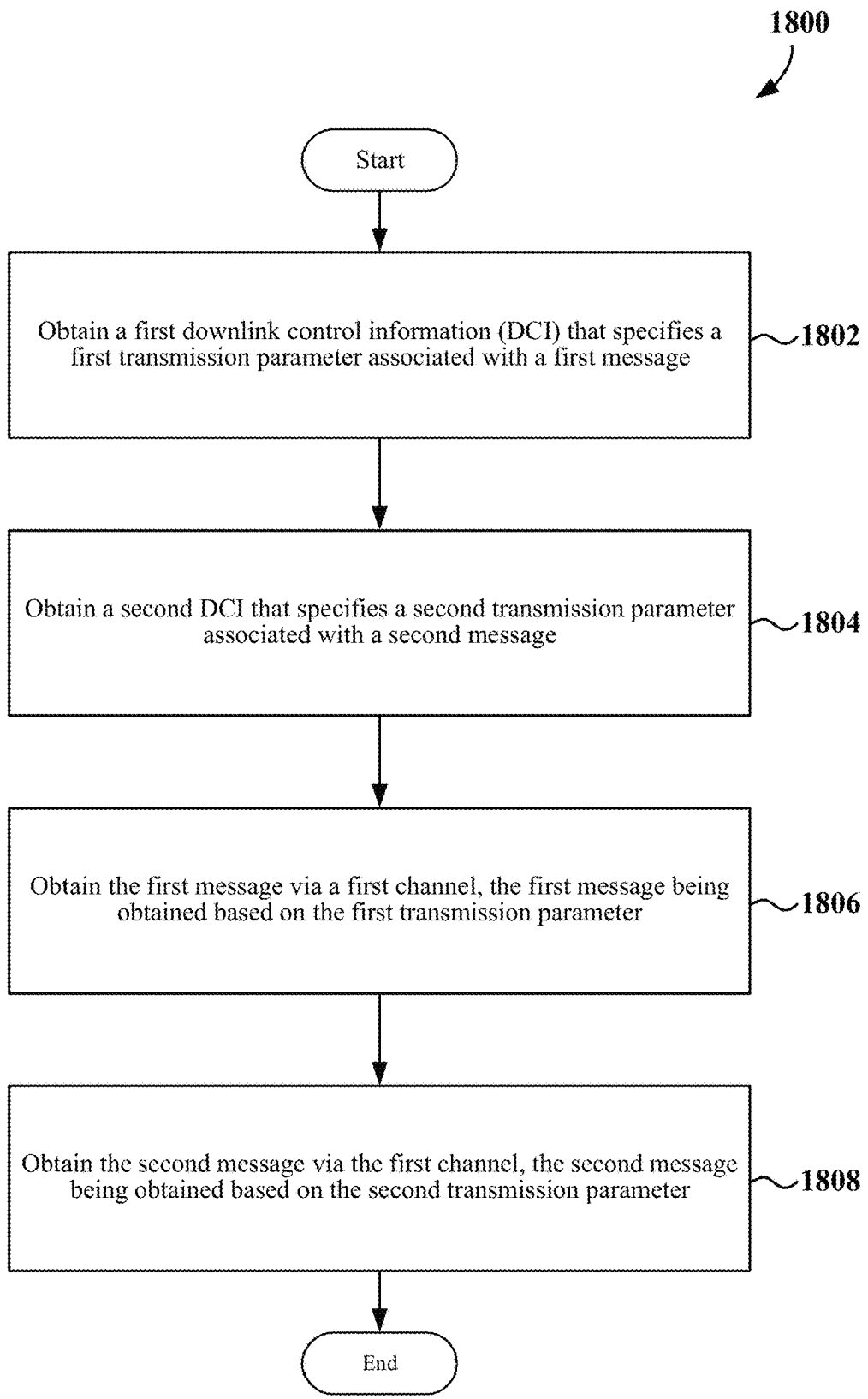
FIG. 18 is a flow chart illustrating an example communication method involving obtaining transmission parameters via DCI according to some aspects.

FIG. 18 is a flow chart illustrating an example method 1800 for communication in accordance with some aspects of the present disclosure. As described below, some or all illustrated features may be omitted in a particular implementation within the scope of the present disclosure, and some illustrated features may not be required for implementation of all examples. In some examples, the method 1800 (e.g., a method for wireless communication) may be carried out by the apparatus 1600 illustrated in FIG. 16. In some examples, the method 1800 may be carried out by any suitable apparatus or means for carrying out the functions or algorithm described below.

At block 1802, an apparatus may obtain a first downlink control information (DCI) that specifies a first transmission parameter associated with a first message. In some examples, the DCI processing circuitry 1642, shown and described in FIG. 16, may provide a means to obtain a first downlink control information (DCI) that specifies a first transmission parameter associated with a first message. In some examples, the DCI processing circuitry 1642 together with the communication and processing circuitry 1641 and the transceiver 1610, shown and described in FIG. 16, may provide a means to obtain a first downlink control information (DCI) that specifies a first transmission parameter associated with a first message. In some examples, the communication and processing circuitry 1641 and/or the transceiver 1610, shown and described in FIG. 16, may provide a means to obtain a first downlink control information (DCI) that specifies a first transmission parameter associated with a first message.

At block 1804, an apparatus may obtain a second DCI that specifies a second transmission parameter associated with a second message. In some examples, the DCI processing circuitry 1642, shown and described in FIG. 16, may provide a means to obtain a second DCI that specifies a second transmission parameter associated with a second message. In some examples, the DCI processing circuitry 1642 together with the communication and processing circuitry 1641 and the transceiver 1610, shown and described in FIG. 16, may provide a means to obtain a second DCI that specifies a second transmission parameter associated with a second message. In some examples, the communication and processing circuitry 1641 and/or the transceiver 1610, shown and described in FIG. 16, may provide a means to obtain a second DCI that specifies a second transmission parameter associated with a second message.

At block 1806, an apparatus may obtain the first message via a first channel, the first message being obtained based on the first transmission parameter. In some examples, the message processing circuitry 1643, shown and described in FIG. 16, may provide a means to obtain the first message via a first channel, the first message being obtained based on the first transmission parameter. In some examples, the message processing circuitry 1643 together with the communication and processing circuitry 1641 and the transceiver 1610, shown and described in FIG. 16, may provide a means to obtain the first message via a first channel, the first message being obtained based on the first transmission parameter. In some examples, the communication and processing circuitry 1641 and/or the transceiver 1610, shown and described in FIG. 16, may provide a means to obtain the first message via a first channel, the first message being obtained based on the first transmission parameter.

At block 1808, an apparatus may obtain the second message via the first channel, the second message being obtained based on the second transmission parameter. In some examples, the message processing circuitry 1643, shown and described in FIG. 16, may provide a means to obtain the second message via the first channel, the second message being obtained based on the second transmission parameter. In some examples, the message processing circuitry 1643 together with the communication and processing circuitry 1641 and the transceiver 1610, shown and described in FIG. 16, may provide a means to obtain the second message via the first channel, the second message being obtained based on the second transmission parameter. In some examples, the communication and processing circuitry 1641 and/or the transceiver 1610, shown and described in FIG. 16, may provide a means to obtain the second message via the first channel, the second message being obtained based on the second transmission parameter.

In some examples, the first channel is a PDSCH. In some examples, the first message and the second message are associated with a first transmission via a single transport block based on rate-splitting, or a second transmission via a first transport block and a second transport block, wherein at least one of a first time domain resource allocation (TDRA) or a first frequency domain resource allocation (FDRA) is associated with the first transport block, and wherein at least one of a second TDRA or a second FDRA is associated with the second transport block.

In some examples, the first DCI may include an indication of whether the first message and the second message are associated with rate-splitting.

In some examples, the first DCI may include an indication of whether the first message and the second message are associated with two DCIs.

In some examples, the apparatus may obtain a third message including a first indication of whether the first message and the second message are associated with rate-splitting or a second indication of whether the first message and the second message are associated with two DCIs.

In some examples, the third message may include a layer 2 message, a layer 3 message, a medium-access control-control element (MAC-CE), or a radio resource control (RRC) message.

In some examples, the second DCI indicates at least one of a time domain resource allocation (TDRA) associated with the second message, a frequency domain resource allocation (FDRA) associated with the second message, or a precoding resource block group (PRG) size associated with the second message.

In some examples, the first message may include a common message associated with a broadcast to a plurality of apparatuses, including the apparatus, and the second message may include a private message associated with a transmission to the apparatus, or the first message may include the private message and the second message may include the common message.

In some examples, the first transmission parameter may include a first modulation and coding scheme (MCS) associated with the first message, a first redundancy version (RV) index associated with the first message, a first time domain resource allocation (TDRA) associated with the first message, a first frequency domain resource allocation (FDRA) associated with the first message, a first demodulation reference signal (DMRS) configuration associated with the first message, or a first quantity of streams associated with the first message, and the second transmission parameter may include a second MCS associated with the second message, a second RV index associated with the second message, a second TDRA associated with the second message, a second FDRA associated with the second message, a second DMRS configuration associated with the second message, or a second quantity of streams associated with the second message.

In some examples, the apparatus may include a transceiver configured to receive the first DCI, the second DCI, the first message, and the second message, wherein the apparatus is configured as a user equipment.

Figure 19:
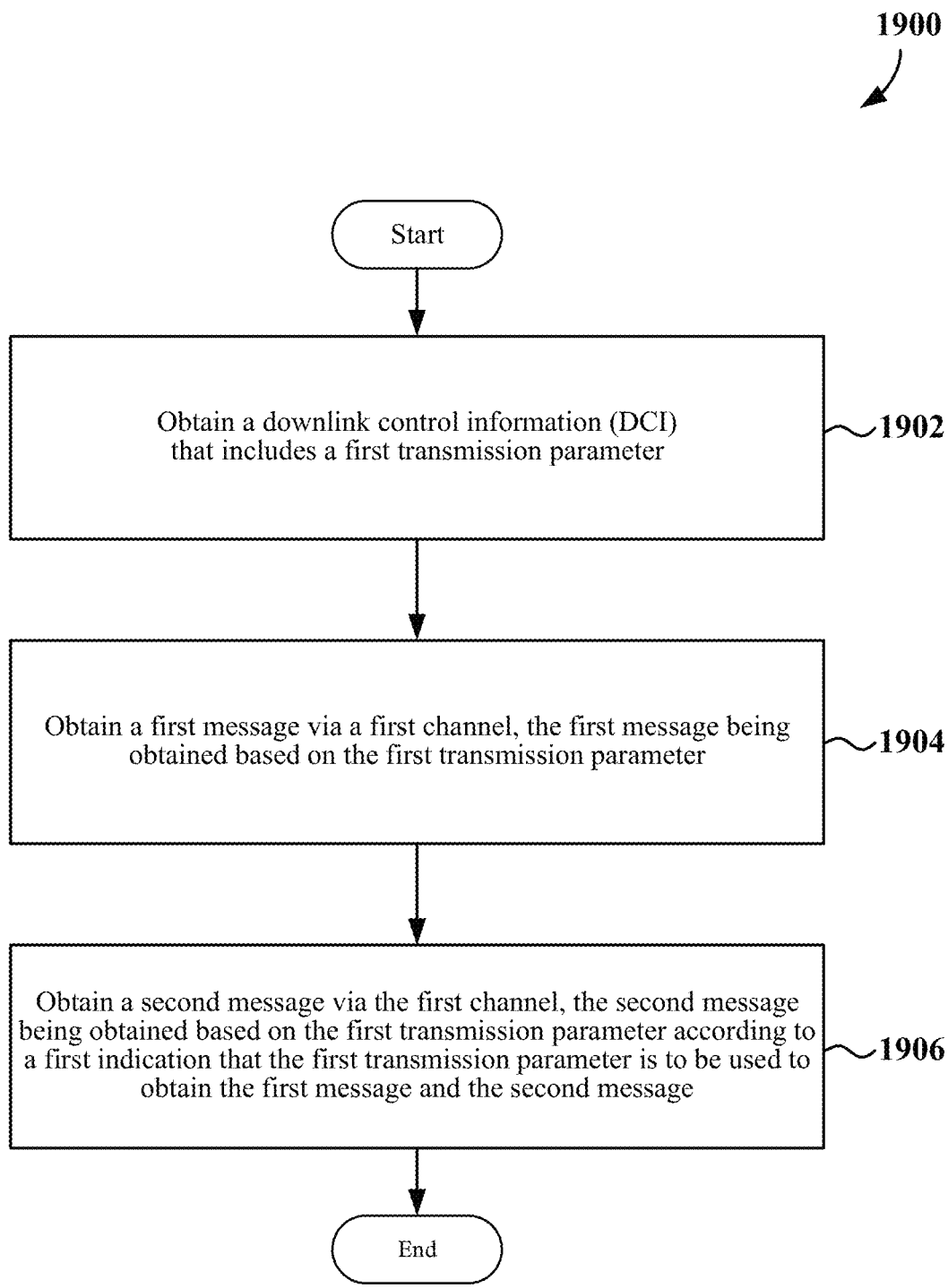
FIG. 19 is a flow chart illustrating an example communication method involving obtaining transmission parameters via DCI according to some aspects.

FIG. 19 is a flow chart illustrating an example method 1900 for communication in accordance with some aspects of the present disclosure. As described below, some or all illustrated features may be omitted in a particular implementation within the scope of the present disclosure, and some illustrated features may not be required for implementation of all examples. In some examples, the method 1900 (e.g., a method for wireless communication) may be carried out by the apparatus 1600 illustrated in FIG. 16. In some examples, the method 1900 may be carried out by any suitable apparatus or means for carrying out the functions or algorithm described below.

At block 1902, an apparatus may obtain a downlink control information (DCI) that comprises a first transmission parameter. In some examples, the DCI processing circuitry 1642, shown and described in FIG. 16, may provide a means to obtain a downlink control information (DCI) that comprises a first transmission parameter. In some examples, the DCI processing circuitry 1642 together with the communication and processing circuitry 1641 and the transceiver 1610, shown and described in FIG. 16, may provide a means to obtain a downlink control information (DCI) that comprises a first transmission parameter. In some examples, the communication and processing circuitry 1641 and/or the transceiver 1610, shown and described in FIG. 16, may provide a means to obtain a downlink control information (DCI) that comprises a first transmission parameter.

At block 1904, an apparatus may obtain a first message via a first channel, the first message being obtained based on the first transmission parameter. In some examples, the message processing circuitry 1643, shown and described in FIG. 16, may provide a means to obtain a first message via a first channel, the first message being obtained based on the first transmission parameter. In some examples, the message processing circuitry 1643 together with the communication and processing circuitry 1641 and the transceiver 1610, shown and described in FIG. 16, may provide a means to obtain a first message via a first channel, the first message being obtained based on the first transmission parameter. In some examples, the communication and processing circuitry 1641 and/or the transceiver 1610, shown and described in FIG. 16, may provide a means to obtain a first message via a first channel, the first message being obtained based on the first transmission parameter.

At block 1906, an apparatus may obtain a second message via the first channel, the second message being obtained based on the first transmission parameter according to a first indication that the first transmission parameter is to be used to obtain the first message and the second message. In some examples, the message processing circuitry 1643, shown and described in FIG. 16, may provide a means to obtain a second message via the first channel, the second message being obtained based on the first transmission parameter according to a first indication that the first transmission parameter is to be used to obtain the first message and the second message. In some examples, the message processing circuitry 1643 together with the communication and processing circuitry 1641 and the transceiver 1610, shown and described in FIG. 16, may provide a means to obtain a second message via the first channel, the second message being obtained based on the first transmission parameter according to a first indication that the first transmission parameter is to be used to obtain the first message and the second message. In some examples, the communication and processing circuitry 1641 and/or the transceiver 1610, shown and described in FIG. 16, may provide a means to obtain a second message via the first channel, the second message being obtained based on the first transmission parameter according to a first indication that the first transmission parameter is to be used to obtain the first message and the second message.

In some examples, the first channel is a PDSCH. In some examples, the first indication may include a maxNrofCodeWordsScheduledByDCI parameter that is set to a value of 1.

In some examples, the first indication may include a radio network temporary identifier (RNTI) associated with the DCI, the RNTI being set to a defined value.

In some examples, the apparatus may obtain a retransmission of the second message, wherein the retransmission of the second message is obtained based on the first transmission parameter according to a second indication that the first transmission parameter is to be used to obtain the retransmission of the second message.

In some examples, the second indication may include at least one of a new data indicator (NDI) parameter set to a value of 1, or a hybrid automatic repeat request identifier (HARQ-ID) set to a defined value.

In some examples, the first message may include a common message associated with a broadcast to a plurality of apparatuses, including the apparatus, and the second message may include a private message associated with a transmission to the apparatus, or the first message may include the private message and the second message may include the common message.

In some examples, the apparatus may obtain a retransmission of the first message or the second message, wherein the retransmission is obtained according to a maxNrofCodeWordsScheduledByDCI parameter being set to a value of 2 and a new data indicator (NDI) indicating whether the retransmission is associated with the first message or the second message.

In some examples, the apparatus may include a transceiver configured to receive the DCI, the first message, and the second message, wherein the apparatus is configured as a user equipment.

Figure 20:
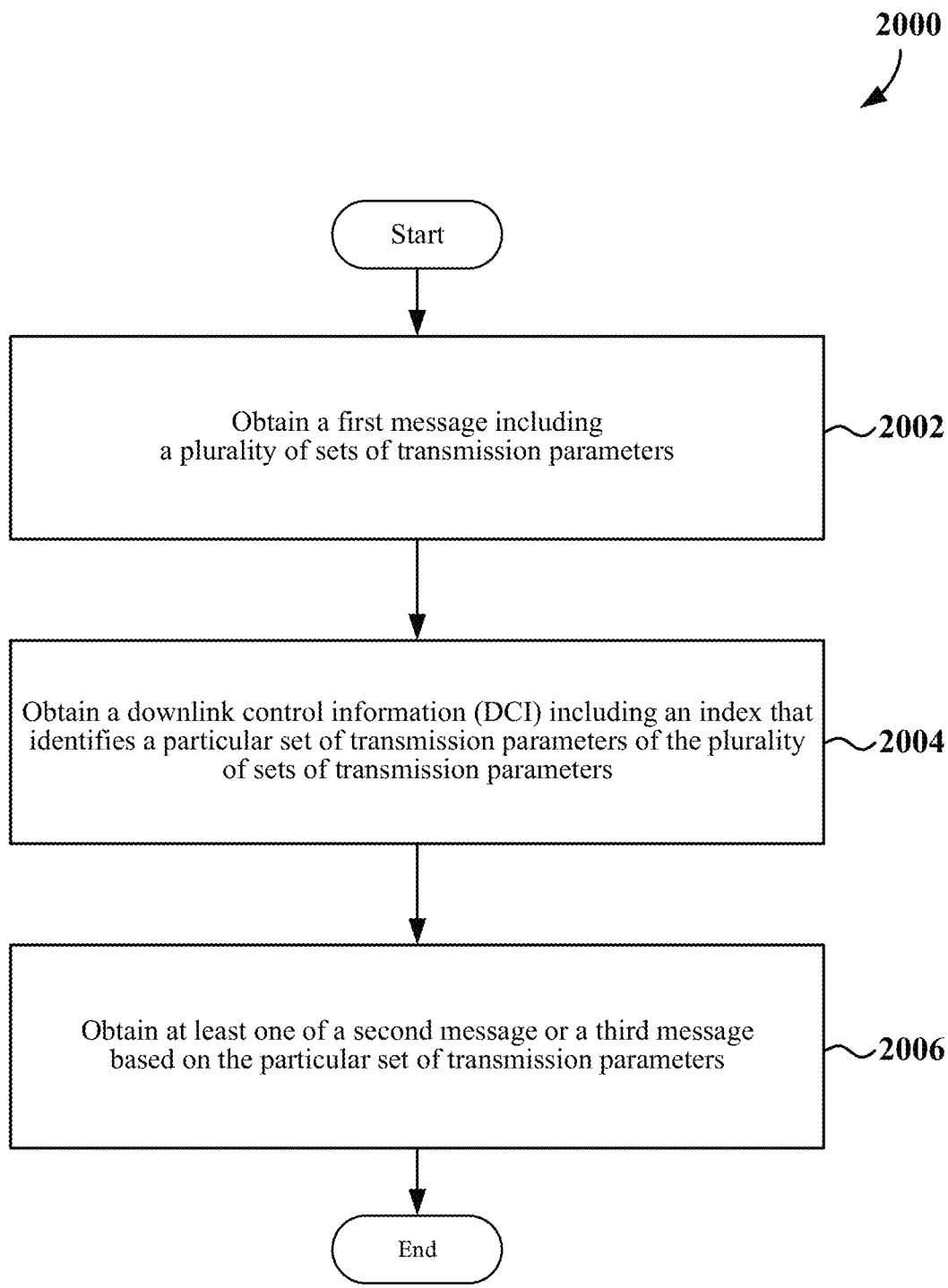
FIG. 20 is a flow chart illustrating an example communication method involving sets of transmission parameters via DCI according to some aspects.

FIG. 20 is a flow chart illustrating an example method 2000 for communication in accordance with some aspects of the present disclosure. As described below, some or all illustrated features may be omitted in a particular implementation within the scope of the present disclosure, and some illustrated features may not be required for implementation of all examples. In some examples, the method 2000 (e.g., a method for wireless communication) may be carried out by the apparatus 1600 illustrated in FIG. 16. In some examples, the method 2000 may be carried out by any suitable apparatus or means for carrying out the functions or algorithm described below.

At block 2002, an apparatus may obtain a first message comprising a plurality of sets of transmission parameters. In some examples, the message processing circuitry 1643, shown and described in FIG. 16, may provide a means to obtain a first message comprising a plurality of sets of transmission parameters. In some examples, the message processing circuitry 1643 together with the communication and processing circuitry 1641 and the transceiver 1610, shown and described in FIG. 16, may provide a means to obtain a first message comprising a plurality of sets of transmission parameters. In some examples, the communication and processing circuitry 1641 and/or the transceiver 1610, shown and described in FIG. 16, may provide a means to obtain a first message comprising a plurality of sets of transmission parameters.

At block 2004, an apparatus may obtain a downlink control information (DCI) comprising an index that identifies a particular set of transmission parameters of the plurality of sets of transmission parameters. In some examples, the DCI processing circuitry 1642, shown and described in FIG. 16, may provide a means to obtain a downlink control information (DCI) comprising an index that identifies a particular set of transmission parameters of the plurality of sets of transmission parameters. In some examples, the DCI processing circuitry 1642 together with the communication and processing circuitry 1641 and the transceiver 1610, shown and described in FIG. 16, may provide a means to obtain a downlink control information (DCI) comprising an index that identifies a particular set of transmission parameters of the plurality of sets of transmission parameters. In some examples, the communication and processing circuitry 1641 and/or the transceiver 1610, shown and described in FIG. 16, may provide a means to obtain a downlink control information (DCI) comprising an index that identifies a particular set of transmission parameters of the plurality of sets of transmission parameters.

At block 2006, an apparatus may obtain at least one of a second message or a third message based on the particular set of transmission parameters. In some examples, the message processing circuitry 1643, shown and described in FIG. 16, may provide a means to obtain at least one of a second message or a third message based on the particular set of transmission parameters. In some examples, the message processing circuitry 1643 together with the communication and processing circuitry 1641 and the transceiver 1610, shown and described in FIG. 16, may provide a means to obtain at least one of a second message or a third message based on the particular set of transmission parameters. In some examples, the communication and processing circuitry 1641 and/or the transceiver 1610, shown and described in FIG. 16, may provide a means to obtain at least one of a second message or a third message based on the particular set of transmission parameters.

In some examples, each of the plurality of sets of transmission parameters may include a first parameter associated with the second message and a second parameter associated with the third message.

In some examples, each of the plurality of sets of transmission parameters may include a first parameter associated with the second message and a second parameter associated with the second message.

In some examples, each of the plurality of sets of transmission parameters may include a modulation and coding scheme (MCS), a redundancy version (RV) index, a time domain resource allocation (TDRA), a frequency domain resource allocation (FDRA), a demodulation reference signal (DMRS) configuration, or a quantity of streams.

In some examples, the index may include a configuration index.

In some examples, the first message may include a layer 2 message, a layer 3 message, a medium-access control-control element (MAC-CE), or a radio resource control (RRC) message.

In some examples, the second message may include a common message associated with a broadcast to a plurality of apparatuses, including the apparatus, and the third message may include a private message associated with a transmission to the apparatus, or the second message may include the private message and the third message may include the common message.

In some examples, the apparatus may include a transceiver configured to receive the first message, the DCI, the second message, and the third message, wherein the apparatus is configured as a user equipment.

Referring again to FIG. 16, in one configuration, the apparatus 1600 includes means for obtaining a first message comprising a first indication of a first transmission parameter associated with a second message, means for obtaining a downlink control information (DCI) that specifies a second transmission parameter associated with a third message, means for obtaining the second message via a first channel, wherein the second message is obtained based, at least in part, on the first indication, and means for obtaining the third message via the first channel, wherein the third message is obtained based on the second transmission parameter. In one configuration, the apparatus 1600 includes means for obtaining a first downlink control information (DCI) that specifies a first transmission parameter associated with a first message, means for obtaining a second DCI that specifies a second transmission parameter associated with a second message, means for obtaining the first message via a first channel, wherein the first message is obtained based on the first transmission parameter, and means for obtaining the second message via the first channel, wherein the second message is obtained based on the second transmission parameter. In one configuration, the apparatus 1600 includes means for obtaining a downlink control information (DCI) that comprises a first transmission parameter, means for obtaining a first message via a first channel, wherein the first message is obtained based on the first transmission parameter, and means for obtaining a second message via the first channel, wherein the second message is obtained based on the first transmission parameter according to a first indication that the first transmission parameter is to be used to obtain the first message and the second message. In one configuration, the apparatus 1600 includes means for obtaining a first message comprising a plurality of sets of transmission parameters, means for obtaining a downlink control information (DCI) comprising an index that identifies a particular set of transmission parameters of the plurality of sets of transmission parameters, and means for obtaining at least one of a second message or a third message based on the particular set of transmission parameters. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any of FIGS. 1-25, and utilizing, for example, the methods and/or algorithms described herein in relation to FIGS. 17-21.

Figure 21:
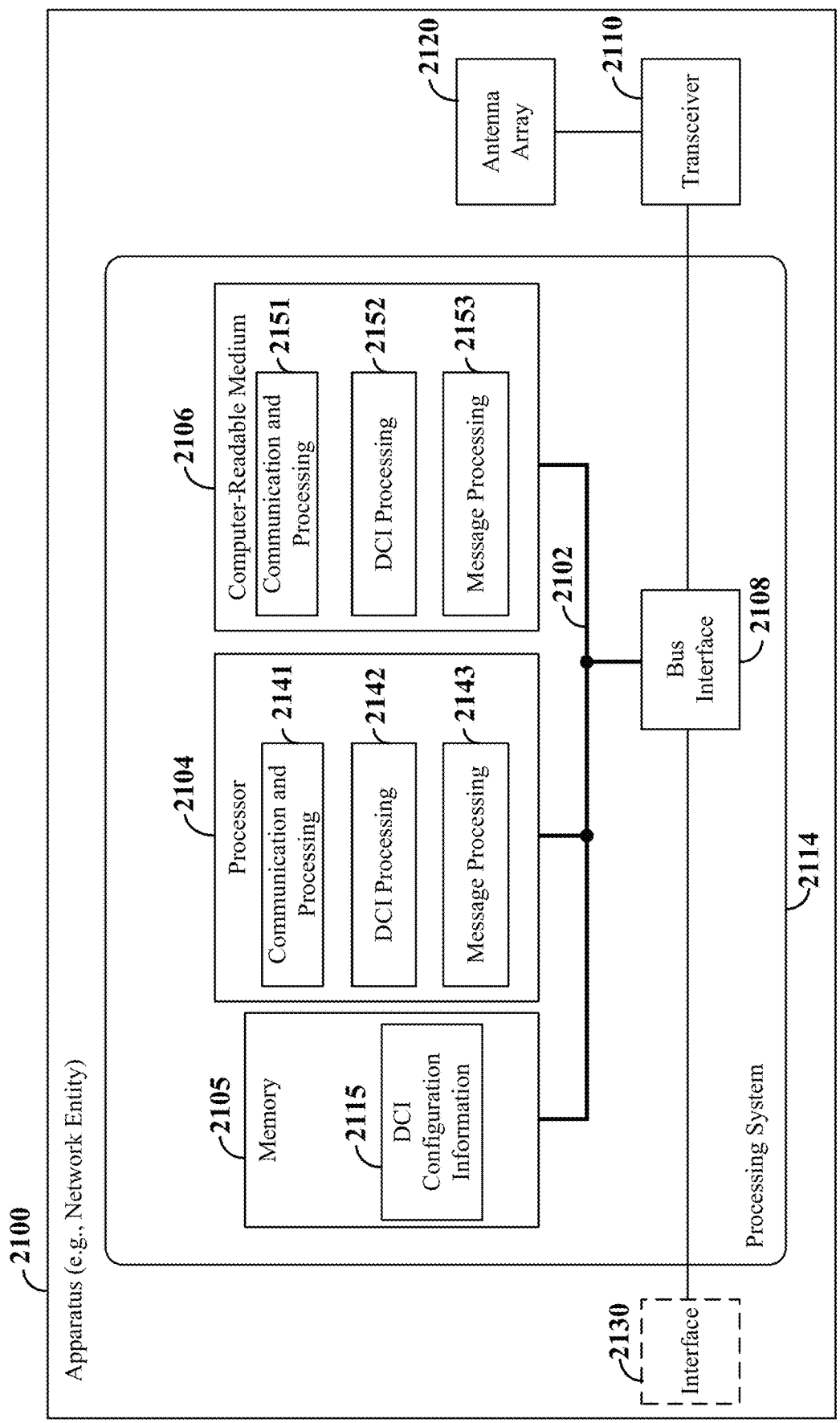
FIG. 21 is a block diagram conceptually illustrating an example of a hardware implementation for an apparatus (e.g., a network entity) employing a processing system according to some aspects.

FIG. 21 is a conceptual diagram illustrating an example of a hardware implementation for an apparatus 2100 employing a processing system 2114. In some implementations, the apparatus 2100 may correspond to any of the network entities, CUs, DUs, RUs, base stations, or scheduling entities shown in any of FIGS. 1-25. In some implementations, the apparatus 2100 may correspond to any of the UEs or scheduled entities shown in any of FIGS. 1-25 (e.g., to implement the techniques described herein in a peer-to-peer configuration in conjunction with the apparatus 1600, where the DCI referred to herein may be instead referred to as control information (CI)).

In accordance with various aspects of the disclosure, an element, or any portion of an element, or any combination of elements may be implemented with the processing system 2114. The processing system may include one or more processors 2104. The processing system 2114 may be substantially the same as the processing system 1614 illustrated in FIG. 16, including a bus interface 2108, a bus 2102, memory 2105, a processor 2104, a computer-readable medium 2106, a transceiver 2110, and an antenna array 2120. The memory 2105 may store DCI configuration information 2115 (e.g., indicative of information carried by DCI) used by the processor 2104 in cooperation with the transceiver 2110 for communication operations as described herein. Furthermore, the apparatus 2100 may include an interface 2130 (e.g., a network interface) that provides a means for communicating with at least one other apparatus within a core network and with at least one radio access network.

The apparatus 2100 may be configured to perform any one or more of the operations described herein (e.g., as described above in conjunction with FIGS. 1-15 and as described below in conjunction with FIGS. 22-25). In some aspects of the disclosure, the processor 2104, as utilized in the apparatus 2100, may include circuitry configured for various functions.

The processor 2104 may be configured to generate, schedule, and modify a resource assignment or grant of time-frequency resources (e.g., a set of one or more resource elements). For example, the processor 2104 may schedule time-frequency resources within a plurality of time division duplex (TDD) and/or frequency division duplex (FDD) subframes, slots, and/or mini-slots to carry user data traffic and/or control information to and/or from multiple UEs.

The processor 2104 may be configured to schedule resources for the transmission of sidelink signals, downlink signals, or uplink signals. The processor 2104 may be configured to schedule resources for control information (e.g., DCI) operations.

In some aspects of the disclosure, the processor 2104 may include communication and processing circuitry 2141. The communication and processing circuitry 2141 may be configured to communicate with network entities. The communication and processing circuitry 2141 may include one or more hardware components that provide the physical structure that performs various processes related to communication (e.g., signal reception and/or signal transmission) as described herein. The communication and processing circuitry 2141 may further include one or more hardware components that provide the physical structure that performs various processes related to signal processing (e.g., processing a received signal and/or processing a signal for transmission) as described herein. The communication and processing circuitry 2141 may further be configured to execute communication and processing software 2151 included on the computer-readable medium 2106 to implement one or more functions described herein.

In some implementations wherein the communication involves receiving information, the communication and processing circuitry 2141 may obtain information from a component of the apparatus 2100 (e.g., from the transceiver 2110 that receives the information via radio frequency signaling or some other type of signaling suitable for the applicable communication medium), process (e.g., decode) the information, and output the processed information. For example, the communication and processing circuitry 2141 may output the information to another component of the processor 2104, to the memory 2105, or to the bus interface 2108. In some examples, the communication and processing circuitry 2141 may receive one or more of signals, messages, other information, or any combination thereof. In some examples, the communication and processing circuitry 2141 may receive information via one or more channels. In some examples, the communication and processing circuitry 2141 and/or the transceiver 2110 may include functionality for a means for receiving. In some examples, the communication and processing circuitry 2141 may include functionality for a means for decoding. In some examples, the communication and processing circuitry 2141 may include functionality for a means for receiving signal measurement information from a UE.

In some implementations wherein the communication involves sending (e.g., transmitting) information, the communication and processing circuitry 2141 may obtain information (e.g., from another component of the processor 2104, the memory 2105, or the bus interface 2108), process (e.g., encode) the information, and output the processed information. For example, the communication and processing circuitry 2141 may output the information to the transceiver 2110 (e.g., that transmits the information via radio frequency signaling or some other type of signaling suitable for the applicable communication medium). In some examples, the communication and processing circuitry 2141 may send one or more of signals, messages, other information, or any combination thereof. In some examples, the communication and processing circuitry 2141 may send information via one or more channels. In some examples, the communication and processing circuitry 2141 and/or the transceiver 2110 may include functionality for a means for transmitting. In some examples, the communication and processing circuitry 2141 may include functionality for a means for encoding. In some examples, the communication and processing circuitry 2141 may include functionality for a means for transmitting information to a UE.

The processor 2104 may include DCI processing circuitry 2142 configured to perform DCI processing-related operations as discussed herein (e.g., one or more of the operations described above in conjunction with FIGS. 8-15). The DCI processing circuitry 2142 may be configured to execute DCI processing software 2152 included on the computer-readable medium 2106 to implement one or more functions described herein.

The DCI processing circuitry 2042 may include functionality for a means for outputting a DCI (e.g., as described above in conjunction with FIGS. 8-15). For example, the DCI processing circuitry 2042 may send a DCI to a UE on a designated search space (e.g., via a PDCCH).

The DCI processing circuitry 2042 may include functionality for a means for generating a DCI (e.g., as described above in conjunction with FIGS. 8-15). For example, the DCI processing circuitry 2042 may generate a DCI based on an RNTI and/or other information.

The processor 2104 may include message processing circuitry 2143 configured to perform message processing-related operations as discussed herein (e.g., one or more of the operations described above in conjunction with FIGS. 8-15). The message processing circuitry 2143 may be configured to execute message processing software 2153 included on the computer-readable medium 2106 to implement one or more functions described herein.

The message processing circuitry 2043 may include functionality for a means for outputting a message (e.g., as described above in conjunction with FIGS. 8-15). For example, the message processing circuitry 2043 may send a message to a UE (e.g., via a PDSCH).

The message processing circuitry 2043 may include functionality for a means for outputting a retransmission (e.g., as described above in conjunction with FIGS. 8-15). For example, the message processing circuitry 2043 may send a retransmission of message to a UE (e.g., via a PDSCH).

The message processing circuitry 2043 may include functionality for a means for obtaining a message (e.g., as described above in conjunction with FIGS. 8-15). For example, the message processing circuitry 2043 may receive a message from a UE (e.g., via a PUSCH).

The message processing circuitry 2043 may include functionality for a means for encoding (e.g., as described above in conjunction with FIGS. 8-15). For example, the message processing circuitry 2043 may encode a message to be sent to a UE.

In some examples, the apparatus 2100 shown and described above in connection with FIG. 21 may be a disaggregated base station. For example, the apparatus 2100 shown in FIG. 21 may include the CU and optionally one or more DUs/RUs of the disaggregated base station. Other DUs/RUs associated with the apparatus 2100 may be distributed throughout the network. In some examples, the DUs/RUs may correspond to TRPs associated with the network entity. In some examples, the CU and/or DU/RU of the disaggregated base station (e.g., within the apparatus 2100) may generate DCI and provide the DCI to the user equipment.

Figure 22:
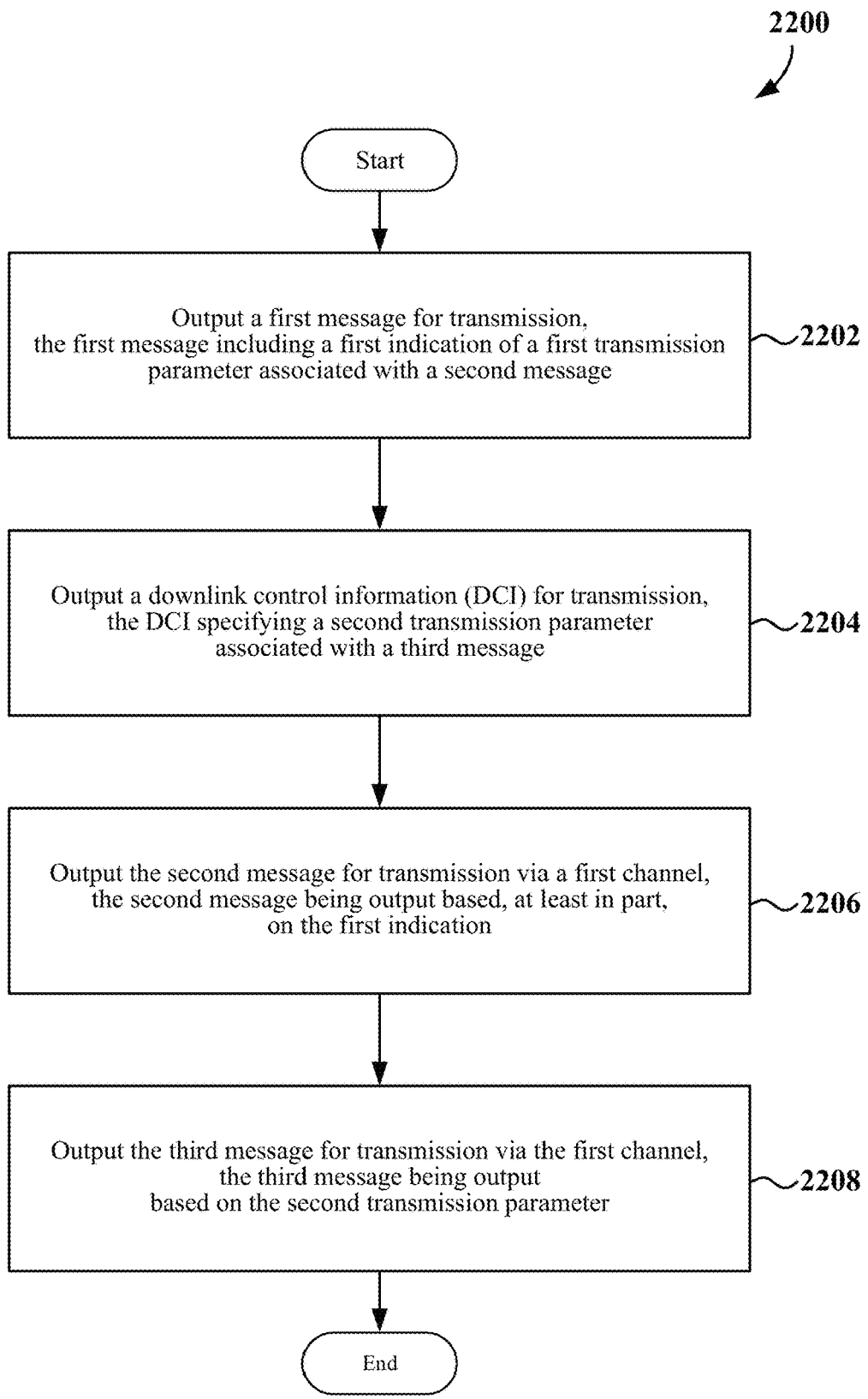
FIG. 22 is a flow chart illustrating an example communication method involving outputting transmission parameters via DCI according to some aspects.

FIG. 22 is a flow chart illustrating an example method 2200 for wireless communication in accordance with some aspects of the present disclosure. As described below, some or all illustrated features may be omitted in a particular implementation within the scope of the present disclosure, and some illustrated features may not be required for implementation of all examples. In some examples, the method 2200 (e.g., a method for wireless communication) may be carried out by the apparatus 2100 illustrated in FIG. 21. In some examples, the method 2200 may be carried out by any suitable apparatus or means for carrying out the functions or algorithm described below.

At block 2202, an apparatus may output a first message for transmission, the first message including a first indication of a first transmission parameter associated with a second message. In some examples, the message processing circuitry 2143, shown and described in FIG. 21, may provide a means to output a first message for transmission, the first message including a first indication of a first transmission parameter associated with a second message. In some examples, the message processing circuitry 2143 together with the communication and processing circuitry 2141 and the transceiver 2110, shown and described in FIG. 21, may provide a means to output a first message for transmission, the first message including a first indication of a first transmission parameter associated with a second message. In some examples, the communication and processing circuitry 2141 and/or the transceiver 2110, shown and described in FIG. 21, may provide a means to output a first message for transmission, the first message including a first indication of a first transmission parameter associated with a second message.

At block 2204, the apparatus may output a downlink control information (DCI) for transmission, the DCI specifying a second transmission parameter associated with a third message. In some examples, the DCI processing circuitry 2142, shown and described in FIG. 21, may provide a means to output a downlink control information (DCI) for transmission, the DCI specifying a second transmission parameter associated with a third message. In some examples, the DCI processing circuitry 2142 together with the communication and processing circuitry 2141 and the transceiver 2110, shown and described in FIG. 21, may provide a means to output a downlink control information (DCI) for transmission, the DCI specifying a second transmission parameter associated with a third message. In some examples, the communication and processing circuitry 2141 and/or the transceiver 2110, shown and described in FIG. 21, may provide a means to output a downlink control information (DCI) for transmission, the DCI specifying a second transmission parameter associated with a third message.

At block 2206, the apparatus may output the second message for transmission via a first channel, the second message being output based, at least in part, on the first indication. In some examples, the message processing circuitry 2143, shown and described in FIG. 21, may provide a means to output the second message for transmission via a first channel, the second message being output based, at least in part, on the first indication. In some examples, the message processing circuitry 2143 together with the communication and processing circuitry 2141 and the transceiver 2110, shown and described in FIG. 21, may provide a means to output the second message for transmission via a first channel, the second message being output based, at least in part, on the first indication. In some examples, the communication and processing circuitry 2141 and/or the transceiver 2110, shown and described in FIG. 21, may provide a means to output the second message for transmission via a first channel, the second message being output based, at least in part, on the first indication.

At block 2208, the apparatus may output the third message for transmission via the first channel, the third message being output based on the second transmission parameter. In some examples, the message processing circuitry 2143, shown and described in FIG. 21, may provide a means to output the third message for transmission via the first channel, the third message being output based on the second transmission parameter. In some examples, the message processing circuitry 2143 together with the communication and processing circuitry 2141 and the transceiver 2110, shown and described in FIG. 21, may provide a means to output the third message for transmission via the first channel, the third message being output based on the second transmission parameter. In some examples, the communication and processing circuitry 2141 and/or the transceiver 2110, shown and described in FIG. 21, may provide a means to output the third message for transmission via the first channel, the third message being output based on the second transmission parameter.

In some examples, the first channel is a PDSCH. In some examples, the first message may include a layer 2 message, a layer 3 message, a medium-access control-control element (MAC-CE), or a radio resource control (RRC) message.

In some examples, the second message may include a common message associated with a broadcast to a plurality of apparatuses, including a first apparatus, and the third message may include a private message associated with a transmission to the first apparatus, or the second message may include the private message and the third message may include the common message.

In some examples, the second message may include a common message associated with a broadcast to a plurality of apparatuses, including the first apparatus, the third message may include a private message associated with a transmission to the first apparatus, the first transmission parameter may include a first modulation and coding scheme (MCS) associated with the broadcast of the common message, and the second transmission parameter may include a second MCS associated with the transmission of the private message.

In some examples, the apparatus may output, for transmission, a fourth message specifying a third transmission parameter associated with transmission of the second message, and the second message is output further based on the third transmission parameter.

In some examples, the third transmission parameter may include a redundancy version (RV) index, and the fourth message may include a layer 2 message, a layer 3 message, a medium-access control-control element (MAC-CE), or a radio resource control (RRC) message.

In some examples, the first indication indicates at least one delta between the first transmission parameter and the second transmission parameter, and the second message is output further based on the second transmission parameter and the at least one delta.

In some examples, the at least one delta may include at least one of a first difference between a first modulation and coding scheme (MCS) associated with the second message and a second MCS associated with the third message, a second difference between a first redundancy version (RV) index associated with the second message and a second RV index associated with the third message, a third difference between a first time domain resource allocation (TDRA) associated with the second message and a second TDRA associated with the third message, a fourth difference between a first frequency domain resource allocation (FDRA) associated with the second message and a second FDRA associated with the third message, a fifth difference between a first demodulation reference signal (DMRS) configuration associated with the second message and a second DMRS configuration associated with the third message, or a sixth difference between a first quantity of streams associated with the second message and a second quantity of streams associated with the third message.

In some examples, the first indication specifies the first transmission parameter, and the second message is output further based on the first transmission parameter.

In some examples, the first transmission parameter may include a modulation and coding scheme (MCS), a redundancy version (RV) index, a time domain resource allocation (TDRA), a frequency domain resource allocation (FDRA), a demodulation reference signal (DMRS) configuration, or a quantity of streams.

In some examples, a cyclic redundancy check (CRS) index associated with the second message indicates a demodulation reference signal (DMRS) configuration pattern or identifier associated with the third message, and the apparatus may decode the third message based on the DMRS configuration pattern or identifier.

In some examples, the apparatus may include a transceiver configured to transmit the first message, the DCI, the second message, and the third message, wherein the apparatus is configured as a network entity.

Figure 23:
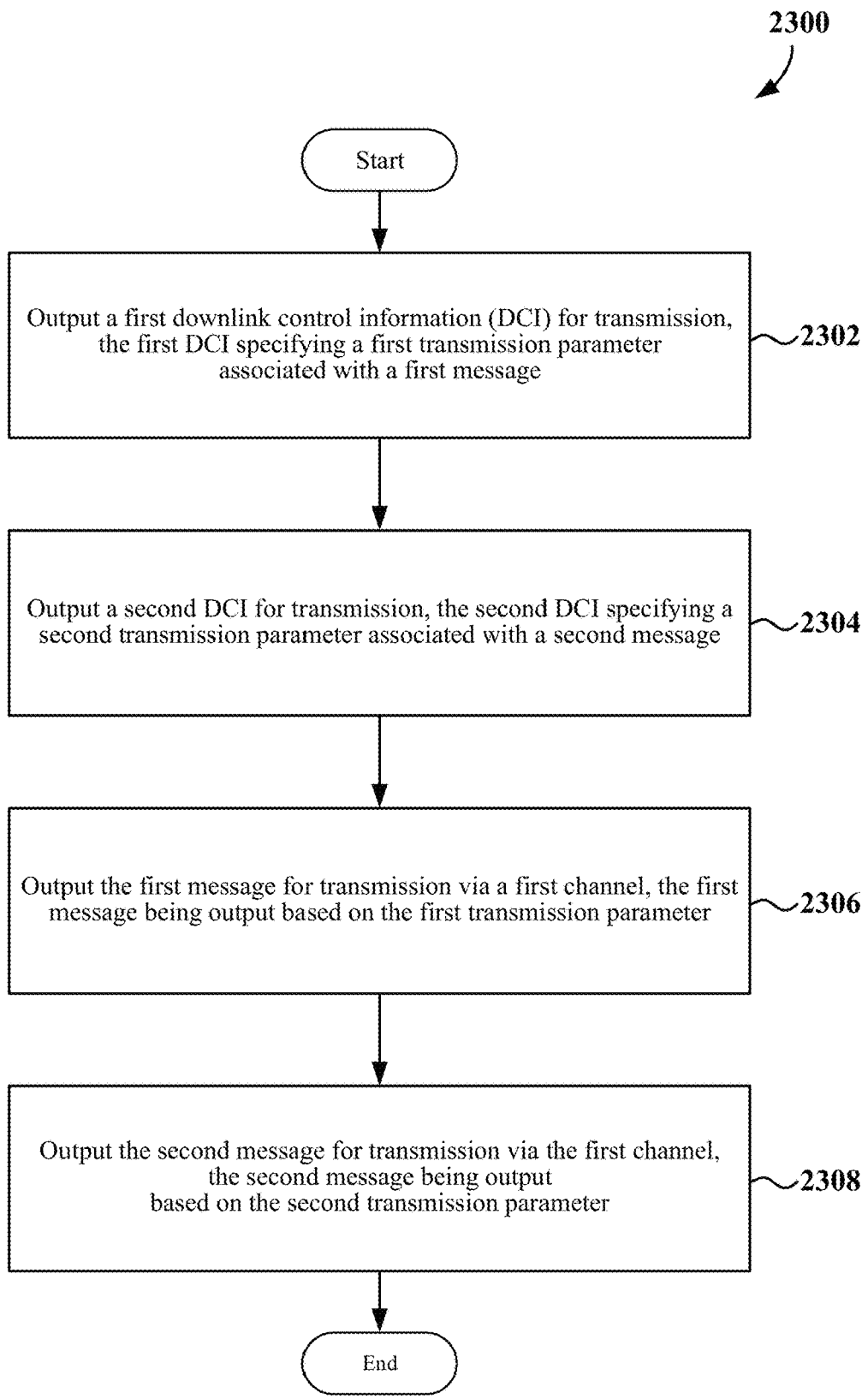
FIG. 23 is a flow chart illustrating an example communication method involving outputting transmission parameters via DCI according to some aspects.

FIG. 23 is a flow chart illustrating an example method 2300 for wireless communication in accordance with some aspects of the present disclosure. As described below, some or all illustrated features may be omitted in a particular implementation within the scope of the present disclosure, and some illustrated features may not be required for implementation of all examples. In some examples, the method 2300 (e.g., a method for wireless communication) may be carried out by the apparatus 2100 illustrated in FIG. 21. In some examples, the method 2300 may be carried out by any suitable apparatus or means for carrying out the functions or algorithm described below.

At block 2302, the apparatus may output a first downlink control information (DCI) for transmission, the first DCI specifying a first transmission parameter associated with a first message. In some examples, the DCI processing circuitry 2142, shown and described in FIG. 21, may provide a means to output a first downlink control information (DCI) for transmission, the first DCI specifying a first transmission parameter associated with a first message. In some examples, the DCI processing circuitry 2142 together with the communication and processing circuitry 2141 and the transceiver 2110, shown and described in FIG. 21, may provide a means to output a first downlink control information (DCI) for transmission, the first DCI specifying a first transmission parameter associated with a first message. In some examples, the communication and processing circuitry 2141 and/or the transceiver 2110, shown and described in FIG. 21, may provide a means to output a first downlink control information (DCI) for transmission, the first DCI specifying a first transmission parameter associated with a first message.

At block 2304, the apparatus may output a second DCI for transmission, the second DCI specifying a second transmission parameter associated with a second message. In some examples, the DCI processing circuitry 2142, shown and described in FIG. 21, may provide a means to output a second DCI for transmission, the second DCI specifying a second transmission parameter associated with a second message. In some examples, the DCI processing circuitry 2142 together with the communication and processing circuitry 2141 and the transceiver 2110, shown and described in FIG. 21, may provide a means to output a second DCI for transmission, the second DCI specifying a second transmission parameter associated with a second message. In some examples, the communication and processing circuitry 2141 and/or the transceiver 2110, shown and described in FIG. 21, may provide a means to output a second DCI for transmission, the second DCI specifying a second transmission parameter associated with a second message.

At block 2306, the apparatus may output the first message for transmission via a first channel, the first message being output based on the first transmission parameter. In some examples, the message processing circuitry 2143, shown and described in FIG. 21, may provide a means to output the first message for transmission via a first channel, the first message being output based on the first transmission parameter. In some examples, the message processing circuitry 2143 together with the communication and processing circuitry 2141 and the transceiver 2110, shown and described in FIG. 21, may provide a means to output the first message for transmission via a first channel, the first message being output based on the first transmission parameter. In some examples, the communication and processing circuitry 2141 and/or the transceiver 2110, shown and described in FIG. 21, may provide a means to output the first message for transmission via a first channel, the first message being output based on the first transmission parameter.

At block 2308, the apparatus may output the second message for transmission via the first channel, the second message being output based on the second transmission parameter. In some examples, the message processing circuitry 2143, shown and described in FIG. 21, may provide a means to output the second message for transmission via the first channel, the second message being output based on the second transmission parameter. In some examples, the message processing circuitry 2143 together with the communication and processing circuitry 2141 and the transceiver 2110, shown and described in FIG. 21, may provide a means to output the second message for transmission via the first channel, the second message being output based on the second transmission parameter. In some examples, the communication and processing circuitry 2141 and/or the transceiver 2110, shown and described in FIG. 21, may provide a means to output the second message for transmission via the first channel, the second message being output based on the second transmission parameter.

In some examples, the first channel is a PDSCH. In some examples, the first message and the second message are associated with a first transmission via a single transport block based on rate-splitting, or a second transmission via a first transport block and a second transport block, wherein at least one of a first time domain resource allocation (TDRA) or a first frequency domain resource allocation (FDRA) is associated with the first transport block, and wherein at least one of a second TDRA or a second FDRA is associated with the second transport block.

In some examples, the first DCI may include an indication of whether the first message and the second message are associated with rate-splitting.

In some examples, the first DCI may include an indication of whether the first message and the second message are associated with two DCIs.

In some examples, the apparatus may output, for transmission, a third message including a first indication of whether the first message and the second message are associated with rate-splitting or a second indication of whether the first message and the second message are associated with two DCIs.

In some examples, the third message may include a layer 2 message, a layer 3 message, a medium-access control-control element (MAC-CE), or a radio resource control (RRC) message.

In some examples, the second DCI indicates at least one of a time domain resource allocation (TDRA) associated with the second message, a frequency domain resource allocation (FDRA) associated with the second message, or a precoding resource block group (PRG) size associated with the second message.

In some examples, the first message may include a common message associated with a broadcast to a plurality of apparatuses, including a first apparatus, and the second message may include a private message associated with a transmission to the first apparatus, or the first message may include the private message and the second message may include the common message.

In some examples, the first transmission parameter may include a first modulation and coding scheme (MCS) associated with the first message, a first redundancy version (RV) index associated with the first message, a first time domain resource allocation (TDRA) associated with the first message, a first frequency domain resource allocation (FDRA) associated with the first message, a first demodulation reference signal (DMRS) configuration associated with the first message, or a first quantity of streams associated with the first message, and the second transmission parameter may include a second MCS associated with the second message, a second RV index associated with the second message, a second TDRA associated with the second message, a second FDRA associated with the second message, a second DMRS configuration associated with the second message, or a second quantity of streams associated with the second message.

In some examples, the apparatus may include a transceiver configured to transmit the first DCI, the second DCI, the first message, and the second message, wherein the apparatus is configured as a network entity.

Figure 24:
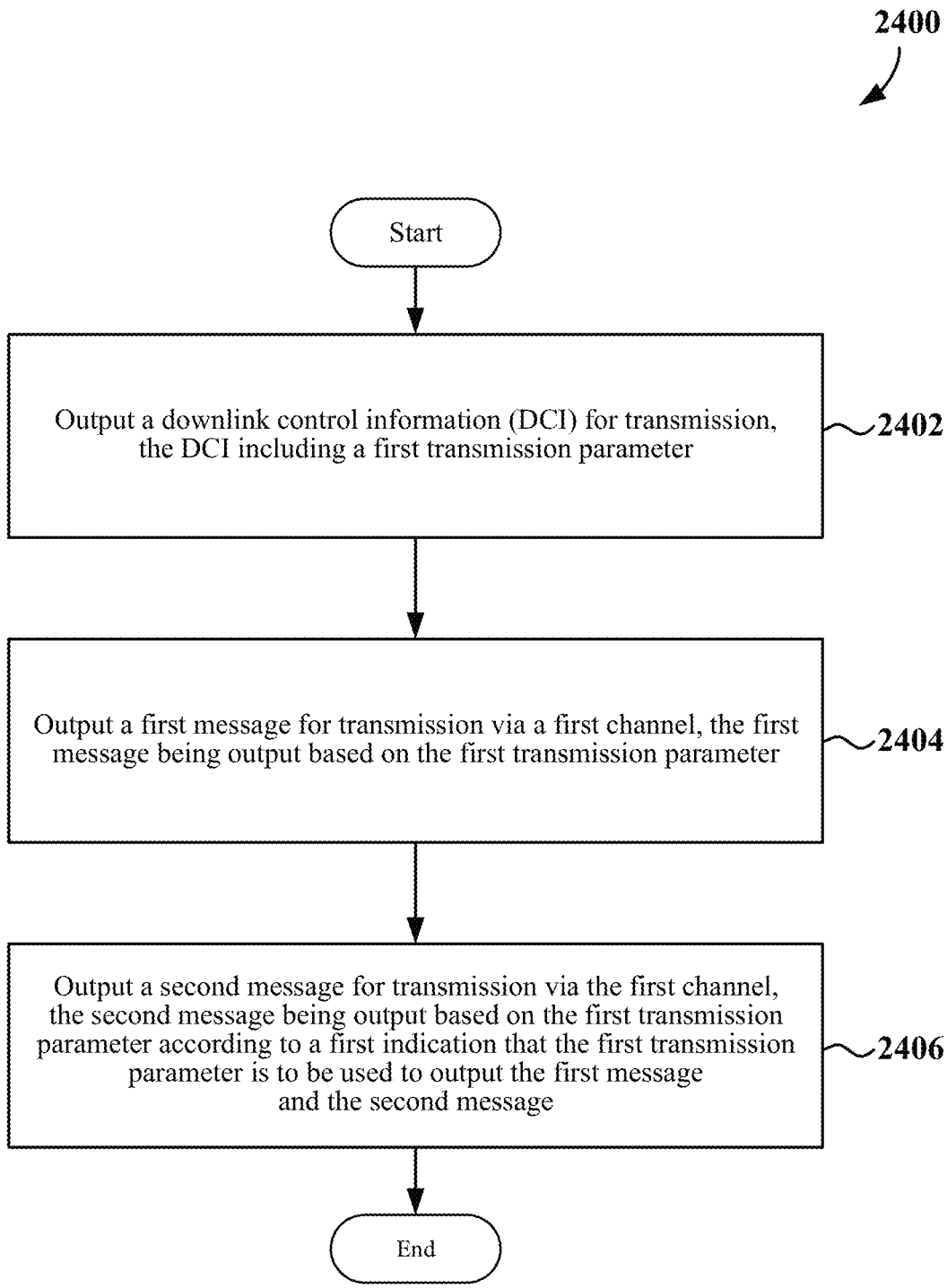
FIG. 24 is a flow chart illustrating an example communication method involving outputting transmission parameters via DCI according to some aspects.

FIG. 24 is a flow chart illustrating an example method 2400 for wireless communication in accordance with some aspects of the present disclosure. As described below, some or all illustrated features may be omitted in a particular implementation within the scope of the present disclosure, and some illustrated features may not be required for implementation of all examples. In some examples, the method 2400 (e.g., a method for wireless communication) may be carried out by the apparatus 2100 illustrated in FIG. 21. In some examples, the method 2400 may be carried out by any suitable apparatus or means for carrying out the functions or algorithm described below.

At block 2402, the apparatus may output a downlink control information (DCI) for transmission, the DCI including a first transmission parameter. In some examples, the DCI processing circuitry 2142, shown and described in FIG. 21, may provide a means to output a downlink control information (DCI) for transmission, the DCI including a first transmission parameter. In some examples, the DCI processing circuitry 2142 together with the communication and processing circuitry 2141 and the transceiver 2110, shown and described in FIG. 21, may provide a means to output a downlink control information (DCI) for transmission, the DCI including a first transmission parameter. In some examples, the communication and processing circuitry 2141 and/or the transceiver 2110, shown and described in FIG. 21, may provide a means to output a downlink control information (DCI) for transmission, the DCI including a first transmission parameter.

At block 2404, the apparatus may output a first message for transmission via a first channel, the first message being output based on the first transmission parameter. In some examples, the message processing circuitry 2143, shown and described in FIG. 21, may provide a means to output a first message for transmission via a first channel, the first message being output based on the first transmission parameter. In some examples, the message processing circuitry 2143 together with the communication and processing circuitry 2141 and the transceiver 2110, shown and described in FIG. 21, may provide a means to output a first message for transmission via a first channel, the first message being output based on the first transmission parameter. In some examples, the communication and processing circuitry 2141 and/or the transceiver 2110, shown and described in FIG. 21, may provide a means to output a first message for transmission via a first channel, the first message being output based on the first transmission parameter.

At block 2406, the apparatus may output a second message for transmission via the first channel, the second message being output based on the first transmission parameter according to a first indication that the first transmission parameter is to be used to output the first message and the second message. In some examples, the message processing circuitry 2143, shown and described in FIG. 21, may provide a means to output a second message for transmission via the first channel, the second message being output based on the first transmission parameter according to a first indication that the first transmission parameter is to be used to output the first message and the second message. In some examples, the message processing circuitry 2143 together with the communication and processing circuitry 2141 and the transceiver 2110, shown and described in FIG. 21, may provide a means to output a second message for transmission via the first channel, the second message being output based on the first transmission parameter according to a first indication that the first transmission parameter is to be used to output the first message and the second message. In some examples, the communication and processing circuitry 2141 and/or the transceiver 2110, shown and described in FIG. 21, may provide a means to output a second message for transmission via the first channel, the second message being output based on the first transmission parameter according to a first indication that the first transmission parameter is to be used to output the first message and the second message.

In some examples, the first channel is a PDSCH. In some examples, the first indication may include a maxNrofCodeWordsScheduledByDCI parameter that is set to a value of 1.

In some examples, the first indication may include a radio network temporary identifier (RNTI) associated with the DCI, the RNTI being set to a defined value.

In some examples, the apparatus may output, for transmission, a retransmission of the second message, wherein the retransmission of the second message is output based on the first transmission parameter according to a second indication that the first transmission parameter is to be used to output the retransmission of the second message.

In some examples, the second indication may include at least one of a new data indicator (NDI) parameter set to a value of 1, or a hybrid automatic repeat request identifier (HARQ-ID) set to a defined value.

In some examples, the first message may include a common message associated with a broadcast to a plurality of apparatuses, including a first apparatus, and the second message may include a private message associated with a transmission to the first apparatus, or the first message may include the private message and the second message may include the common message.

In some examples, the apparatus may output, for transmission, a retransmission of the first message or the second message, wherein the retransmission is output according to a maxNrofCode WordsScheduledByDCI parameter being set to a value of 2 and a new data indicator (NDI) indicating whether the retransmission is associated with the first message or the second message.

In some examples, the apparatus may include a transceiver configured to transmit the DCI, the first message, and the second message, wherein the apparatus is configured as a network entity.

Figure 25:
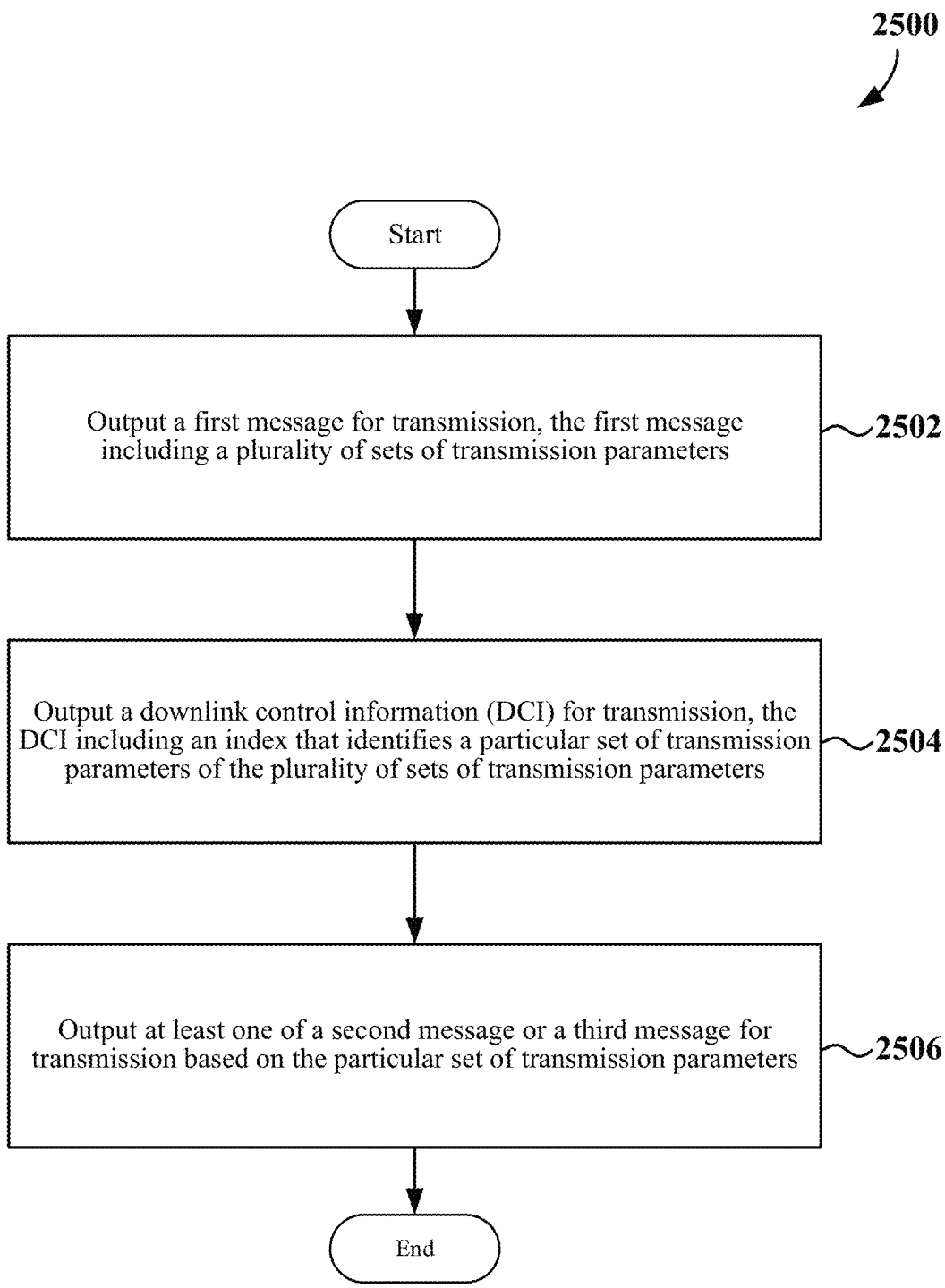
FIG. 25 is a flow chart illustrating an example communication method involving sets of transmission parameters via DCI according to some aspects.

FIG. 25 is a flow chart illustrating an example method 2500 for wireless communication in accordance with some aspects of the present disclosure. As described below, some or all illustrated features may be omitted in a particular implementation within the scope of the present disclosure, and some illustrated features may not be required for implementation of all examples. In some examples, the method 2500 (e.g., a method for wireless communication) may be carried out by the apparatus 2100 illustrated in FIG. 21. In some examples, the method 2500 may be carried out by any suitable apparatus or means for carrying out the functions or algorithm described below.

At block 2502, the apparatus may output a first message for transmission, the first message including a plurality of sets of transmission parameters. In some examples, the message processing circuitry 2143, shown and described in FIG. 21, may provide a means to output a first message for transmission, the first message including a plurality of sets of transmission parameters. In some examples, the message processing circuitry 2143 together with the communication and processing circuitry 2141 and the transceiver 2110, shown and described in FIG. 21, may provide a means to output a first message for transmission, the first message including a plurality of sets of transmission parameters. In some examples, the communication and processing circuitry 2141 and/or the transceiver 2110, shown and described in FIG. 21, may provide a means to output a first message for transmission, the first message including a plurality of sets of transmission parameters.

At block 2504, the apparatus may output a downlink control information (DCI) for transmission, the DCI including an index that identifies a particular set of transmission parameters of the plurality of sets of transmission parameters. In some examples, the DCI processing circuitry 2142, shown and described in FIG. 21, may provide a means to output a downlink control information (DCI) for transmission, the DCI including an index that identifies a particular set of transmission parameters of the plurality of sets of transmission parameters. In some examples, the DCI processing circuitry 2142 together with the communication and processing circuitry 2141 and the transceiver 2110, shown and described in FIG. 21, may provide a means to output a downlink control information (DCI) for transmission, the DCI including an index that identifies a particular set of transmission parameters of the plurality of sets of transmission parameters. In some examples, the communication and processing circuitry 2141 and/or the transceiver 2110, shown and described in FIG. 21, may provide a means to output a downlink control information (DCI) for transmission, the DCI including an index that identifies a particular set of transmission parameters of the plurality of sets of transmission parameters.

At block 2506, the apparatus may output at least one of a second message or a third message for transmission based on the particular set of transmission parameters. In some examples, the message processing circuitry 2143, shown and described in FIG. 21, may provide a means to output at least one of a second message or a third message for transmission based on the particular set of transmission parameters. In some examples, the message processing circuitry 2143 together with the communication and processing circuitry 2141 and the transceiver 2110, shown and described in FIG. 21, may provide a means to output at least one of a second message or a third message for transmission based on the particular set of transmission parameters. In some examples, the communication and processing circuitry 2141 and/or the transceiver 2110, shown and described in FIG. 21, may provide a means to output at least one of a second message or a third message for transmission based on the particular set of transmission parameters.

In some examples, each of the plurality of sets of transmission parameters may include a first parameter associated with the second message and a second parameter associated with the third message.

In some examples, each of the plurality of sets of transmission parameters may include a first parameter associated with the second message and a second parameter associated with the second message.

In some examples, each of the plurality of sets of transmission parameters may include a modulation and coding scheme (MCS), a redundancy version (RV) index, a time domain resource allocation (TDRA), a frequency domain resource allocation (FDRA), a demodulation reference signal (DMRS) configuration, or a quantity of streams.

In some examples, the index may include a configuration index.

In some examples, the first message may include a layer 2 message, a layer 3 message, a medium-access control-control element (MAC-CE), or a radio resource control (RRC) message.

In some examples, the second message may include a common message associated with a broadcast to a plurality of apparatuses, including the apparatus, and the third message may include a private message associated with a transmission to the apparatus, or the second message may include the private message and the third message may include the common message.

In some examples, the apparatus may include a transceiver configured to transmit the first message, the DCI, the second message, and the third message, wherein the apparatus is configured as a network entity.

Referring again to FIG. 21, in one configuration, the apparatus 2100 includes means for outputting a first message for transmission, the first message including a first indication of a first transmission parameter associated with a second message, means for outputting a downlink control information (DCI) for transmission, the DCI specifying a second transmission parameter associated with a third message, means for outputting the second message for transmission via a first channel, the second message being output based, at least in part, on the first indication, and means for outputting the third message for transmission via the first channel, the third message being output based on the second transmission parameter. In one aspect, the aforementioned means may be the processor 2104 shown in FIG. 21 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2104 is merely provided as an example, and other means for carrying out the described functions may be included within various aspects of the present disclosure, including but not limited to the instructions stored in the computer-readable medium 2106, or any other suitable apparatus or means described in any of FIGS. 1-25, and utilizing, for example, the methods and/or algorithms described herein in relation to FIGS. 22-25.

The methods shown in FIGS. 17-21 and 22-25 may include additional aspects, such as any single aspect or any combination of aspects described below and/or in connection with one or more other processes described elsewhere herein. The following provides an overview of several aspects of the present disclosure.

Aspect 1: A method for wireless communication at an apparatus (e.g. a UE), the method comprising: obtaining a first message comprising a first indication of a first transmission parameter associated with a second message; obtaining a downlink control information (DCI) that specifies a second transmission parameter associated with a third message; obtaining the second message via a first channel, the second message being obtained based, at least in part, on the first indication; and obtaining the third message via the first channel, the third message being obtained based on the second transmission parameter.

Aspect 2: The method of aspect 1, wherein the first message comprises: a layer 2 message, a layer 3 message, a medium-access control-control element (MAC-CE), or a radio resource control (RRC) message.

Aspect 3: The method of any of aspects 1 through 2, wherein: the second message comprises a common message associated with a broadcast to a plurality of apparatuses, including the apparatus, and the third message comprises a private message associated with a transmission to the apparatus; or the second message comprises the private message and the third message comprises the common message.

Aspect 4: The method of any of aspects 1 through 2, wherein: the second message comprises a common message associated with a broadcast to a plurality of apparatuses, including the apparatus; the third message comprises a private message associated with a transmission to the apparatus; the first transmission parameter comprises a first modulation and coding scheme (MCS) associated with the broadcast of the common message; and the second transmission parameter comprises a second MCS associated with the transmission of the private message.

Aspect 5: The method of any of aspects 1 through 4, wherein: the method further comprises obtaining a fourth message specifying a third transmission parameter associated with transmission of the second message; and the second message is obtained further based on the third transmission parameter.

Aspect 6: The method of aspect 5, wherein: the third transmission parameter comprises a redundancy version (RV) index; and the fourth message comprises: a layer 2 message, a layer 3 message, a medium-access control-control element (MAC-CE), or a radio resource control (RRC) message.

Aspect 7: The method of any of aspects 1 through 6, wherein: the first indication indicates at least one delta between the first transmission parameter and the second transmission parameter; and the second message is obtained further based on the second transmission parameter and the at least one delta.

Aspect 8: The method of aspect 7, wherein the at least one delta comprises at least one of: a first difference between a first modulation and coding scheme (MCS) associated with the second message and a second MCS associated with the third message, a second difference between a first redundancy version (RV) index associated with the second message and a second RV index associated with the third message, a third difference between a first time domain resource allocation (TDRA) associated with the second message and a second TDRA associated with the third message, a fourth difference between a first frequency domain resource allocation (FDRA) associated with the second message and a second FDRA associated with the third message, a fifth difference between a first demodulation reference signal (DMRS) configuration associated with the second message and a second DMRS configuration associated with the third message, or a sixth difference between a first quantity of streams associated with the second message and a second quantity of streams associated with the third message.

Aspect 9: The method of any of aspects 1 through 8, wherein: the first indication specifies the first transmission parameter; and the second message is obtained further based on the first transmission parameter.

Aspect 10: The method of aspect 9, wherein the first transmission parameter comprises: a modulation and coding scheme (MCS), a redundancy version (RV) index, a time domain resource allocation (TDRA), a frequency domain resource allocation (FDRA), a demodulation reference signal (DMRS) configuration, or a quantity of streams.

Aspect 11: The method of any of aspects 1 through 8, wherein: a cyclic redundancy check (CRS) index associated with the second message indicates a demodulation reference signal (DMRS) configuration pattern or identifier associated with the third message; and the method further comprises decoding the third message based on the DMRS configuration pattern or identifier.

Aspect 12: The method of any of aspects 1 through 11, further comprising: receiving the first message, the DCI, the second message, and the third message, wherein the apparatus is configured as a user equipment.

Aspect 13: A method for wireless communication at an apparatus (e.g. a UE), the method comprising: obtaining a first downlink control information (DCI) that specifies a first transmission parameter associated with a first message; obtaining a second DCI that specifies a second transmission parameter associated with a second message; obtaining the first message via a first channel, the first message being obtained based on the first transmission parameter; and obtaining the second message via the first channel, the second message being obtained based on the second transmission parameter.

Aspect 14: The method of aspect 13, wherein the first message and the second message are associated with: a first transmission via a single transport block based on rate splitting; or a second transmission via a first transport block and a second transport block, wherein at least one of a first time domain resource allocation (TDRA) or a first frequency domain resource allocation (FDRA) is associated with the first transport block, and wherein at least one of a second TDRA or a second FDRA is associated with the second transport block.

Aspect 15: The method of any of aspects 13 through 14, wherein the first DCI comprises an indication of whether the first message and the second message are associated with rate splitting.

Aspect 16: The method of any of aspects 13 through 14, wherein the first DCI comprises an indication of whether the first message and the second message are associated with two DCIs.

Aspect 17: The method of any of aspects 13 through 16, wherein the processing system is further configured to: obtain a third message comprising a first indication of whether the first message and the second message are associated with rate splitting or a second indication of whether the first message and the second message are associated with two DCIs.

Aspect 18: The method of aspect 17, wherein the third message comprises: a layer 2 message, a layer 3 message, a medium-access control-control element (MAC-CE), or a radio resource control (RRC) message.

Aspect 19: The method of any of aspects 13 through 18, wherein the second DCI indicates at least one of: a time domain resource allocation (TDRA) associated with the second message, a frequency domain resource allocation (FDRA) associated with the second message, or a precoding resource block group (PRG) size associated with the second message.

Aspect 20: The method of any of aspects 13 through 19, wherein: the first message comprises a common message associated with a broadcast to a plurality of apparatuses, including the apparatus, and the second message comprises a private message associated with a transmission to the apparatus; or the first message comprises the private message and the second message comprises the common message.

Aspect 21: The method of any of aspects 13 through 20, wherein: the first transmission parameter comprises: a first modulation and coding scheme (MCS) associated with the first message, a first redundancy version (RV) index associated with the first message, a first time domain resource allocation (TDRA) associated with the first message, a first frequency domain resource allocation (FDRA) associated with the first message, a first demodulation reference signal (DMRS) configuration associated with the first message, or a first quantity of streams associated with the first message; and the second transmission parameter comprises: a second MCS associated with the second message, a second RV index associated with the second message, a second TDRA associated with the second message, a second FDRA associated with the second message, a second DMRS configuration associated with the second message, or a second quantity of streams associated with the second message.

Aspect 22: The method of any of aspects 13 through 21, further comprising: receiving the first DCI, the second DCI, the first message, and the second message, wherein the apparatus is configured as a user equipment.

Aspect 23: A method for wireless communication at an apparatus (e.g. a UE), the method comprising: obtaining a downlink control information (DCI) that comprises a first transmission parameter; obtaining a first message via a first channel, the first message being obtained based on the first transmission parameter; and obtaining a second message via the first channel, the second message being obtained based on the first transmission parameter according to a first indication that the first transmission parameter is to be used to obtain the first message and the second message.

Aspect 24: The method of aspect 23, wherein the first indication comprises a maxNrofCode WordsScheduledByDCI parameter that is set to a value of 1.

Aspect 25: The method of any of aspects 23 through 24, wherein the first indication comprises a radio network temporary identifier (RNTI) associated with the DCI, the RNTI being set to a defined value.

Aspect 26: The method of any of aspects 23 through 25, further comprising: obtaining a retransmission of the second message, wherein the retransmission of the second message is obtained based on the first transmission parameter according to a second indication that the first transmission parameter is to be used to receive the retransmission of the second message.

Aspect 27: The method of aspect 26, wherein the second indication comprises at least one of: a new data indicator (NDI) parameter set to a value of 1; or a hybrid automatic repeat request identifier (HARQ-ID) set to a defined value.

Aspect 28: The method of any of aspects 23 through 27, wherein: the first message comprises a common message associated with a broadcast to a plurality of apparatuses, including the apparatus, and the second message comprises a private message associated with a transmission to the apparatus; or the first message comprises the private message and the second message comprises the common message.

Aspect 29: The method of any of aspects 23 through 25 and aspect 28, further comprising: obtaining a retransmission of the first message or the second message, wherein the retransmission is obtained according to a maxNrofCode WordsScheduledByDCI parameter being set to a value of 2 and a new data indicator (NDI) indicating whether the retransmission is associated with the first message or the second message.

Aspect 30: The method of any of aspects 23 through 29, further comprising: receiving the DCI, the first message, and the second message, wherein the apparatus is configured as a user equipment.

Aspect 31: A method for wireless communication at an apparatus (e.g. a UE), the method comprising: obtaining a first message comprising a plurality of sets of transmission parameters; obtaining a downlink control information (DCI) comprising an index that identifies a particular set of transmission parameters of the plurality of sets of transmission parameters; and obtaining at least one of a second message or a third message based on the particular set of transmission parameters.

Aspect 32: The method of aspect 31, wherein each of the plurality of sets of transmission parameters comprises a first parameter associated with the second message and a second parameter associated with the third message.

Aspect 33: The method of aspect 31, wherein each of the plurality of sets of transmission parameters comprises a first parameter associated with the second message and a second parameter associated with the second message.

Aspect 34: The method of any of aspects 31 through 32, wherein each of the plurality of sets of transmission parameters comprises: a modulation and coding scheme (MCS), a redundancy version (RV) index, a time domain resource allocation (TDRA), a frequency domain resource allocation (FDRA), a demodulation reference signal (DMRS) configuration, or a quantity of streams.

Aspect 35: The method of any of aspects 31 through 34, wherein the index comprises a configuration index.

Aspect 36: The method of any of aspects 31 through 35, wherein the first message comprises: a layer 2 message, a layer 3 message, a medium-access control-control element (MAC-CE), or a radio resource control (RRC) message.

Aspect 37: The method of any of aspects 31 through 36, wherein: the second message comprises a common message associated with a broadcast to a plurality of apparatuses, including the apparatus, and the third message comprises a private message associated with a transmission to the apparatus; or the second message comprises the private message and the third message comprises the common message.

Aspect 38: The method of any of aspects 31 through 37, further comprising: receiving the first message, the DCI, the second message, and the third message, wherein the apparatus is configured as a user equipment.

Aspect 39: A user equipment, comprising: at least one transceiver; a memory comprising instructions; and one or more processors configured to execute the instructions and cause the user equipment to perform a method in accordance with any one or more of aspects 1 through 11, wherein the at least one transceiver is configured to receive the first message, the DCI, the second message, and the third message.

Aspect 40: An apparatus configured for communication comprising at least one means for performing any one or more of aspects 1 through 12.

Aspect 41: A non-transitory computer-readable medium storing computer-executable code, comprising code for causing an apparatus to perform any one or more of aspects 1 through 12.

Aspect 42: An apparatus, comprising: a memory comprising instructions; and one or more processors configured to execute the instructions and cause the apparatus to perform a method in accordance with any one or more of aspects 1 through 11.

Aspect 43: A user equipment, comprising: at least one transceiver; a memory comprising instructions; and one or more processors configured to execute the instructions and cause the user equipment to perform a method in accordance with any one or more of aspects 13 through 21, wherein the at least one transceiver is configured to receive the first DCI, the second DCI, the first message, and the second message.

Aspect 44: An apparatus configured for communication comprising at least one means for performing any one or more of aspects 13 through 22.

Aspect 45: A non-transitory computer-readable medium storing computer-executable code, comprising code for causing an apparatus to perform any one or more of aspects 13 through 22.

Aspect 46: An apparatus, comprising: a memory comprising instructions; and one or more processors configured to execute the instructions and cause the apparatus to perform a method in accordance with any one or more of aspects 13 through 21.

Aspect 47: A user equipment, comprising: at least one transceiver; a memory comprising instructions; and one or more processors configured to execute the instructions and cause the user equipment to perform a method in accordance with any one or more of aspects 23 through 29, wherein the at least one transceiver is configured to receive the DCI, the first message, and the second message.

Aspect 48: An apparatus configured for communication comprising at least one means for performing any one or more of aspects 23 through 30.

Aspect 49: A non-transitory computer-readable medium storing computer-executable code, comprising code for causing an apparatus to perform any one or more of aspects 23 through 30.

Aspect 50: An apparatus, comprising: a memory comprising instructions; and one or more processors configured to execute the instructions and cause the apparatus to perform a method in accordance with any one or more of aspects 23 through 29.

Aspect 51: A user equipment, comprising: at least one transceiver; a memory comprising instructions; and one or more processors configured to execute the instructions and cause the user equipment to perform a method in accordance with any one or more of aspects 31 through 37, wherein the at least one transceiver is configured to receive the first message, the DCI, the second message, and the third message.

Aspect 52: An apparatus configured for communication comprising at least one means for performing any one or more of aspects 31 through 38.

Aspect 53: A non-transitory computer-readable medium storing computer-executable code, comprising code for causing an apparatus to perform any one or more of aspects 31 through 38.

Aspect 54: An apparatus, comprising: a memory comprising instructions; and one or more processors configured to execute the instructions and cause the apparatus to perform a method in accordance with any one or more of aspects 31 through 37.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 5, 6, 7, 8, 9, 10, 15, 16, and 21 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for communication, comprising:
a processing system configured to:
obtain a first message comprising a first indication of a first transmission parameter associated with a second message;
obtain a downlink control information (DCI) that specifies a second transmission parameter associated with a third message;
obtain the second message via a first channel, the second message being obtained based, at least in part, on the first indication; and
obtain the third message via the first channel, the third message being obtained based on the second transmission parameter;
decode the second message to recover a common message associated with a broadcast to a plurality of apparatuses, including the apparatus; and
decode the third message to recover a private message associated with a transmission to the apparatus, the decode of the third message being based on the common message.

2. The apparatus of claim 1, wherein the first message comprises: a layer 2 message, a layer 3 message, a medium-access control-control element (MAC-CE), or a radio resource control (RRC) message.

3. The apparatus of claim 1, wherein:
the first transmission parameter comprises a first modulation and coding scheme (MCS) associated with the broadcast of the common message; and
the second transmission parameter comprises a second MCS associated with the transmission of the private message.

4. The apparatus of claim 1, wherein:
the processing system is further configured to obtain a fourth message specifying a third transmission parameter associated with transmission of the second message; and
the second message is obtained further based on the third transmission parameter.

5. The apparatus of claim 4, wherein:
the third transmission parameter comprises a redundancy version (RV) index; and
the fourth message comprises: a layer 2 message, a layer 3 message, a medium-access control-control element (MAC-CE), or a radio resource control (RRC) message.

6. The apparatus of claim 1, wherein:
the first indication indicates at least one delta between the first transmission parameter and the second transmission parameter; and
the processing system is further configured to derive the first transmission parameter based on the second transmission parameter and the at least one delta.

7. The apparatus of claim 6, wherein the at least one delta comprises at least one of: a first difference between a first modulation and coding scheme (MCS) associated with the second message and a second MCS associated with the third message, a second difference between a first redundancy version (RV) index associated with the second message and a second RV index associated with the third message, a third difference between a first time domain resource allocation (TDRA) associated with the second message and a second TDRA associated with the third message, a fourth difference between a first frequency domain resource allocation (FDRA) associated with the second message and a second FDRA associated with the third message, a fifth difference between a first demodulation reference signal (DMRS) configuration associated with the second message and a second DMRS configuration associated with the third message, or a sixth difference between a first quantity of streams associated with the second message and a second quantity of streams associated with the third message.

8. The apparatus of claim 1, wherein:
the first indication specifies the first transmission parameter; and
the second message is obtained further based on the first transmission parameter.

9. The apparatus of claim 8, wherein the first transmission parameter comprises: a modulation and coding scheme (MCS), a redundancy version (RV) index, a time domain resource allocation (TDRA), a frequency domain resource allocation (FDRA), a demodulation reference signal (DMRS) configuration, or a quantity of streams.

10. The apparatus of claim 1, wherein:
a cyclic redundancy check (CRC) index associated with the second message indicates a demodulation reference signal (DMRS) configuration pattern or identifier associated with the third message; and
the processing system is further configured to decode the third message based on the DMRS configuration pattern or identifier.

11. The apparatus of claim 1, further comprising:
one or more transceivers configured to receive the first message, the DCI, the second message, and the third message,
wherein the apparatus is configured as a user equipment.

12. An apparatus for communication, comprising:
a processing system configured to:
obtain a first downlink control information (DCI) that specifies a first transmission parameter associated with a first message;
obtain a second DCI that specifies a second transmission parameter associated with a second message;
obtain the first message via a first channel, the first message being obtained based on the first transmission parameter; and
obtain the second message via the first channel, the second message being obtained based on the second transmission parameter;
decode the first message to recover a common message associated with a broadcast to a plurality of apparatuses, including the apparatus; and
decode the second message to recover a private message associated with a transmission to the apparatus, the decode of the second message being based on the common message.

13. The apparatus of claim 12, wherein the first message and the second message are associated with:
a first transmission via a single transport block based on rate-splitting; or
a second transmission via a first transport block and a second transport block, wherein at least one of a first time domain resource allocation (TDRA) or a first frequency domain resource allocation (FDRA) is associated with the first transport block, and wherein at least one of a second TDRA or a second FDRA is associated with the second transport block.

14. The apparatus of claim 12, wherein the first DCI comprises an indication of whether the first message and the second message are associated with rate-splitting.

15. The apparatus of claim 12, wherein the first DCI comprises an indication of whether the first message and the second message are associated with two DCIs.

16. The apparatus of claim 12, wherein the processing system is further configured to:
obtain a third message comprising a first indication of whether the first message and the second message are associated with rate-splitting or a second indication of whether the first message and the second message are associated with two DCIs.

17. The apparatus of claim 16, wherein the third message comprises: a layer 2 message, a layer 3 message, a medium-access control-control element (MAC-CE), or a radio resource control (RRC) message.

18. The apparatus of claim 12, wherein the second DCI indicates at least one of: a time domain resource allocation (TDRA) associated with the second message, a frequency domain resource allocation (FDRA) associated with the second message, or a precoding resource block group (PRG) size associated with the second message.

19. The apparatus of claim 12, wherein:
the first transmission parameter comprises: a first modulation and coding scheme (MCS) associated with the first message, a first redundancy version (RV) index associated with the first message, a first time domain resource allocation (TDRA) associated with the first message, a first frequency domain resource allocation (FDRA) associated with the first message, a first demodulation reference signal (DMRS) configuration associated with the first message, or a first quantity of streams associated with the first message; and
the second transmission parameter comprises: a second MCS associated with the second message, a second RV index associated with the second message, a second TDRA associated with the second message, a second FDRA associated with the second message, a second DMRS configuration associated with the second message, or a second quantity of streams associated with the second message.

20. The apparatus of claim 12, further comprising:
one or more transceivers configured to receive the first DCI, the second DCI, the first message, and the second message,
wherein the apparatus is configured as a user equipment.

21. An apparatus for communication, comprising:
a processing system configured to:
obtain a downlink control information (DCI) that comprises a first transmission parameter;
obtain a first message via a first channel, the first message being obtained based on the first transmission parameter; and
obtain a second message via the first channel, the second message being obtained based on the first transmission parameter according to a first indication that the first transmission parameter is to be used to obtain the first message and the second message;
decode the first message to recover a common message associated with a broadcast to a plurality of apparatuses, including the apparatus; and
decode the second message to recover a private message associated with a transmission to the apparatus, the decode of the second message being based on the common message.

22. The apparatus of claim 21, wherein the first indication comprises a maxNrofCodeWordsScheduledByDCI parameter that is set to a value of 1.

23. The apparatus of claim 21, wherein the first indication comprises a radio network temporary identifier (RNTI) associated with the DCI, the RNTI being set to a defined value.

24. The apparatus of claim 21, wherein the processing system is further configured to:
  obtain a retransmission of the second message, wherein the retransmission of the second message is obtained based on the first transmission parameter according to a second indication that the first transmission parameter is to be used to obtain the retransmission of the second message.

25. The apparatus of claim 24, wherein the second indication comprises at least one of:
  a new data indicator (NDI) parameter set to a value of 1; or
  a hybrid automatic repeat request identifier (HARQ-ID) set to a defined value.

26. The apparatus of claim 21, wherein the processing system is further configured to:
  obtain a retransmission of the first message or the second message, wherein the retransmission is obtained according to a maxNrofCodeWordsScheduledByDCI parameter being set to a value of 2 and a new data indicator (NDI) indicating whether the retransmission is associated with the first message or the second message.

27. The apparatus of claim 21, further comprising:
  one or more transceivers configured to receive the DCI, the first message, and the second message,
  wherein the apparatus is configured as a user equipment.

* * * * *